US010479274B2

(12) United States Patent
Park

(10) Patent No.: US 10,479,274 B2
(45) Date of Patent: Nov. 19, 2019

(54) VEHICLE AND CONTROL METHOD FOR THE SAME

(71) Applicant: LG ELECTRONICS INC., Seoul (KR)

(72) Inventor: Sangha Park, Seoul (KR)

(73) Assignee: LG Electronics Inc., Seoul (KR)

(*) Notice: Subject to any disclaimer, the term of this patent is extended or adjusted under 35 U.S.C. 154(b) by 432 days.

(21) Appl. No.: 15/287,779

(22) Filed: Oct. 7, 2016

(65) Prior Publication Data
US 2017/0101056 A1 Apr. 13, 2017

(30) Foreign Application Priority Data

Oct. 7, 2015 (KR) .................. 10-2015-0140817

(51) Int. Cl.
B60Q 9/00 (2006.01)
B60R 1/00 (2006.01)
(Continued)

(52) U.S. Cl.
CPC ............. *B60Q 9/008* (2013.01); *B60Q 1/085* (2013.01); *B60Q 1/525* (2013.01); *B60R 1/00* (2013.01); *G08G 1/04* (2013.01); *G08G 1/162* (2013.01); *G08G 1/166* (2013.01); *B60Q 2300/45* (2013.01); *B60R 2300/301* (2013.01); (Continued)

(58) Field of Classification Search
CPC .... B60Q 1/525; B60Q 2300/45; B60Q 9/008; B60R 2300/301; B60R 2300/304; B60R 2300/308; B60R 2300/70; B60R 2300/8093; B60W 2550/10
See application file for complete search history.

(56) References Cited

U.S. PATENT DOCUMENTS

2008/0175012 A1 7/2008 Shimaoka et al.
2009/0005961 A1* 1/2009 Grabowski .......... G01C 21/365
701/532
(Continued)

FOREIGN PATENT DOCUMENTS

DE 10359413 7/2005
DE 102009058140 6/2011
(Continued)

OTHER PUBLICATIONS

European Search Report in European Application No. 16192539.1, dated Feb. 28, 2017, 53 pages.

Primary Examiner — Obafemi O Sosanya
(74) Attorney, Agent, or Firm — Fish & Richardson P.C.

(57) ABSTRACT

Disclosed are a vehicle and a control method for the same. The vehicle includes a display unit configured to display information, a sensing unit configured to detect a moving object in the vicinity of the vehicle, and a controller configured to judge the motion characteristics of the moving object based on sensing information regarding the moving object provided from the sensing unit, the motion characteristics of the moving object including a speed and a movement direction of the moving object, to set a dangerous area for the moving object based on the motion characteristics of the moving object, the dangerous area having a size and a shape corresponding to the motion characteristics of the moving object, and to display an image indicating the dangerous area on the display unit.

22 Claims, 37 Drawing Sheets

(51) Int. Cl.
*B60Q 1/08* (2006.01)
*B60Q 1/52* (2006.01)
*G08G 1/04* (2006.01)
*G08G 1/16* (2006.01)

(52) U.S. Cl.
CPC ... *B60R 2300/304* (2013.01); *B60R 2300/308* (2013.01); *B60R 2300/70* (2013.01); *B60R 2300/8093* (2013.01); *B60W 2550/10* (2013.01)

(56) References Cited

U.S. PATENT DOCUMENTS

| | | | |
|---|---|---|---|
| 2009/0187333 A1* | 7/2009 | Mueller | G01C 21/3647 701/532 |
| 2013/0054087 A1 | 2/2013 | Mohamed | |
| 2013/0343071 A1 | 12/2013 | Nagaoka et al. | |
| 2015/0210274 A1* | 7/2015 | Clarke | B60W 30/00 382/104 |
| 2016/0082840 A1 | 3/2016 | Yoshida et al. | |
| 2016/0159281 A1 | 6/2016 | Jang et al. | |

FOREIGN PATENT DOCUMENTS

| | | |
|---|---|---|
| EP | 2752834 | 7/2014 |
| JP | 3559083 | 8/2004 |
| JP | 2005293479 A | 10/2005 |
| JP | 2006039698 A | 2/2006 |
| JP | 2006182322 | 7/2006 |
| JP | 2007-249841 | 9/2007 |
| JP | 2008-062762 | 3/2008 |
| JP | 2010009607 | 1/2010 |
| KR | 20110084715 | 7/2011 |
| KR | 20120050306 | 5/2012 |
| KR | 1372023 | 3/2014 |
| WO | 2011/125135 | 10/2011 |
| WO | 2015037117 | 3/2015 |

\* cited by examiner

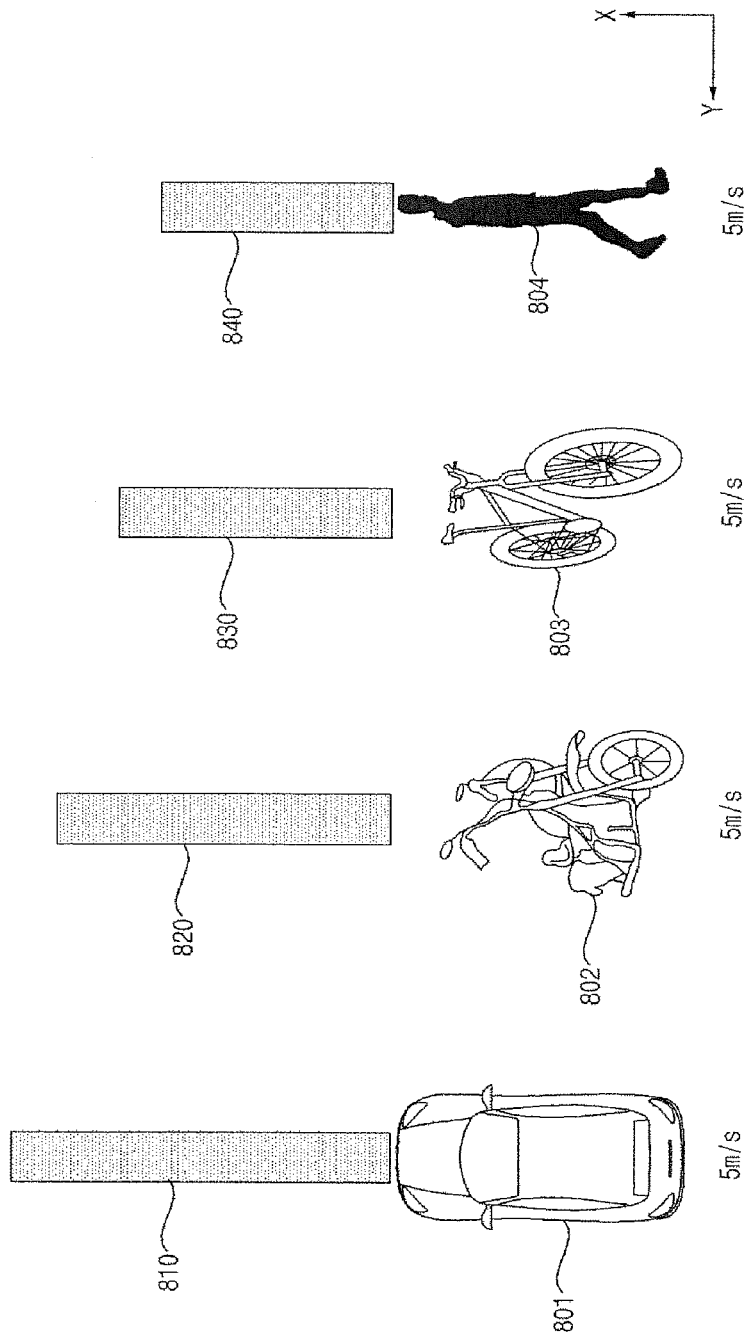

100
VEHICLE AND CONTROL METHOD FOR THE SAME

CROSS-REFERENCE TO RELATED APPLICATION

This application claims the priority benefit of Korean Patent Application No. 10-2015-0140817, filed on, Oct. 7, 2015 in the Korean Intellectual Property Office, the disclosure of which is incorporated herein by reference.

TECHNICAL FIELD

The present invention relates to a vehicle surround monitoring device and, more particularly, to a vehicle, which indicates the risk of a collision with a moving object in the vicinity of the vehicle, and a control method for the same.

BACKGROUND

A vehicle is an apparatus that transports, for example, people or cargo from one place to another place via driving of wheels. Examples of vehicles include two-wheeled cars such as motorcycles, four-wheeled cars such as sedans, and trains.

In order to increase the safety and convenience of a user who uses the vehicle, technology to equip vehicles with, for example, a variety of sensors and electronic devices is being aggressively developed. In particular, for example, systems, which provide various functions (e.g. smart cruise control and lane keeping assistance) developed for user driving convenience, have been mounted in vehicles. Thereby, so-called autonomous driving, which enables a vehicle to autonomously travel on the road in consideration of the external environment without user operation, has recently become possible.

Meanwhile, various types of objects may be present around a traveling vehicle. For example, other vehicles, motorcycles, bicycles, pedestrians, and fallen objects may be distributed all over the road. Among these objects, in particular, objects that are moving (hereinafter referred to as "moving objects") are at high risk of colliding with the vehicle.

However, the related art is adapted to detect moving objects around a vehicle and thereafter simply inform the driver of the presence of the objects. That is, despite the fact that the degree of the risk that the moving object will collide with the vehicle differs according to the inherent speed, movement direction or type of the object, the object detection method of the related art provides the driver with simple information related to the risk of a collision between each moving object and the vehicle, which does not help the driver preemptively respond to the risk of an accident.

SUMMARY

Therefore, the present invention is made to solve the problems as described above, and one object of the present invention is to provide a vehicle surround monitoring device comprising: a display unit; a sensing unit configured to detect (i) a moving object within a first distance from a vehicle and (ii) movement of the moving object; and a controller configured to: obtain motion characteristics of the moving object based on the movement of the moving object detected by the sensing unit, the motion characteristics of the moving object including speed of the moving object and a moving direction of the moving object; determine a visual image associated with the moving object based on the motion characteristics of the moving object, wherein a size and a shape of the visual image are associated with the motion characteristics of the moving object; and provide the visual image to the display unit for displaying.

In a possible embodiment, the sensing unit includes a camera, a radar, a Light Detection and Ranging (LiDAR) sensor, or an ultrasonic sensor.

In a possible embodiment, the controller is configured to provide the visual image in an augmented-reality mode or a top-view mode to the display unit.

In a possible embodiment, controller is configured to: merge the visual image into a map, and provide the map that is merged with the visual image to the display unit, the map presenting a geographical area that the vehicle locates.

In a possible embodiment, the controller is configured to determine a scale of the map based on traffic information for the geographical area.

In a possible embodiment, the controller is configured to: determine one or more tracking points of the moving object; obtain tracking data for the one or more tracking points, the tracking data including a position, speed, or a moving direction of each tracking point; determine a predicted moving direction of the moving object based on the tracking data; and adjust the visual image based on the predicted moving direction.

In a possible embodiment, the controller is configured to identify a type of the moving object.

In a possible embodiment, the controller is configured to: store a plurality of types of a moving object in a memory; associate the identified type of the moving object with one of the plurality of types stored in the memory; and determine the visual image based on the association between the identified type and the one of the plurality of types stored in the memory.

In a possible embodiment, the visual image includes one or more sub-areas.

In a possible embodiment, each of the one or more sub-areas indicates a route that the moving object will pass at a certain time period.

In a possible embodiment, the controller is configured to provide the one or more sub-areas to the display unit for displaying, the one or more sub-areas being distinguishable from each other based on visual characteristics.

In a possible embodiment, the controller is configured to determine a predicted route of the vehicle that the vehicle will pass at a first time period based on the motion characteristics of the vehicle.

In a possible embodiment, the controller is configured to: determine a first visual image corresponding to the predicted route of the vehicle, and provide, to the display unit, the first visual image with the visual image associated with the moving object.

In a possible embodiment, the controller is configured to determine whether one of the one or more sub-areas overlaps the predicted route of the vehicle.

In a possible embodiment, the controller is configured to, based on (i) the determination that one of the one or more sub-areas overlaps the predicted route of the vehicle and (ii) illumination outside the vehicle, provide an audio alert or a visual alert to the moving object.

In a possible embodiment, the controller is configured to, based on the determination that one of the one or more sub-areas overlaps the predicted route of the vehicle, perform one or more operations including (i) providing a warning to a driver of the vehicle, (ii) generating speed control information for the vehicle, (iii) generating steering control information for the vehicle, and (iv) generating light control information for the vehicle.

In a possible embodiment, the controller is configured to perform a first operation, among the one or more operations, for the sub-area that overlaps the predicted route of the vehicle.

In a possible embodiment, the controller is configured to adjust control parameters for the warning, the speed control information, the steering control information, and the light control information based on a distance between the vehicle and the sub-area that overlaps the predicted route of the vehicle.

In a possible embodiment, the controller is configured to: determine which sub-area of the one or more sub-areas overlaps the predicted route of the vehicle; and determine an operation, from the operations, for the sub-area that overlaps the predicted route of the vehicle based on the determination as to which sub-area of the one or more sub-areas overlaps the predicted route of the vehicle.

In a possible embodiment, the vehicle surround monitoring device further comprising a communication unit that is configured to receive travel information from the moving object, and the controller is configured to determine the visual image associated with the moving object based on the travel information received from the moving object.

Detailed items of other embodiments are included in the following description and the accompanying drawings.

BRIEF DESCRIPTION OF THE DRAWINGS

The above and other objects, features and advantages of the present invention will be more clearly understood from the following detailed description taken in conjunction with the accompanying drawings, in which:

FIGS. 8A and 8B are views illustrating one example of a dangerous area set on a per-moving-object-type basis according to one embodiment of the present invention;

DETAILED DESCRIPTION

Figure 1:
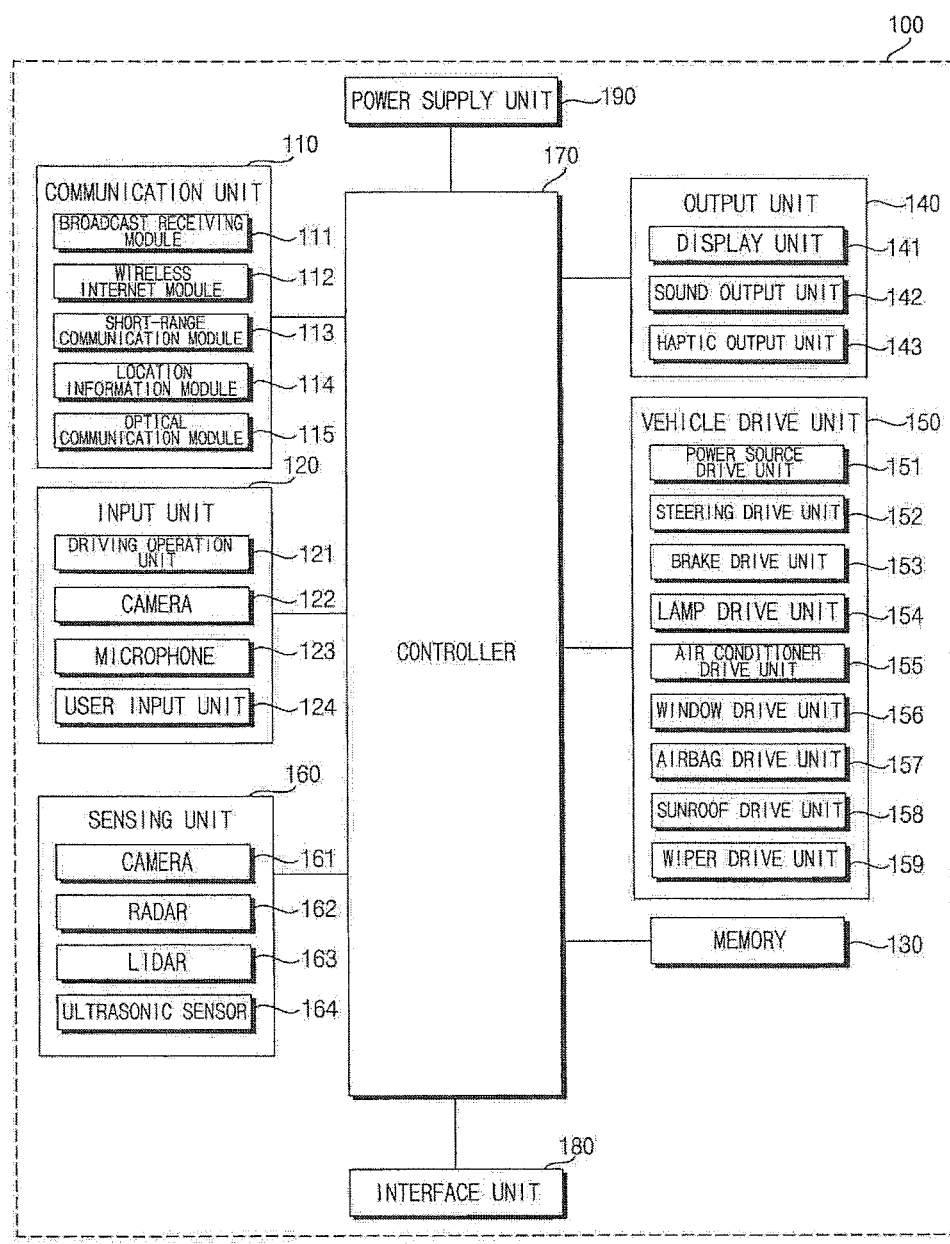
FIG. 1 is a block diagram of a vehicle according to one embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions included in the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. In addition, it will be understood that when a component is referred to as "controlling" another component, it may directly control another component, or may also control another component via the mediation of a third component. In addition, it will be understood that when a component is referred to as "providing" another component with information and signals, it may directly provide another component with the same and may also provide another component the same via the mediation of a third component.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include all of an internal combustion engine vehicle including an engine as a power source, a hybrid vehicle including both an engine and an electric motor as a power source, and an electric vehicle including an electric motor as a power source.

FIG. 1 is a block diagram of a vehicle surround monitoring device 100 according to one embodiment of the present invention.

The vehicle surround monitoring device 100 may be a vehicle.

The vehicle surround monitoring device 100 may include a communication unit 110, an input unit 120, a memory 130, an output unit 140, a vehicle drive unit 150, a sensing unit 160, a controller 170, an interface unit 180, and a power supply unit 190.

The communication unit 110 may include one or more modules to enable the wireless communication between the vehicle surround monitoring device 100 and an external appliance (e.g., a mobile terminal, an external server, or another vehicle). In addition, the communication unit 110 may include one or more modules to connect the vehicle surround monitoring device 100 to one or more networks.

The communication unit 110 may include a broadcast receiving module 111, a wireless Internet module 112, a short-range communication module 113, a location information module 114, and an optical communication module 115.

The broadcast receiving module 111 is configured to receive a broadcast signal or broadcast-associated information from an external broadcast managing server via a broadcast channel. Here, broadcast includes radio broadcast or TV broadcast.

The wireless Internet module 112 is a module for wireless Internet access. The wireless Internet module 112 may be internally or externally coupled to the vehicle surround monitoring device 100. The wireless Internet module 112 is configured to transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 112 transmits and receives data according to one or more of such wireless Internet technologies and other Internet technologies as well. For example, the wireless Internet module 112 may exchange data with the external server in a wireless manner. The wireless Internet module 112 may receive weather information and road traffic state information (e.g., Transport Protocol Expert Group (TPEG) information) from the external server.

The short-range communication module 113 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 113 may form wireless area networks to perform the short-range communication between the vehicle surround monitoring device 100 and at least one external device. For example, the short-range communication module 113 may exchange data with a mobile terminal of a passenger in a wireless manner. The short-range communication module 113 may receive weather information and road traffic state information (e.g., Transport Protocol Expert Group (TPEG) information) from the mobile terminal or the external server. When a user gets into the vehicle surround monitoring device 100, the mobile terminal of the user and the vehicle surround monitoring device 100 may pair with each other automatically or as the user executes a pairing application.

The location information module 114 is a module to acquire a location of the vehicle surround monitoring device 100. A representative example of the location information module 114 includes a Global Position System (GPS) module. For example, when the vehicle utilizes a GPS module, a location of the vehicle surround monitoring device 100 may be acquired using signals transmitted from GPS satellites.

The optical communication module 115 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle surround monitoring device 100. For example, the light emitting unit may be at least one selected from among a headlight, a taillight, a brake light, a turn signal light, and a sidelight. For example, the optical communication module 115 may exchange data with another vehicle via optical communication.

The input unit 120 may include a driving operation unit 121, a microphone 123, and a user input unit 124.

The driving operation unit 121 is configured to receive user input for the driving of the vehicle surround monitoring device 100. The driving operation unit 121 may include a steering input unit 121*a*, a shift input unit 121*b*, an acceleration input unit 121*c*, and a brake input unit 121*d*. The steering input unit 121*a* is configured to receive user input with regard to the direction of travel of the vehicle surround monitoring device 100. The steering input unit 121*a* may include a steering wheel. In some embodiments, the steering input unit 121*a* may be configured as a touchscreen, a touch pad, or a button.

The shift input unit 121*b* is configured to receive input for selecting one of Park (P), Drive (D), Neutral (N), and Reverse (R) gears of the vehicle surround monitoring device 100 from the user. The shift input unit 121*b* may have a lever form. In some embodiments, the shift input unit 121*b* may be configured as a touchscreen, a touch pad, or a button.

The acceleration input unit 121*c* is configured to receive user input for the acceleration of the vehicle surround monitoring device 100. The brake input unit 121*d* is configured to receive user input for the speed reduction of the vehicle surround monitoring device 100. Each of the acceleration input unit 121*c* and the brake input unit 121*d* may have a pedal form. In some embodiments, the acceleration input unit 121*c* or the brake input unit 121*d* may be configured as a touchscreen, a touch pad, or a button.

The camera 122 may be located at one side of the space inside the vehicle surround monitoring device 100 to produce an image of the interior of the vehicle surround monitoring device 100. For example, the camera 122 may be located at various positions inside the vehicle surround monitoring device 100 such as, for example, the dashboard surface, the interior roof surface, and a rear view mirror, and may serve to capture an image of a passenger of the vehicle surround monitoring device 100. In this case, the camera 122 may produce an image of the passenger compartment including the driver's seat of the vehicle surround monitoring device 100. In addition, the camera 122 may produce an image of the passenger compartment including the driver's seat and a passenger's seat of the vehicle surround monitoring device 100. The image of the passenger compartment produced by the camera 122 may include a 2-dimensional (2D) and/or 3-dimensional (3D) image. To produce the 3D image, the camera 122 may include at least one of a stereo camera, a depth camera, and a 3D laser scanner. The camera 122 may provide the image of the interior, produced thereby, to the controller 170, which is functionally coupled thereto.

The controller 170 may detect a variety of objects by analyzing the indoor image provided from the camera 122. For example, the controller 170 may detect the driver's eyes and/or gesture from a portion of the indoor image that corresponds to the area of the driver's seat. In another example, the controller 170 may detect the driver's eyes and/or gesture from a portion of the indoor image that corresponds to an indoor area excluding the area of the driver's seat. Of course, the driver's eyes and/or gestures and the passenger's eyes and/or gestures may be detected simultaneously.

The microphone 123 may process external sound signals into electrical data. The processed data may be utilized in various ways according to a function that the vehicle surround monitoring device 100 is performing. The microphone 123 may convert a user voice command into electrical data. The converted electrical data may be transmitted to the controller 170.

Meanwhile, in some embodiments, the camera 122 or the microphone 123 may be components included in the sensing unit 160, other than components included in the input unit 120.

The user input unit 124 is configured to receive information from the user. When information is input via the user input unit 124, the controller 170 may control the operation of the vehicle surround monitoring device 100 so as to correspond to the input information. The user input unit 124 may include a touch input unit or a mechanical input unit. In some embodiments, the user input unit 124 may be located in a region of the steering wheel. In this case, the driver may operate the user input unit 124 with the fingers while gripping the steering wheel.

The input unit 120 may include a plurality of buttons or touch sensors. Various input operations may be performed via the buttons or touch sensors.

The sensing unit 160 is configured to sense signals associated with, for example, the driving of the vehicle surround monitoring device 100. To this end, the sensing unit 160 may include a collision sensor, a steering sensor, a speed sensor, gradient sensor, a weight sensor, a heading sensor, a yaw sensor, a gyro sensor, a position module, a vehicle forward/reverse sensor, a battery sensor, a fuel sensor, a tire sensor, a steering sensor based on the rotation of the steering wheel, a vehicle interior temperature sensor, a vehicle interior humidity sensor, an infrared sensor, a radar 162, a LiDAR 163, and an ultrasonic sensor 164.

As such, the sensing unit 160 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, and steering wheel rotation angle information. In addition, the controller 170 may generate control signals for acceleration, speed reduction, and direction change of the vehicle surround monitoring device 100, for example, based on surrounding environment information acquired by at least one of the camera, the ultrasonic sensor, the infrared sensor, the radar, and the LiDAR included in the vehicle surround monitoring device 100. Here, the surrounding environment information may be information related to various objects located within a prescribed distance range from the vehicle surround monitoring device 100 that is traveling. For example, the surrounding environment information may include the number of obstacles located within a distance of 100 m from the vehicle surround monitoring device 100, the distances to the obstacles, the sizes of the obstacles, the kinds of the obstacles, and the like.

Meanwhile, the sensing unit 160 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 160 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the camera 122 and the microphone 123 may operate as sensors. The biometric information sensing unit may acquire hand geometry information and facial recognition information via the camera 122.

The sensing unit 160 may include at least one camera 161 configured to capture an image of the outside of the vehicle surround monitoring device 100. The camera 161 may be referred to as an external camera. For example, the sensing unit 160 may include a plurality of cameras 161 arranged at different positions at the exterior of the vehicle surround monitoring device 100. Each camera 161 may include an image sensor and an image processing module. The camera 161 may process a still image or moving image acquired by the image sensor (e.g., a CMOS or CCD). The image processing module may extract required information by processing the still image or moving image acquired by the image sensor, and may transmit the extracted information to the controller 170.

The camera 161 may include the image sensor (e.g., a CMOS or CCD) and the image processing module. In addition, the camera 161 may process a still image or moving image acquired by the image sensor. The image processing module may process a still image or moving image acquired by the image sensor. In addition, the camera 161 may acquire an image including at least one of traffic lights, traffic signs, pedestrians, other vehicles, and road surfaces.

The output unit 140 is configured to output information processed in the controller 170. The output unit 140 may include a display unit 141, a sound output unit 142, and a haptic output unit 143.

The display unit 141 may display information processed in the controller 170. For example, the display unit 141 may display vehicle associated information. Here, the vehicle associated information may include vehicle control information for the direct control of the vehicle surround monitoring device 100 or driver assistance information to guide the driver's vehicle driving. In addition, the vehicle associated information may include vehicle state information that indicates the current state of the vehicle or vehicle traveling information regarding the traveling of the vehicle.

The display unit 141 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 141 may configure an inter-layer structure along with a touch sensor or may be integrally formed with the touch sensor, so as to implement a touchscreen. The touchscreen may function as the user input unit 124 which provides an input interface between the vehicle surround monitoring device 100 and the user, and also function to provide an output interface between the vehicle surround monitoring device 100 and the user. In this case, the display unit 141 may include a touch sensor which senses a touch to the display unit 141 so as to receive a control command in a touch manner. When a touch is input to the display unit 141 as described above, the touch sensor may sense the touch and the controller 170 may generate a control command corresponding to the touch. Content input in a touch manner may be characters or numbers, or may be, for example, instructions in various modes or menu items that may be designated.

Meanwhile, the display unit 141 may include a cluster to allow the driver to check vehicle state information or vehicle traveling information while driving the vehicle surround monitoring device 100. The cluster may be located on a dashboard. In this case, the driver may check information displayed on the cluster while looking forward.

Meanwhile, in some embodiments, the display unit 141 may be implemented as a Head-up display (HUD). When the display unit 141 is implemented as a HUD, information may be output via a transparent display provided at the windshield. Alternatively, the display unit 141 may include a projector module to output information via an image projected to the windshield.

The sound output unit 142 is configured to convert electrical signals from the controller 170 into audio signals and to output the audio signals. To this end, the sound output unit 142 may include, for example, a speaker. The sound output unit 142 may output sound corresponding to the operation of the user input unit 124.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control the operation of various devices of the vehicle surround monitoring device 100. The vehicle drive unit 150 may include at least one of a power source drive unit 151, a steering drive unit 152, a brake drive unit 153, a lamp drive unit 154, an air conditioner drive unit 155, a window drive unit 156, an airbag drive unit 157, a sunroof drive unit 158, and a wiper drive unit 159.

The power source drive unit 151 may perform electronic control for a power source inside the vehicle surround monitoring device 100. The power source drive unit 151 may include an acceleration apparatus to increase the speed of the vehicle surround monitoring device 100 and a speed reduction apparatus to reduce the speed of the vehicle surround monitoring device 100.

For example, in the case where a fossil fuel based engine (not illustrated) is a power source, the power source drive unit 151 may perform electronic control for the engine. As such, the power source drive unit 151 may control, for example, an output torque of the engine. In the case where the power source drive unit 151 is the engine, the power source drive unit 151 may control the speed of the vehicle surround monitoring device 100 by controlling the output torque of the engine under the control of the controller 170.

In another example, in the case where an electric motor (not illustrated) is a power source, the power source drive unit 151 may perform control for the motor. As such, the power source drive unit 151 may control, for example, the RPM and torque of the motor.

The steering drive unit 152 may include a steering apparatus. Thus, the steering drive unit 152 may perform electronic control for a steering apparatus inside the vehicle surround monitoring device 100. For example, the steering drive unit 152 may include a steering torque sensor, a steering angle sensor, and a steering motor. The steering torque, applied to the steering wheel by the driver, may be sensed by the steering torque sensor. The steering drive unit 152 may control steering force and a steering angle by changing the magnitude and direction of current applied to the steering motor based on, for example, the speed and the steering torque of the vehicle surround monitoring device 100. In addition, the steering drive unit 152 may determine whether the direction of travel of the vehicle surround monitoring device 100 is correctly being adjusted based on steering angle information acquired by the steering angle sensor. As such, the steering drive unit 152 may change the direction of travel of the vehicle surround monitoring device 100. In addition, the steering drive unit 152 may reduce the sense of weight of the steering wheel by increasing the steering force of the steering motor when the vehicle surround monitoring device 100 travels at a low speed and may increase the sense of weight of the steering wheel by reducing the steering force of the steering motor when the vehicle surround monitoring device 100 travels at a high speed. In addition, when the autonomous driving function of the vehicle surround monitoring device 100 is executed, the steering drive unit 152 may control the steering motor to generate appropriate steering force based on, for example, the sensing signals output from the sensing unit 160 or control signals provided by the controller 170 even in the state in which the driver operates the steering wheel (i.e. in the state in which no steering torque is sensed).

The brake drive unit 153 may perform electronic control of a brake apparatus (not illustrated) inside the vehicle surround monitoring device 100. For example, the brake drive unit 153 may reduce the speed of the vehicle surround monitoring device 100 by controlling the operation of brakes located at wheels. In another example, the brake drive unit 153 may adjust the direction of travel of the vehicle surround monitoring device 100 leftward or rightward by differentiating the operation of respective brakes located at left and right wheels.

The lamp drive unit 154 may turn at least one lamp arranged inside and outside the vehicle surround monitoring device 100 on or off. The lamp drive unit 154 may include a lighting apparatus. In addition, the lamp drive unit 154 may control, for example, the intensity and direction of light of each lamp included in the lighting apparatus. For example, the lamp drive unit 154 may perform control for a turn signal lamp, a headlamp, or a brake lamp.

The air conditioner drive unit 155 may perform the electronic control of an air conditioner (not illustrated) inside the vehicle surround monitoring device 100. For example, when the interior temperature of the vehicle surround monitoring device 100 is high, the air conditioner drive unit 155 may operate the air conditioner to supply cold air to the interior of the vehicle surround monitoring device 100.

The window drive unit 156 may perform the electronic control of a window apparatus inside the vehicle surround monitoring device 100. For example, the window drive unit 156 may control the opening or closing of left and right windows of the vehicle surround monitoring device 100.

The airbag drive unit 157 may perform the electronic control of an airbag apparatus inside the vehicle surround monitoring device 100. For example, the airbag drive unit 157 may control an airbag to be deployed in a dangerous situation.

The sunroof drive unit 158 may perform the electronic control of a sunroof apparatus (not illustrated) inside the vehicle surround monitoring device 100. For example, the sunroof drive unit 158 may control the opening or closing of a sunroof.

The wiper drive unit 159 may perform the control of wipers 14a and 14b included in the vehicle surround monitoring device 100. For example, the wiper drive unit 159 may perform electronic control with regard to, for example, the number of operations and the speed of operation of the wipers 14a and 14b in response to user input upon receiving the user input that directs operation of the wipers 14a and 14b through the user input unit 124. In another example, the wiper drive unit 159 may determine the amount or strength of rainwater based on sensing signals of a rain sensor included in the sensing unit 160 so as to automatically operate the wipers 14a and 14b without the user input.

Meanwhile, the vehicle drive unit 150 may further include a suspension drive unit (not illustrated). The suspension drive unit may perform the electronic control of a suspension apparatus (not illustrated) inside the vehicle surround monitoring device 100. For example, in the case where the road surface is uneven, the suspension drive unit may control the suspension apparatus to reduce vibration of the vehicle surround monitoring device 100.

The memory 130 is electrically connected to the controller 170. The memory 130 may store basic data for each unit, control data for the operation control of the unit, and input/output data. The memory 130 may be any of various storage devices such as, for example, a ROM, a RAM, an EPROM, a flash drive, and a hard drive. The memory 130 may store various kinds of data for the overall operation of the vehicle surround monitoring device 100 such as, for example, programs for the processing or control of the controller 170.

The interface unit 180 may serve as a passage for various kinds of external devices that are connected to the vehicle surround monitoring device 100. For example, the interface unit 180 may have a port that is connectable to a mobile terminal and may be connected to the mobile terminal via the port. In this case, the interface unit 180 may exchange data with the mobile terminal.

The interface unit 180 may receive turn signal information. Here, the turn signal information may be a turn-on signal of a turn signal for left-turn or right-turn input by the user. When an input to turn on a left or right turn signal is input via the user input unit (124 of FIG. 1) of the vehicle surround monitoring device 100, the interface unit 180 may receive left-turn or right-turn signal information.

The interface unit 180 may receive vehicle speed information, steering wheel rotation angle information, or gearshift information. The interface unit 180 may receive vehicle speed information, steering wheel rotation angle information, or gearshift information sensed via the sensing unit 160 of the vehicle surround monitoring device 100. Alternatively, the interface unit 180 may receive vehicle speed information, steering wheel rotation angle information, or gearshift information from the controller 170 of the vehicle surround monitoring device 100. Meanwhile, here, gearshift information may be information related to the current gear position of the vehicle surround monitoring device 100. For example, gearshift information may be information regarding whether the gearshift is in any one of Park (P), Reverse (R), Neutral (N), and Drive (D), or numbered gears.

The interface unit 180 may receive user input via the user input unit 124 of the vehicle surround monitoring device 100. The interface unit 180 may receive user input from the input unit 120 of the vehicle surround monitoring device 100, or may receive user input by way of the controller 170.

The interface unit 180 may receive information acquired from the external appliance. For example, when traffic light change information is received from the external server via the communication unit 110 of the vehicle surround monitoring device 100, the interface unit 180 may receive the traffic light change information from the controller 170.

The controller 170 may control the overall operation of each unit inside the vehicle surround monitoring device 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power supply unit 190 may supply power required to operate the respective components under the control of the controller 170. In particular, the power supply unit 190 may receive power from, for example, a battery (not illustrated) inside the vehicle surround monitoring device 100.

An Audio Video Navigation (AVN) apparatus 400 may exchange data with the controller 170. The controller 170 may receive navigation information from the AVN apparatus or a separate navigation apparatus (not illustrated). Here, the navigation information may include set destination information, destination based routing information, and map information or vehicle location information related to vehicle traveling.

Meanwhile, some of the components illustrated in FIG. 1 may be not necessary to implement the vehicle surround monitoring device 100. Accordingly, the vehicle surround monitoring device 100 described in the present specification may include a greater or smaller number of components than those mentioned above.

Figure 2:
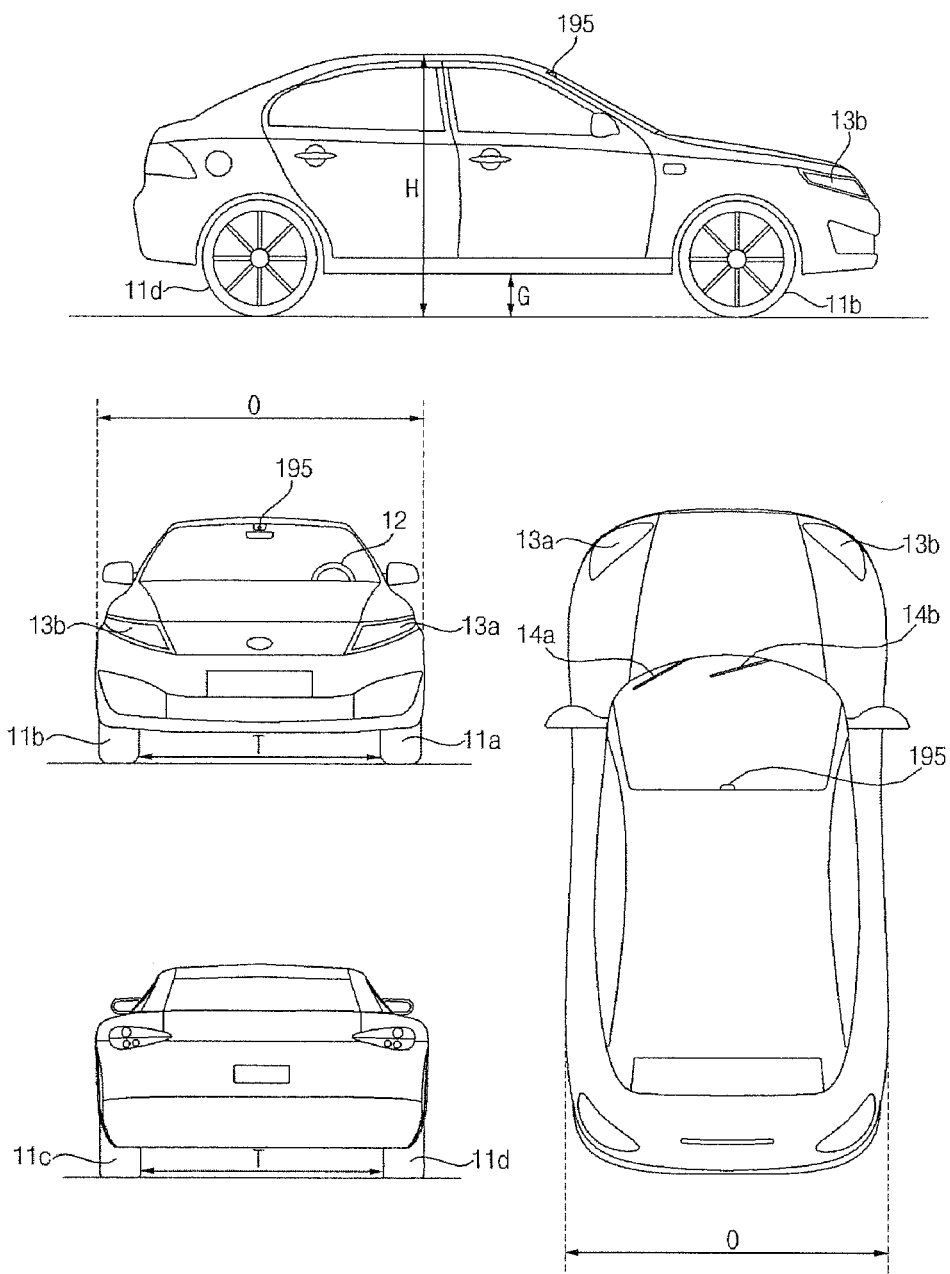
FIG. 2 is a view illustrating the external appearance of a vehicle according to one embodiment of the present invention, for convenience of description, the vehicle being assumed to be a four-wheeled vehicle.

FIG. 2 is a view illustrating the external appearance of the vehicle surround monitoring device 100 according to one embodiment of the present invention. For convenience of description, the vehicle surround monitoring device 100 is assumed to be a four-wheeled vehicle.

Referring to FIG. 2, the vehicle surround monitoring device 100 may include tires 11*a* to 11*d* which are rotated by a power source, a steering wheel 12 to adjust the direction of travel of the vehicle surround monitoring device 100, head lamps 13*a* and 13*b*, and wipers 14*a* and 14*b*.

The controller 170 of the vehicle surround monitoring device 100 according to the embodiment of the present invention may serve to generate a surround-view image of the vehicle surround monitoring device 100 using the camera 161, to detect information from the generated surround-view image, and to output a control signal, which is required to execute any operation related to the vehicle surround monitoring device 100 based on the detected information, to the drive unit 150. For example, the controller 170 may control a steering apparatus based on a control signal.

Meanwhile, the full height H of the vehicle surround monitoring device 100 is the distance from the tire thread to the uppermost point of the vehicle body, and may be changed within a prescribed range according to, for example, the weight or position of passengers or luggage in the vehicle surround monitoring device 100. In addition, the lowermost point of the body of the vehicle surround monitoring device 100 and the road surface may be spaced apart from each other by the minimum ground clearance G. This may prevent damage to the vehicle body due to any object having a lower height than the minimum ground clearance G.

In addition, the distance between the front left and right tires 11*a* and 11*b* and the distance between the rear left and right tires 11*c* and 11*d* of the vehicle surround monitoring device 100 are assumed as being equal to each other. Hereinafter, the distance between the inner side of the front-wheel left tire 11*a* and the inner side of the front-wheel right tire 11*b* and the distance between the inner side of the rear-wheel left tire 11*c* and the inner side of the rear-wheel right tire 11*d* are assumed as having the same value T.

In addition, the full width O of the vehicle surround monitoring device 100 is defined as the maximum distance from the leftmost point to the rightmost point of the body of the vehicle surround monitoring device 100 excluding side-view mirrors (e.g., electric folding type side-view mirrors).

Figure 3A:
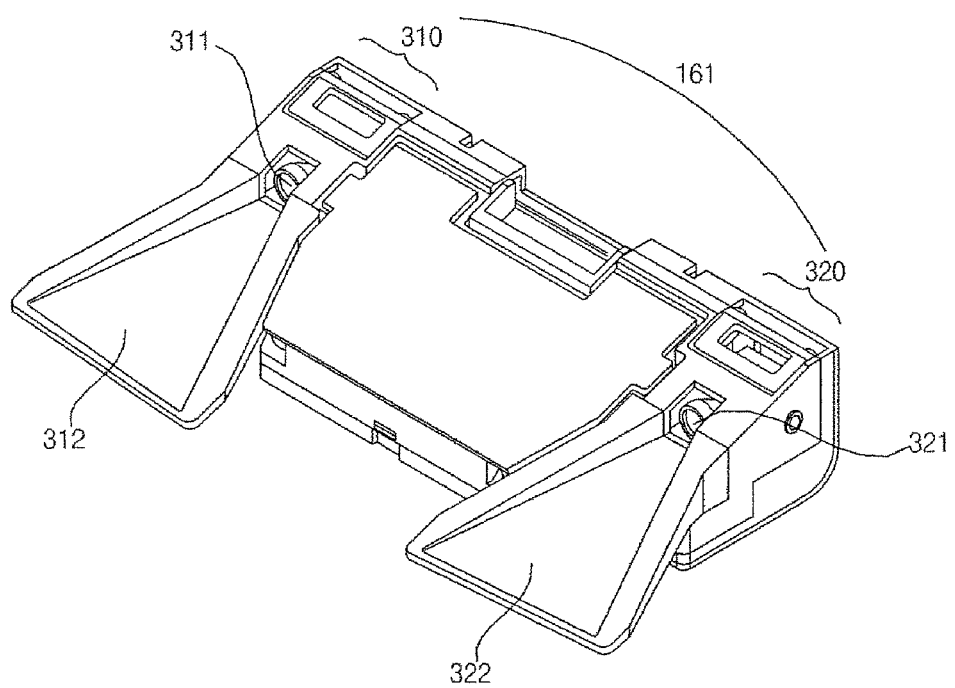
FIGS. 3A to 3C are views referenced to describe an external camera illustrated in FIG. 1.

FIG. 3A illustrated the case where the camera 161 described above with reference to FIG. 1 is a stereo-camera.

Referring to FIG. 3A, the camera 161 may include a first camera 310 having a first lens 311 and a second camera 320 having a second lens 321. In addition, the first lens 311 and the second lens 312 may be spaced apart from each other by a prescribed distance, so as to acquire different two images of the same object at a specific point in time.

In addition, the camera 161 may include a first light shield 312 and a second light shield 322, which shield light introduced to the first lens 311 and the second lens 321 respectively.

The camera 161 illustrated in FIG. 3A may have a structure for attachment or detachment to or from the ceiling or windshield of the vehicle surround monitoring device 100.

The camera 161 may acquire stereo images of the view in front of the vehicle surround monitoring device 100 from the first and second cameras 310 and 320. In addition, the camera 161 may perform binocular disparity detection based on the stereo images and then perform detection of at least one object (e.g., a pedestrian, a traffic light, a road, a traffic lane marker, and another vehicle) shown in at least one stereo image based on the binocular disparity information. After the object detection, the camera 161 may continuously track the movement of the object.

Figure 3B:
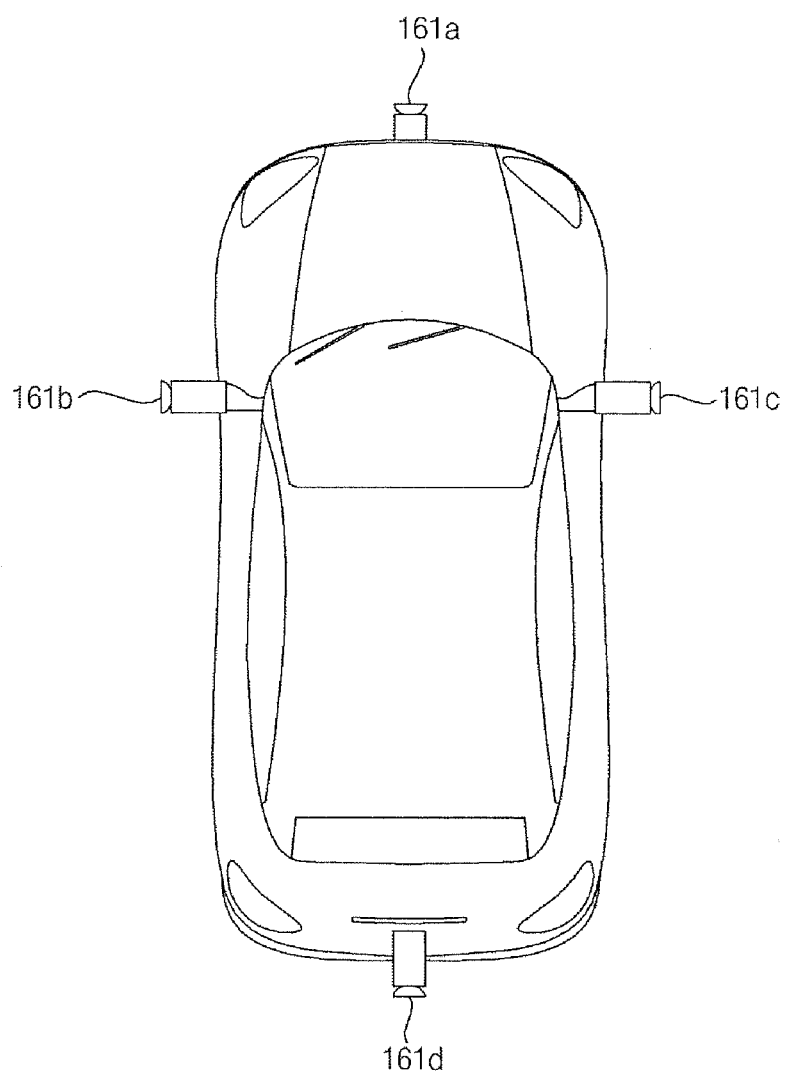
Figure 3C:
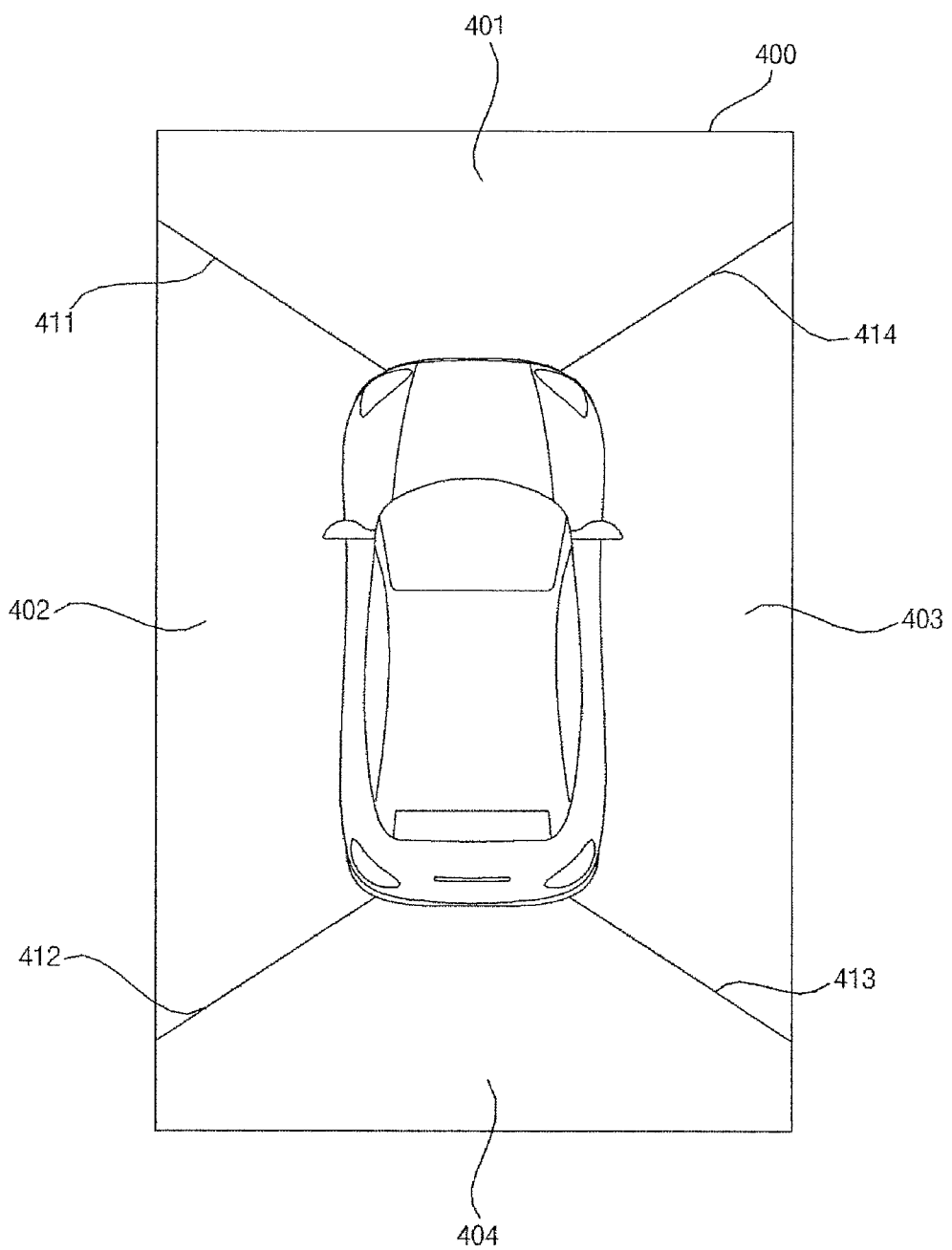

Referring to FIGS. 3B and 3C, four cameras 161*a*, 161*b*, 161*c* and 161*d* may be mounted at different positions on the exterior of the vehicle surround monitoring device 100. Each of the four cameras 161*a*, 161*b*, 161*c* and 161*d* may be the same as the camera 161 described above.

Referring to FIG. 3B, the cameras 161*a*, 161*b*, 161*c* and 161*d* may be located respectively on the front side, the left side, the right side, and the rear side of the vehicle surround monitoring device 100. Each of the cameras 161a, 161b, 161c and 161d may be included in the camera 161 illustrated in FIG. 1.

The front camera 161a may be located near a windshield, near an emblem, or near a radiator grill.

The left camera 161b may be located inside a case enclosing a left side-view mirror. Alternatively, the left camera 161b may be located at the exterior of the case enclosing the left side-view mirror. Yet alternatively, the left camera 161b may be located at a region of the exterior of a left front door, a left rear door, or a left fender.

The right camera 161c may be located inside a case enclosing a right side-view mirror. Alternatively, the right camera 161c may be located at the exterior of the case enclosing the right side-view mirror. Yet alternatively, the right camera 161c may be located at a region at the exterior of a right front door, a right rear door, or a right fender.

Meanwhile, the rear camera 161d may be located near a rear license plate or a trunk switch.

Respective images captured by the cameras 161a, 161b, 161c and 161d may be transmitted to the controller 170, and the controller 170 may compose the respective images to generate a surround-view image of the vehicle surround monitoring device 100.

In addition, although FIG. 3B illustrates the vehicle surround monitoring device 100 as including four cameras mounted to the exterior thereof, the present invention is not limited as to the number of cameras, and note that a greater or smaller number of cameras than those mentioned above may be located at different positions from the positions illustrated in FIG. 3B.

Referring to FIG. 3C, a composite image 400 may include a first image region 401 which corresponds to an external image captured by the front camera 161a, a second image region 402 which corresponds to an external image captured by the left camera 161b, a third image region 403 which corresponds to an external image captured by the right camera 161c, and a fourth image region 404 which corresponds to an external image captured by the rear camera 161d. The composite image 400 may be called an around view monitoring image.

Meanwhile, upon the generation of the composite image 400, boundary lines 411, 412, 413, and 414 are generated between respective two images included in the composite image 400. These boundaries may be subjected to image blending, for natural display thereof.

Meanwhile, the boundary lines 411, 412, 413 and 414 may be displayed at the boundaries between the respective images. In addition, the composite image 400 may include a predetermined image, indicating the vehicle surround monitoring device 100, at the center thereof.

In addition, the composite image 400 may be displayed via a display device mounted in the space inside the vehicle surround monitoring device 100.

Figure 4:
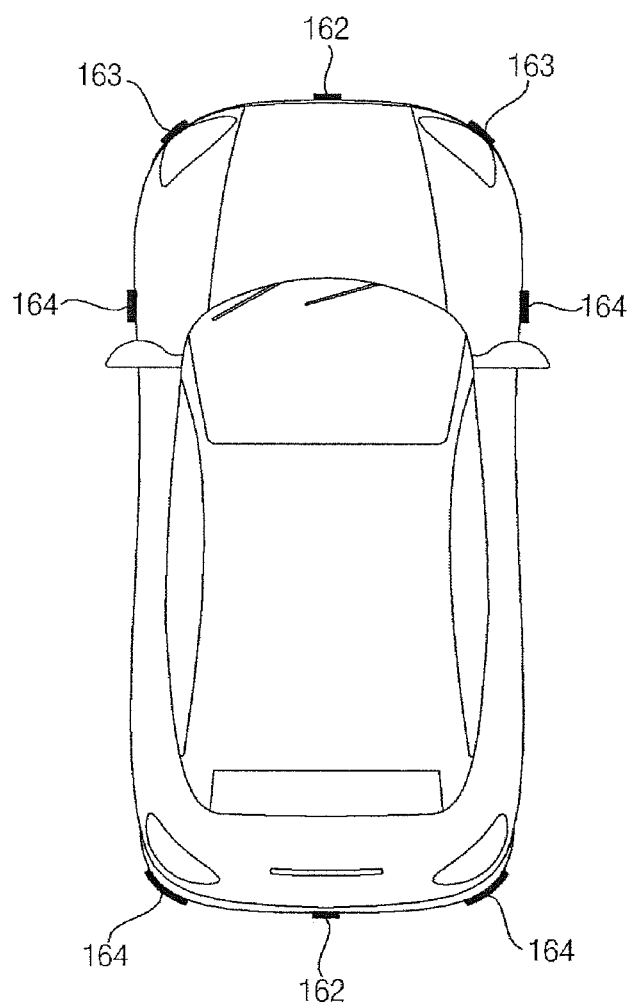
FIG. 4 is a view illustrating one example of the vehicle illustrated in FIG. 1, for convenience of description, the vehicle being assumed to be a four-wheeled vehicle.

FIG. 4 illustrates one example of the vehicle surround monitoring device 100 described above with reference to FIG. 1. For convenience of description, the vehicle surround monitoring device 100 is assumed to be a four-wheeled vehicle.

Referring to FIG. 4, the vehicle surround monitoring device 100 may include at least one of the radar 162, the LiDAR 163, and the ultrasonic sensors 164.

The radar 162 may be mounted at one side of the vehicle surround monitoring device 100, and serve to emit electromagnetic waves to the vicinity of the vehicle surround monitoring device 100 and to receive the electromagnetic waves reflected from a variety of objects that are present in the vicinity of the vehicle surround monitoring device 100. For example, the radar 162 may acquire information related to, for example, the distance, direction, and height of any one object by measuring the time taken until the electromagnetic waves reflected by the corresponding object return thereto.

The LiDAR 163 may be mounted at one side of the vehicle surround monitoring device 100, and serve to emit laser light in the vicinity of the vehicle surround monitoring device 100. The laser light, emitted by the LiDAR 163, may be scattered or reflected to thereby return to the vehicle surround monitoring device 100. The LiDAR 163 may acquire information related to physical properties such as, for example, the distance, speed, and shape of a target, which is located in the vicinity of the vehicle surround monitoring device 100, based on the time taken until the laser returns, the strength of the laser light, variation in frequency, and variation in polarization.

The ultrasonic sensor 164 may be mounted at one side of the vehicle surround monitoring device 100, and serve to generate ultrasonic waves in the vicinity of the vehicle surround monitoring device 100. The ultrasonic waves, generated by the ultrasonic sensor 164, have properties of a high frequency (approx. 20 KHz or higher) and short wavelength. The ultrasonic sensor 164 may be mainly used to recognize, for example, an obstacle close to the vehicle surround monitoring device 100.

The radar 162, the LiDAR 163, and the ultrasonic sensor 164, illustrated in FIG. 4, may be sensors included in the sensing unit 160 illustrated in FIG. 1. In addition, it will be clear to those skilled in the art that, in some embodiments, the radar 162, the LiDAR 163, and the ultrasonic sensor 164 may be mounted in different numbers and at different positions from those illustrated in FIG. 4.

Figure 5:
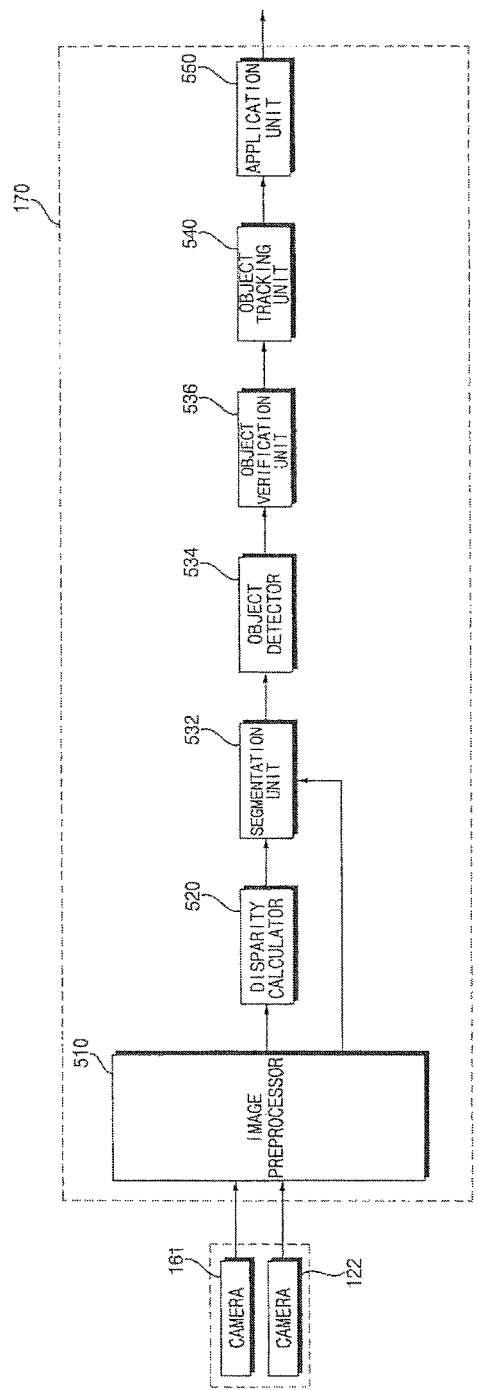
FIG. 5 is an exemplary block diagram illustrating the interior configuration of a controller illustrated in FIG. 1.

FIG. 5 is an exemplary block diagram illustrating the interior configuration of the controller 170 illustrated in FIG. 1.

Referring to FIG. 5, the controller 170 may include an image preprocessor 510, a disparity calculator 520, a segmentation unit 532, an object detector 534, an object verification unit 536, an object tracking unit 540, and an application unit 550.

The image processor 510 may receive images provided from the cameras 161 and 122 illustrated in FIG. 1 and perform preprocessing of the images.

Specifically, the image preprocessor 510 may perform, for example, noise reduction, rectification, calibration, color enhancement, Color Space Conversion (CSC), interpolation, and camera gain control for the images. As such, the image preprocessor 510 may acquire an image more vivid than the stereo images captured by the cameras 161 and 122.

The disparity calculator 520 may receive the images signal-processed by the image preprocessor 510, perform stereo matching for the received images, and acquire a disparity map based on the stereo matching. That is, the disparity calculator 520 may acquire disparity information related to a view in front of the vehicle surround monitoring device 100.

At this time, the stereo matching may be performed on a per pixel basis or on a per prescribed block basis of the stereo images. Meanwhile, the disparity map may mean a map showing binocular parallax information between stereo images, i.e left and right images as numerical values.

The segmentation unit 532 may perform segmentation and clustering in the images based on the disparity information from the disparity calculator 520.

Specifically, the segmentation unit 532 may segment at least one of the stereo images into a background and a foreground based on the disparity information.

For example, a region having a predetermined value or less of the disparity information in the disparity map may be calculated as a background, and the region may be excluded. As a result, a foreground may be relatively separated from the image.

In another example, a region having a predetermined value or more of the disparity information in the disparity map may be calculated as a foreground, and the region may be extracted. As a result, the foreground may be separated from the image.

As described above, as the foreground and the background are separated based on the disparity information extracted based on the stereo images, for example, signal processing speed and signal processing amount may be reduced during detection of an object.

Subsequently, the object detector 534 may detect an object based on an image segment from the segmentation unit 532.

That is, the object detector 534 may detect an object for at least one of the images based on the disparity information.

Specifically, the object detector 534 may detect an object for at least one of the images. For example, the object detector 534 may detect an object from a foreground separated from the image by the image segment.

Subsequently, the object verification unit 536 may classify and verify the separated object.

To this end, the object verification unit 536 may use, for example, an identification method using a neural network, a Support Vector Machine (SVM) method, an AdaBoost identification method using a Harr-like feature, or a Histograms of Oriented Gradients (HOG) method.

Meanwhile, the object verification unit 536 may compare the detected object with objects stored in the memory 130 to verify the detected object.

For example, the object verification unit 536 may verify an adjacent vehicle, a traffic lane marker, road surface, a traffic sign, a dangerous zone, and a tunnel, located around the vehicle surround monitoring device 100.

The object tracking unit 540 may track the verified object. For example, the object tracking unit 540 may sequentially verify an object in the acquired stereo images, calculate motion or a motion vector of the verified object, and track movement of the object based on the calculated motion or the calculated motion vector. Consequently, the object tracking unit 540 may track, for example, an adjacent vehicle, a traffic lane marker, road surface, a traffic sign, a dangerous area, and a tunnel located around the vehicle surround monitoring device 100.

Subsequently, the application unit 550 may calculate, for example, the accident risk of the vehicle surround monitoring device 100 based on various objects (e.g. other vehicles, traffic lane markers, road surface, and traffic signs) located around the vehicle surround monitoring device 100. In addition, the application unit 550 may calculate the possibility of head-on collision with a preceding vehicle and whether or not loss of traction occurs.

In addition, the application unit 550 may output, for example, a message to notify a user of driver assistance information such as, for example, the calculated risk, collision possibility, or traction loss. Alternatively, the application unit 550 may generate a control signal, as vehicle control information, for the attitude control or traveling control of the vehicle surround monitoring device 100.

Meanwhile, in some embodiments, some of the image preprocessor 510, the disparity calculator 520, the segmentation unit 532, the object detector 534, the object verification unit 536, the object tracking unit 540, and the application unit 550 may be included in the controller 170. In the case where the cameras 161 and 122 provide only 2-dimensional (2D) images, the disparity calculator 520 may be excluded.

Figure 6A:
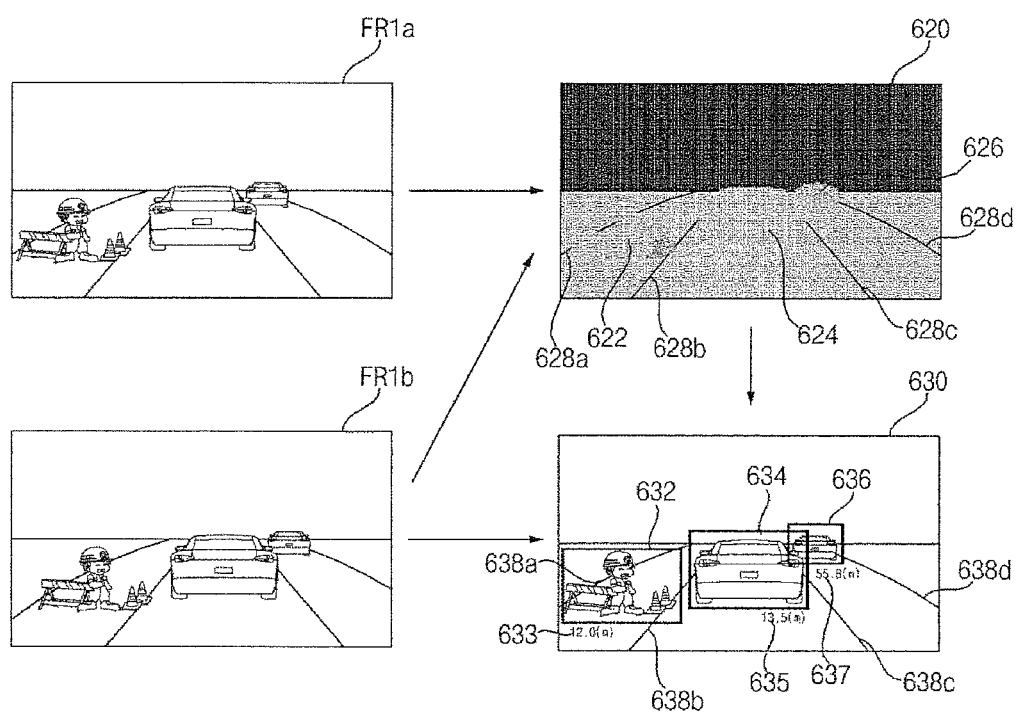
FIGS. 6A and 6B are views referenced to describe the operation of the controller illustrated in FIG. 5.
Figure 6B:
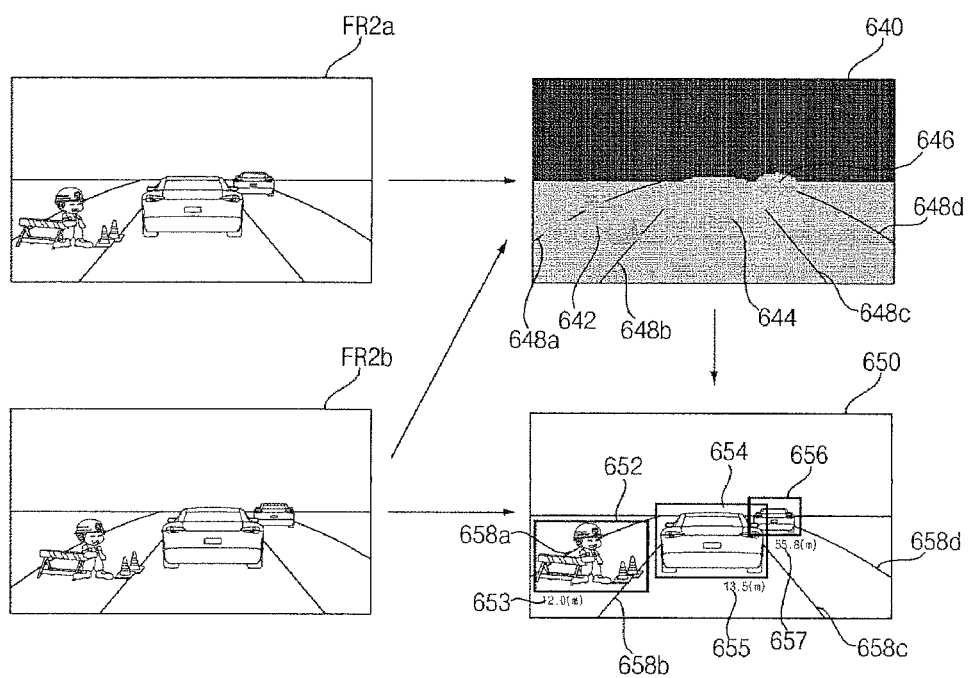

FIGS. 6A and 6B are views referenced to describe the operation of the controller 170 illustrated in FIG. 5.

FIGS. 6A and 6B are views referenced to explain an operation method of the controller 170 illustrated in FIG. 5 based on stereo images acquired respectively from first and second frame periods.

Referring first to FIG. 6A, when the camera 161 is a stereo-camera, the camera 161 acquires stereo images during a first frame period.

The disparity calculator 520 included in the controller 170 receives stereo images FR1a and FR1b signal-processed by the image preprocessor 510 and performs stereo matching for the received stereo images FR1a and FR1b to acquire a disparity map 620.

The disparity map 620 shows a binocular disparity between the stereo images FR1a and FR1b as levels. As the disparity level is higher, the distance from the vehicle surround monitoring device 100 may be calculated as being shorter. As the disparity level is lower, the distance from the vehicle surround monitoring device 100 may be calculated as being longer.

Meanwhile, when the disparity map is displayed, the disparity map may be displayed with higher brightness as the disparity level is higher and displayed with lower brightness as the disparity level is lower.

FIG. 6A illustrates, by way of example, that, in the disparity map 620, first to fourth traffic lane markers 628a, 628b, 628c, and 628d have their own disparity levels and a roadwork zone 622, a first preceding vehicle 624, and a second preceding vehicle 626 have their own disparity levels.

The segmentation unit 532, the object detector 534, and the object verification unit 536 respectively perform segmentation, object detection, and object verification for at least one of the stereo images FR1a and FR1b based on the disparity map 620.

FIG. 6A illustrates, by way of example, that object detection and object verification for the second stereo image FR1b are performed using the disparity map 620.

That is, object detection and object verification for first to fourth traffic lane markers 638a, 638b, 638c, and 638d, a roadwork zone 632, a first preceding vehicle 634, and a second preceding vehicle 636 in an image 630 may be performed.

Subsequently, referring to FIG. 6B, the stereo camera 161 acquires stereo images during a second frame period.

The disparity calculator 520 included in the controller 170 receives stereo images FR2a and FR2b signal-processed by the image preprocessor 610 and performs stereo matching for the received stereo images FR2a and FR2b to acquire a disparity map 640.

FIG. 6B shows, by way of example, that, in the disparity map 640, first to fourth traffic lane markers 648a, 648b, 648c, and 648d have their own disparity levels and a roadwork zone 642, a first preceding vehicle 644, and a second preceding vehicle 646 have their own disparity levels.

The segmentation unit 532, the object detector 534, and the object verification unit 536 respectively perform segmentation, object detection, and object verification for at least one of the stereo images FR2a and FR2b based on the disparity map 640.

FIG. 6B shows, by way of example, that object detection and object verification for the second stereo image FR2b are performed using the disparity map 640.

That is, object detection and object verification for first to fourth traffic lane markers 658a, 658b, 658c, and 658d, a roadwork zone 652, a first preceding vehicle 654, and a second preceding vehicle 656 in an image 650 may be performed.

Meanwhile, the object tracking unit 540 may track verified objects by comparing FIGS. 6A and 6B with each other.

Specifically, the object tracking unit 540 may track, for example, movement of an object based on the motion or motion vectors of respective objects verified from FIGS. 6A and 6B. As such, the object tracking unit 540 may track, for example, traffic lane markers, a roadwork zone, a first preceding vehicle and a second preceding vehicle, which are located around the vehicle surround monitoring device 100.

Figure 7:
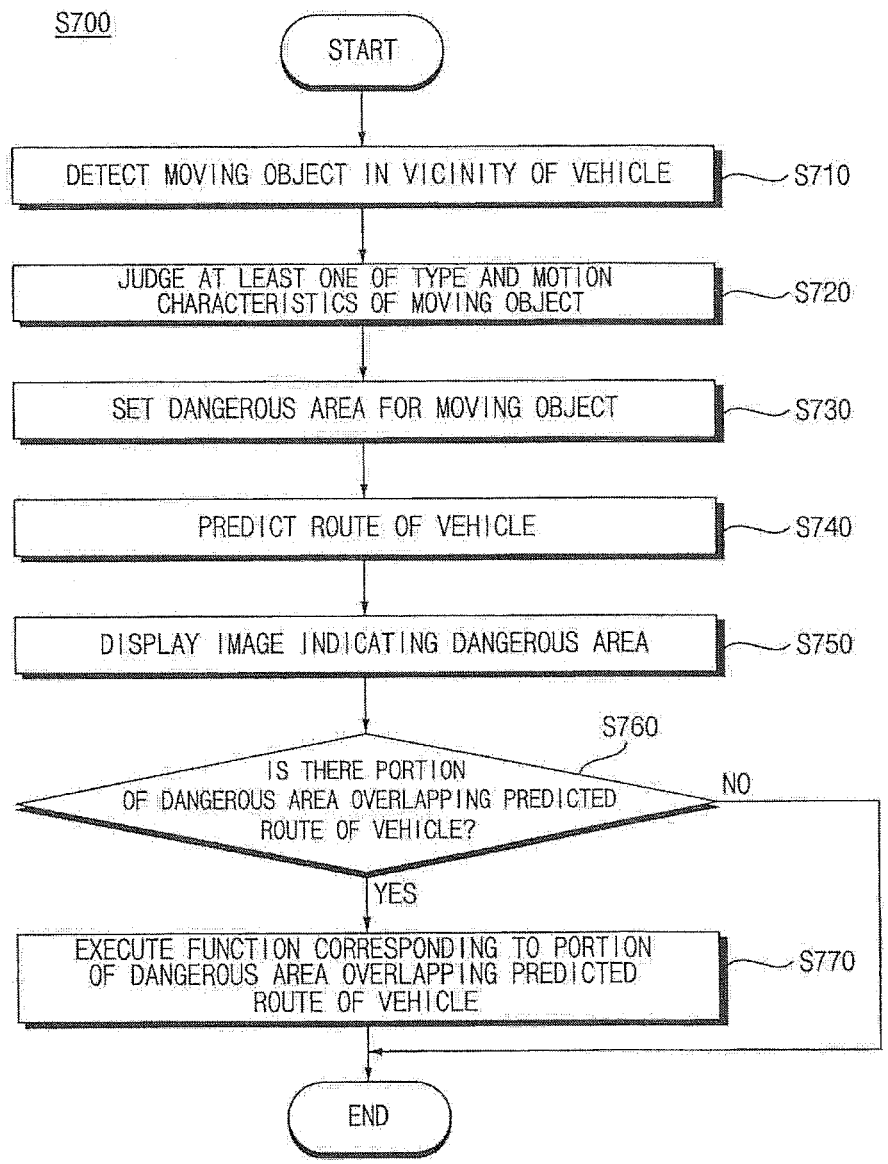
FIG. 7 is a flowchart illustrating an exemplary process to be performed by the vehicle according to one embodiment of the present invention.

FIG. 7 is a flowchart illustrating an exemplary process S700 to be performed by the vehicle surround monitoring device 100 according to one embodiment of the present invention.

Referring to FIG. 7, in Step S710, the vehicle surround monitoring device 100 may detect moving objects in the vicinity of the vehicle surround monitoring device 100. Here, the expression "the moving objects in the vicinity of the vehicle surround monitoring device 100" may mean moving objects located within a predetermined distance from the vehicle surround monitoring device 100.

Specifically, at least one of the camera 161, the radar 162, the LiDAR 163, and the ultrasonic sensor 164, included in the sensing unit 160, may detect objects that are present in the environment surrounding the vehicle surround monitoring device 100, and may provide the controller 170 with sensing information related to the detected objects. For example, the sensing information provided from the sensing unit 160 may include a 3D image of the surrounding environment captured by the camera 161. Objects that may be detected by the sensing unit 160 may include, for example, other vehicles, motorcycles, bicycles, pedestrians, fallen objects, animals, buildings, traffic lights, road signs, and traffic lane markers.

In Step S720, the vehicle surround monitoring device 100 may determine at least one of the type and motion characteristics of each moving object. Simultaneously, the controller 170 of the vehicle surround monitoring device 100 may determine the location of the moving object and the distance between the moving object and the vehicle surround monitoring device 100 based on the sensing information provided from the sensing unit 160.

Specifically, the controller 170 may classify the respective objects present in the environment surrounding the vehicle surround monitoring device 100 as any one of a moving object and a stationary object based on the sensing information provided from the sensing unit 160.

For example, the controller 170 may classify, among the objects present in the surrounding environment, an object that is moving at a prescribed speed or more (e.g. 1 m/s) as a moving object, and an object that is moving at a speed below the prescribed speed (e.g. 1 m/s) or is stationary as a stationary object. For example, when another vehicle in the vicinity of the vehicle surround monitoring device 100 is stationary, the vehicle surround monitoring device 100 may classify the other vehicle as a stationary object.

The controller 170 may determine the type of the moving object based on the sensing information. For example, the controller 170 may determine the type of the detected moving object by extracting the contour of the moving object from the 3D image included in the sensing information to check the external appearance of the moving object, and comparing the checked external appearance with pre-stored templates. In another example, the controller 170 may determine the type of the moving object using, for example, a Histogram of Oriented Gradient (HOG) method.

The memory 130 may store templates on a per-object-type basis, and the controller 170 may determine the type of the detected moving object by comparing the external appearance of the detected moving object with the templates prestored in the memory 130 on a per-object-type basis. For example, the controller 170 may determine that the detected moving object is any one of another vehicle, a motorcycle, a bicycle, and a pedestrian.

The controller 170 may determine the motion characteristics of the moving object based on the sensing information. Specifically, the motion characteristics of the moving object may include information related to the speed and movement direction of the moving object.

In addition, the controller 170 may predict the future speed and movement direction of the moving object based on the speed variation and the movement route of the moving object during the most recent prescribed amount of time.

In addition, the controller 170 may predict the future movement direction of the moving object based on variation in at least one of the position, speed, and direction of a plurality of points on the moving object. For example, when the type of the moving object is a bicycle, the controller 170 may simultaneously track any one point located in a wheel region of the bicycle, any one point located in a handle region, and any one point located in the region of the head of the bicycle rider, and may predict the movement speed and direction of the bicycle during the next second based on variation in at least one of the position, speed, and movement direction of the tracked points.

In Step S730, the vehicle surround monitoring device 100 may set a dangerous area for the moving object. Specifically, the vehicle surround monitoring device 100 may set the dangerous area for the moving object based on at least one of the type and motion characteristics of the moving object determined in Step S720. In addition, the controller 170 may set the dangerous area for the moving object based on the predicted movement direction of the moving object.

At this time, the dangerous area may change in size or shape according to, for example, the type, motion characteristics, or predicted movement direction of the moving object. That is, the controller 170 may change at least one of the shape and size of the dangerous area for the moving object, either in real time or periodically, based on at least one of the type, motion characteristics, and predicted movement direction of the moving object.

Meanwhile, the dangerous area may include a plurality of sub areas. At this time, the number of sub areas included in the dangerous area may be predetermined. For example, the controller 170 may determine the number of sub areas into which the dangerous area will be divided in response to user input received via the input unit.

In addition, the controller 170 may set different numbers of sub areas on a per-moving-object-type basis in response to a predetermined criterion or user input. For example, the controller 170 may divide the dangerous area of the other vehicle into three sub areas, and may divide the dangerous area of the bicycle into two sub areas.

The respective sub areas may indicate ranges within which the moving object can move during different time periods. For example, any one of the sub areas may indicate a range within which the moving object can move during a period of one second from the present, and another of the sub areas may indicate a range within which the moving object can move during subsequent one second. The controller 170 may set or change at least one of the shape and size of each sub area based on at least one of the type, motion characteristics, and predicted movement direction of the moving object.

In addition, the controller 170 may set or change a dangerous area for the moving object based on the illumination outside the vehicle surround monitoring device 100. For example, assuming that other conditions are the same, the controller 170 may increase the size of the dangerous area for the moving object as the illumination outside the vehicle surround monitoring device 100 is reduced. This is because the driver of the vehicle surround monitoring device 100 takes a relatively long time to recognize the risk of a collision with a moving object in a dark environment.

Meanwhile, the controller 170 may set a dangerous area for the moving object only when the type of the moving object corresponds to a type that is predesignated by the user. Specifically, the user can predesignate only a desired type for which the user wishes to receive guidance. For example, the user may select some of a plurality of types via the input unit 120 illustrated in FIG. 1. The controller 170 may not set a dangerous area for the moving object when the type of the moving object detected by the sensing unit 160 does not correspond to the predesignated type.

In Step S740, the vehicle surround monitoring device 100 may predict the route of the vehicle surround monitoring device 100.

In one embodiment, the controller 170 may predict the route along which the vehicle surround monitoring device 100 will travel within a prescribed time based on the speed and movement direction of the vehicle surround monitoring device 100 provided from the sensing unit 160. For example, when the vehicle surround monitoring device 100 is driving straight at m/s, the controller 170 may predict that the vehicle surround monitoring device 100 will travel through the area of the road from the current position to 30 m ahead within the next three seconds.

In one embodiment, the vehicle surround monitoring device 100 may be traveling along a found route to a destination that is input from the user. In this case, the controller 170 may predict the route along which the vehicle surround monitoring device 100 will travel within a prescribed time, which is a portion of the entire found route to the destination, based on the motion characteristics of the vehicle surround monitoring device 100 including the speed and the movement direction.

In Step S750, the vehicle surround monitoring device 100 may display an image indicating the dangerous area set in Step S730. Specifically, the controller 170 may display an image indicating the dangerous area for the moving object via the display unit 141. In this case, the controller 170 may display, on the display unit 141, an image indicating the route predicted in Step S740, along with an image indicating the dangerous area for the moving object.

As described above, when the dangerous area includes the sub areas, the controller 170 may display, on the display unit 141, the respective sub areas so as to make them distinguishable from one another. For example, the display unit 141 may display the sub areas in different colors, widths, patterns, chroma, opacities, fading, and flashing intervals.

In one embodiment, the vehicle surround monitoring device 100 may display, on the display unit 141, at least one of the image indicating the dangerous area and the image indicating the predicted route in an augmented-reality mode or a top-view mode. For example, the vehicle surround monitoring device 100 may select the augmented-reality mode or the top-view mode in response to user input, and may display at least one of the image which indicates the dangerous area and the image which indicates the predicted route in the selected mode.

In one embodiment, the vehicle surround monitoring device 100 may display, in the augmented-reality mode, the image indicating the dangerous area at a position close to the actual position of the moving object, which is checked through the windshield of the vehicle surround monitoring device 100. For example, the vehicle surround monitoring device 100 may display the image indicating the dangerous area on the windshield via a head-up display (see reference numeral 141*b* in FIG. 14B) or a transparent display (see reference numeral 141*c* in FIG. 14B).

In another example, the vehicle surround monitoring device 100 may display, in the top-view mode, the image indicating the dangerous area on a map stored in the memory 130. For example, the map, on which the image indicating the dangerous area is displayed, may be displayed on a navigation display (see reference numeral 141*a* in FIG. 13).

Meanwhile, the controller 170 may adjust, in the top-view mode, the scale of the map based on congestion around the vehicle surround monitoring device 100. In one embodiment, the controller 170 may estimate the total number of objects located in the environment surrounding the vehicle surround monitoring device 100 based on the sensing signal provided from the sensing unit 160, and may calculate congestion around the vehicle surround monitoring device 100 based on the estimated total number of objects. For example, the controller 170 may calculate the congestion around the vehicle surround monitoring device 100 in proportion to the total number of the objects located in the environment surrounding the vehicle surround monitoring device 100.

For example, the controller 170 may reduce the scale of the map displayed on the display unit 141 in the top-view mode as the congestion around the vehicle surround monitoring device 100 is higher, i.e. as the total number of objects in the vicinity of the vehicle surround monitoring device 100 is greater. Conversely, the controller 170 may increase the scale of the map displayed on the display unit 141 in the top-view mode as the congestion around the vehicle surround monitoring device 100 is lower, i.e. as the total number of objects in the vicinity of the vehicle surround monitoring device 100 is smaller. In this way, since the scale of the map is reduced in congested areas (e.g. an intersection during afternoon rush hour), the driver of the vehicle surround monitoring device 100 may more easily check moving objects that are closer to the vehicle surround monitoring device 100 than others objects.

In Step S760, the vehicle surround monitoring device 100 may determine whether the predicted route of the vehicle surround monitoring device 100 overlaps a portion of the dangerous area set for the moving object. For example, the controller 170 may determine whether the predicted route of the vehicle surround monitoring device 100 overlaps any one of the sub areas included in the dangerous area.

Upon judging that a portion of the dangerous area set for the moving object overlaps the predicted route of the vehicle surround monitoring device 100, Step S770 may be performed. On the other hand, upon judging that no portion of dangerous area set for the moving object overlaps the predicted route of the vehicle surround monitoring device 100, the controller 170 may determine that the risk of a collision between the vehicle surround monitoring device 100 and the moving object is zero or is very low, thereby ending the process S700.

In Step S770, the vehicle surround monitoring device 100 may execute a function corresponding to the portion of the dangerous area set for the moving object that overlaps the predicted route of the vehicle surround monitoring device 100. Specifically, the vehicle surround monitoring device 100 may execute at least one of a plurality of predetermined functions based on the sub area that overlaps the predicted route of the vehicle surround monitoring device 100. For example, the predetermined functions may include at least one of (i) output of a visual or auditory warning to the driver of the vehicle surround monitoring device 100, (ii) control of the speed-reduction apparatus of the vehicle surround monitoring device 100, (iii) control of the steering apparatus of the vehicle surround monitoring device 100, and (iv) control of the lighting apparatus of the vehicle surround monitoring device 100. The predetermined functions may be set to defaults, or may be set in response to user input.

In one embodiment, a data table, in which the corresponding relationship between the respective sub areas included in the dangerous area and the predetermined functions is recorded, may be stored in the memory 130. At this time, two or more functions may correspond to any one sub area.

For example, in the data table, any one sub area may be associated with a first function, and another sub area may be associated with a second function. In another example, in the data table, any one sub area may be associated with a first function, and another sub area may be associated with the first function and a second function. When one of the sub areas associated with the first function overlaps the predicted route of the vehicle surround monitoring device 100, the controller 170 may execute the first function based on the data table. On the other hand, when one of the sub areas associated with the second function overlaps the predicted route of the vehicle surround monitoring device 100, the controller 170 may execute the second function based on the data table.

Meanwhile, the controller 170 may adjust, based on the distance between the vehicle surround monitoring device 100 and the sub area that overlaps the predicted route of the vehicle surround monitoring device 100, control parameters (e.g. braking force, steering angle, the volume of a warning sound, the size or brightness of a warning message, the strength of light beams output from headlights, and the volume of a horn) with regard to the function corresponding to the sub area that overlaps the predicted route of the vehicle surround monitoring device 100. For example, when the function of braking the vehicle surround monitoring device 100 (e.g. a braking assistance function or an emergency braking function) corresponding to any one sub area is executed, the vehicle surround monitoring device 100 may generate greatetr braking force as the distance between the vehicle surround monitoring device 100 and the corresponding sub area is reduced. In another example, when the function of automatically steering the vehicle surround monitoring device 100 corresponding to another sub area is executed, the vehicle surround monitoring device 100 may set a greater steering angle as the distance between the vehicle surround monitoring device 100 and the corresponding sub area is reduced.

Although the steps included in the process S700 described above with reference to FIG. 7 are sequentially described, in some embodiments, the steps may be performed in a different sequence from that illustrated in FIG. 7. For example, any one step included in the process S700 may be performed in parallel with another step. In addition, additional step(s) may further be included in the process S700.

Figure 8B:
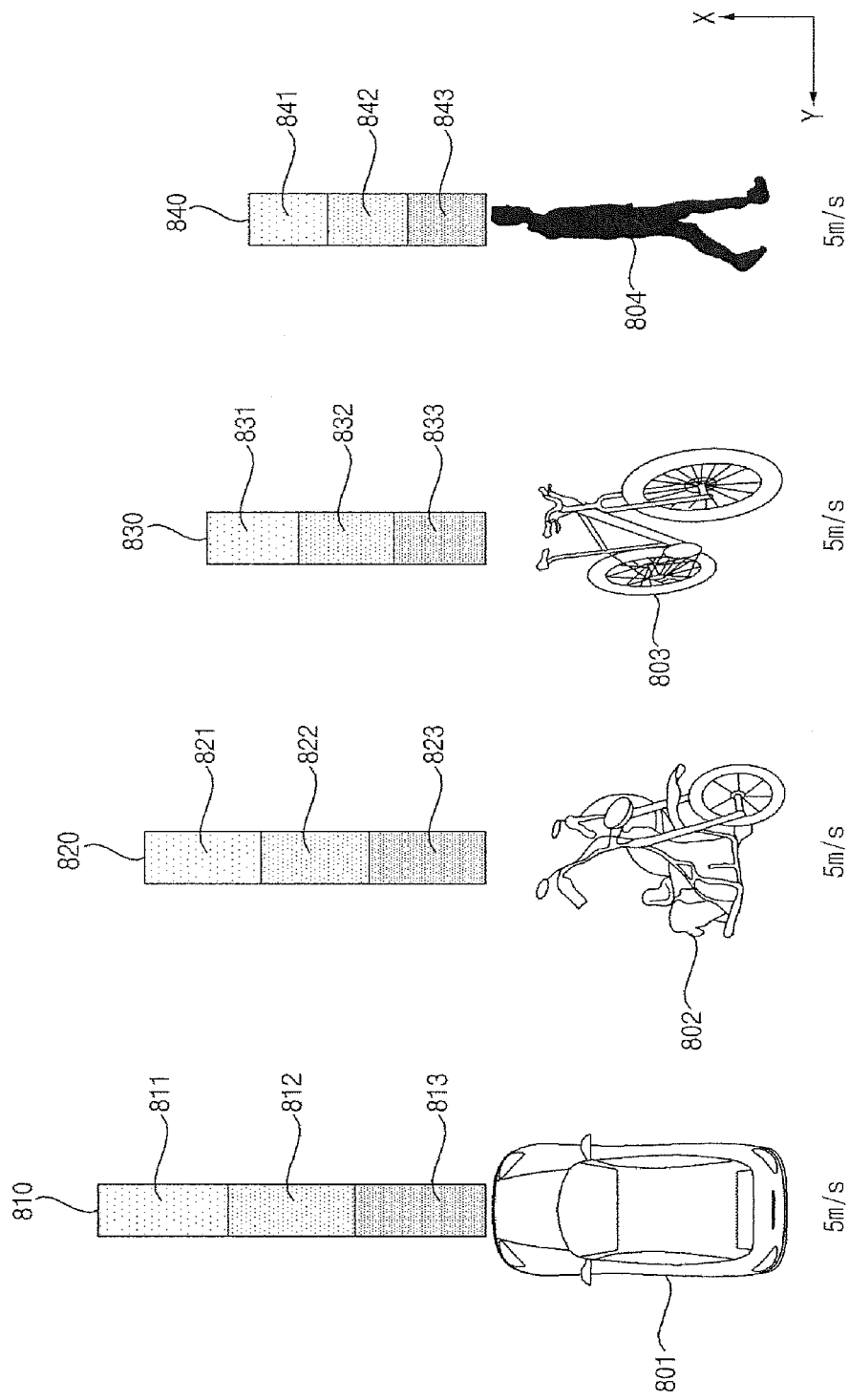

FIGS. 8A and 8B are views illustrating one example of a dangerous area set on a per-moving-object-type basis according to one embodiment of the present invention.

Referring first to FIG. 8A, the controller 170 may set a bar-shaped dangerous area for a moving object based on the motion characteristics and type of the moving object.

It is assumed that the sensing unit 160 detects another vehicle 801, a motorcycle 802, a bicycle 803, and a pedestrian 804, which are moving at the same speed (e.g. 5 m/s) in the same movement direction (e.g. the X-axis).

The memory 130 may previously store the maximum speed, the maximum acceleration, and the minimum turning radius on a per-moving-object-type basis, and the controller 170 may set a dangerous area for each moving object based on the maximum speed and the maximum acceleration as well as the motion characteristics and the type of the moving object. For example, the maximum speed and the maximum acceleration on a per-object-type basis may be lowered in the sequence of the other vehicle 801, the motorcycle 802, the bicycle 803, and the pedestrian 804. In another example, the minimum turning radius on a per-object-type basis may be reduced in the sequence of the other vehicle 801, the motorcycle 802, the bicycle 803, and the pedestrian 804.

As illustrated, even if the other vehicle 801, the motorcycle 802, the bicycle 803, and the pedestrian 804 have the same speed (e.g. 5 m/s), the controller 170 may set, based on the maximum speed and the maximum acceleration on a per-object-type basis stored in the memory 130, the longest dangerous area 810 for the other vehicle 801, the second longest dangerous area 820 for the motorcycle 802, the third longest dangerous area 830 for the bicycle 803, and the shortest dangerous area 840 for the pedestrian 804.

Of course, the maximum speed, the maximum acceleration, and the minimum turning radius on a per-object-type basis may be stored in a manner different from the above example.

Next, referring to FIG. 8B, the controller 170 may divide the dangerous area for each moving object into two or more sub areas. That is, the dangerous area may include two or more sub areas. As exemplarily illustrated in FIG. 8B, each of the four dangerous areas 810, 820, 830 and 840 may include three sub areas. Specifically, the dangerous area 810 for the other vehicle 801 may include first to third sub areas 811 to 813. In addition, the dangerous area 820 for the motorcycle 802 may include first to third sub areas 821 to 823. In addition, the dangerous area 830 for the bicycle 803 may include first to third sub areas 831 to 833. In addition, the dangerous area 840 for the pedestrian 804 may include first to third sub areas 841 to 843.

At this time, the respective sub areas for each moving object may indicate the distances by which the respective moving objects can move during different time periods. For example, in the case of the other vehicle 801, the sub area 813 may indicate the predicted distance, by which the other vehicle 801 will travel at 5 m/s during the next second, the sub area 812 may indicate the predicted distance that the other vehicle 801 can travel at 5 m/s during a one-second interval starting one second from the present, and the sub area 811 may indicate the predicted distance that the other vehicle 801 can travel at 5 m/s during the second after that.

In another example, the sub area 823 for the motorcycle 802 may indicate the predicated distance that the motorcycle 802 can travel at 5 m/s during the next second.

Figure 9:
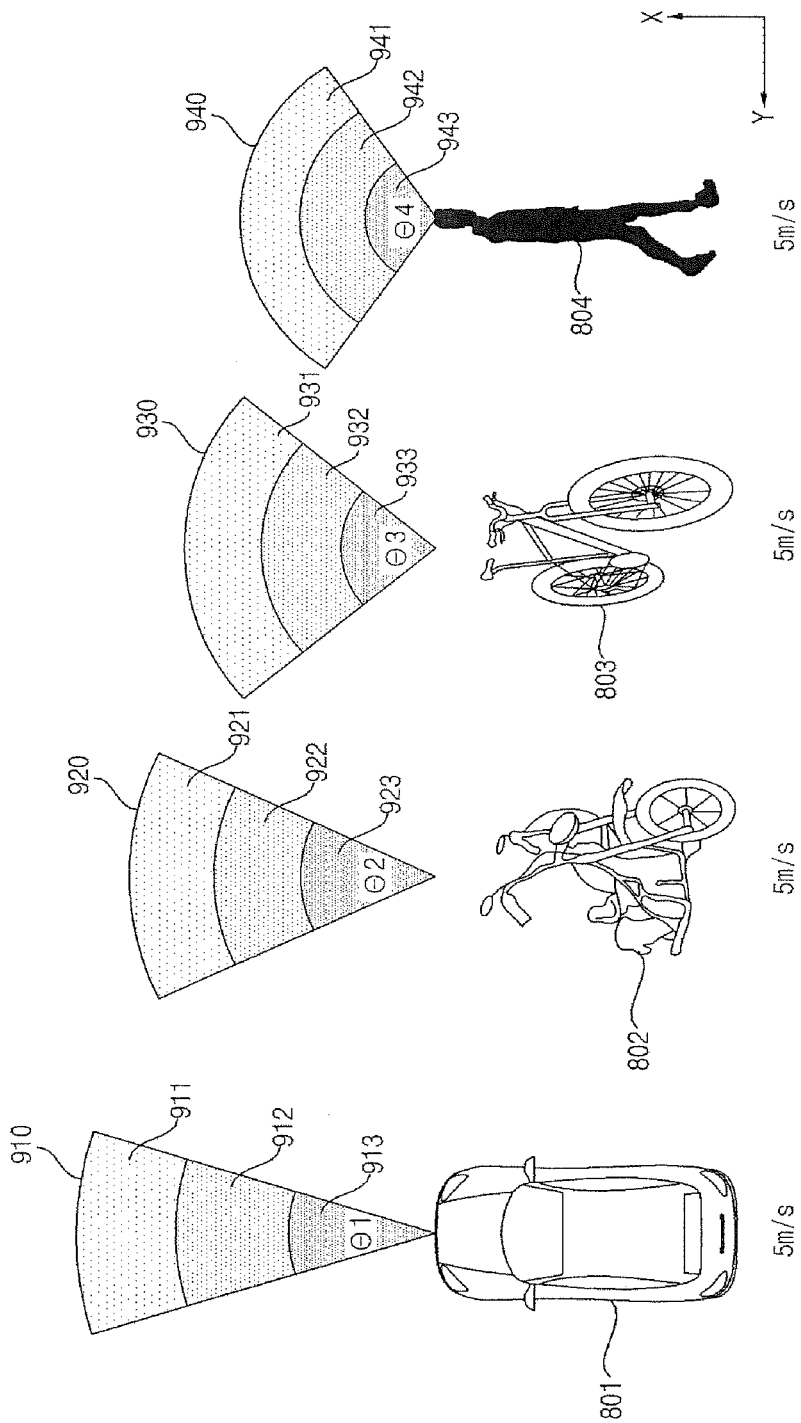
FIG. 9 is a view illustrating another example of a dangerous area set on a per-moving-object-type basis according to one embodiment of the present invention.

FIG. 9 is a view illustrating another example of a dangerous area set on a per-moving-object-type basis according to one embodiment of the present invention.

Referring to FIG. 9, unlike FIGS. 8A and 8B, the controller 170 may set a fan-shaped dangerous area for each moving object.

Even if the other vehicle 801, the motorcycle 802, the bicycle 803, and the pedestrian 804 have the same speed (e.g. 5 m/s), the controller 170 may set, based on the maximum speed and the maximum acceleration on a per-object-type basis stored in the memory 130, the longest dangerous area 910 for the other vehicle 801, the second longest dangerous area 920 for the motorcycle 802, the third longest dangerous area 930 for the bicycle 803, and the shortest dangerous area 940 for the pedestrian 804.

In addition, even if the other vehicle 801, the motorcycle 802, the bicycle 803, and the pedestrian 804 have the same movement direction (e.g. the X-axis), the controller 170 may set different center angles for the respective dangerous areas 910, 920, 930 and 940 based on the minimum turning radius on a per-object-type basis stored in the memory 130.

For example, as illustrated, the center angles of the dangerous areas 910, 920, 930 and 940 may be increased in the sequence of the other vehicle 801, the motorcycle 802, the bicycle 803, and the pedestrian 804. That is, the magnitude relationship of $\theta 1<\theta 2<\theta 3<\theta 4$ may be established.

Figure 10:
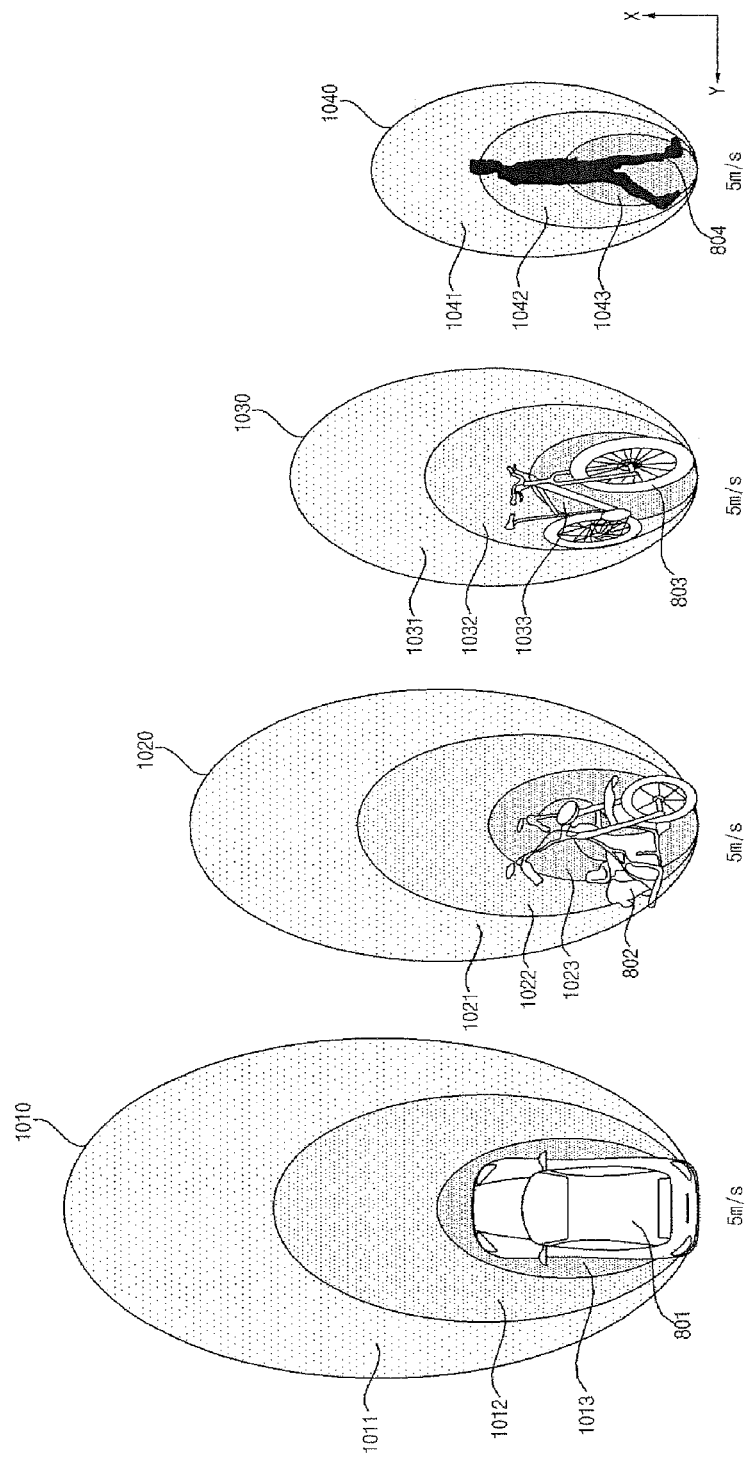
FIG. 10 is a view illustrating a further example of a dangerous area set on a per-moving-object-type basis according to one embodiment of the present invention.

FIG. 10 is a view illustrating a further example of a dangerous area on a per-moving-object-type basis according to one embodiment of the present invention.

Referring to FIG. 10, unlike FIGS. 8A to 9, the controller 170 may set an isoline dangerous area for each moving object.

Even if the other vehicle 801, the motorcycle 802, the bicycle 803, and the pedestrian 804 have the same speed (e.g. 5 m/s) and the same movement direction (e.g. the X-axis), the controller 170 may set, based on the maximum speed, the maximum acceleration and the minimum turning radius on a per-object-type basis stored in the memory 130, the widest dangerous area 1010 for the other vehicle 801, the second widest dangerous area 1020 for the motorcycle 802, the third widest dangerous area 1030 for the bicycle 803, and the narrowest dangerous area 1040 for the pedestrian 804.

At this time, the respective sub areas for each moving object may indicate ranges within which the moving object can move during different time periods. For example, in the case of the other vehicle 801, the sub area 1013 may indicate the predicted range, within which the other vehicle 801 will travel at 5 m/s during the next second, the sub area 1012 may indicate the predicted range within which the other vehicle 801 will travel at 5 m/s during a one-second interval starting one second from the present, and the sub area 1011 may indicate the predicted range within which the other vehicle 801 will travel at 5 m/s during the second after that.

Figure 11:
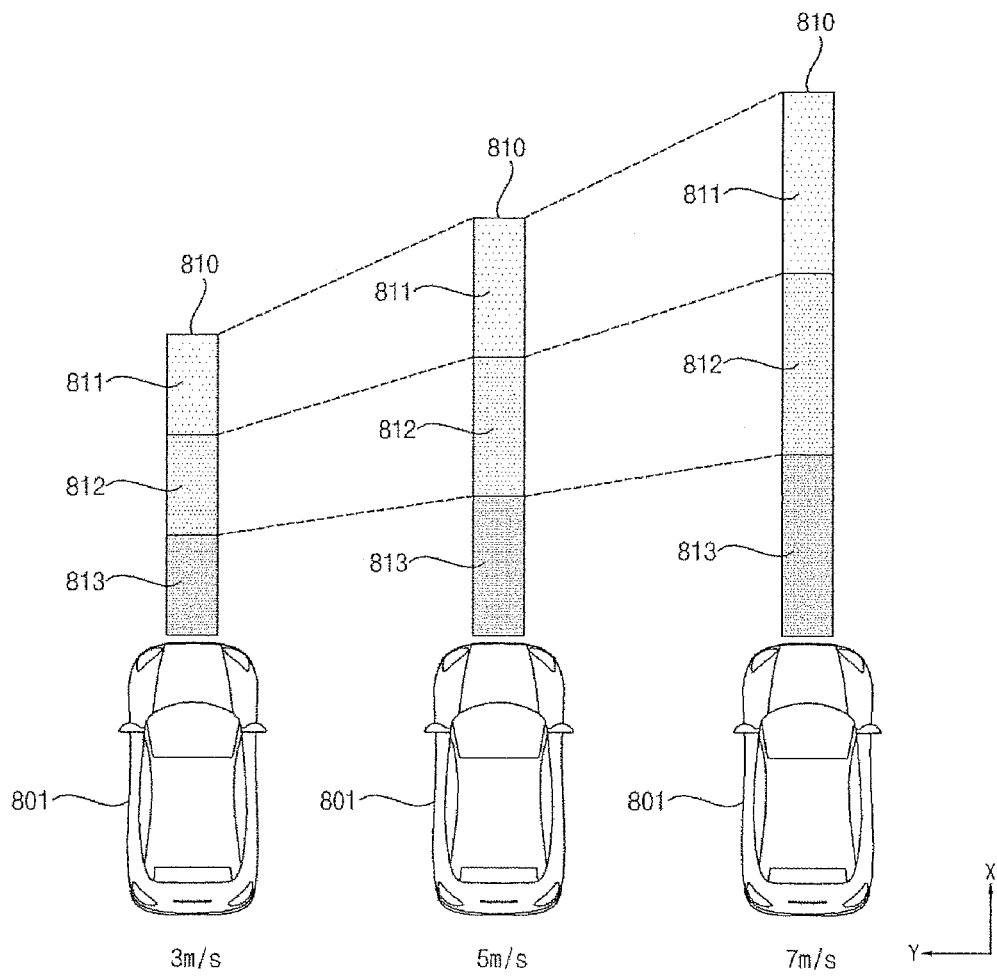
FIG. 11 is a view illustrating an exemplary method of changing, by the vehicle, a dangerous area for a moving object based on the speed of the moving object according to one embodiment of the present invention.

FIG. 11 is a view illustrating an exemplary method of changing, by the vehicle surround monitoring device 100, a dangerous area for a moving object based on the speed of the moving object according to one embodiment of the present invention. For convenience of description, the dangerous area is assumed to have a bar shape including three sub areas as exemplarily illustrated in FIG. 8B.

The controller 170 may change at least one of the size and shape of the dangerous area 810, either in real time or periodically, based on variation in the speed of the moving object.

Referring to FIG. 11, the other vehicle 801, which is moving at 5 m/s along the X-axis, may reduce its speed to 3 m/s. The controller 170 may reduce the length of the dangerous area 810 so as to correspond to the reduction in the speed of the other vehicle 801. For example, the controller 170 may reduce the length of the dangerous area 810 in proportion to the reduction in the speed of the other vehicle 801.

In addition, the other vehicle 801, which is moving at 5 m/s along the X-axis, may increase its speed to 7 m/s. The controller 170 may increase the length of the dangerous area 810 so as to correspond to the increase in the speed of the other vehicle 802. For example, the controller 170 may increase the length of the dangerous area 810 in proportion to the increase in the speed of the other vehicle 801.

At this time, the total reduction or total increase in the length of the dangerous area 810 may be equally applied to the sub areas 811, 812 and 813. For example, when the speed of the other vehicle 801 is increased by 30%, the lengths of each of the sub areas 811, 812 and 813 may be increased by 30%. In another example, when the speed of the other vehicle 801 is reduced by 10%, the lengths of each of the sub areas 811, 812 and 813 may be reduced by 10%.

Figure 12A:
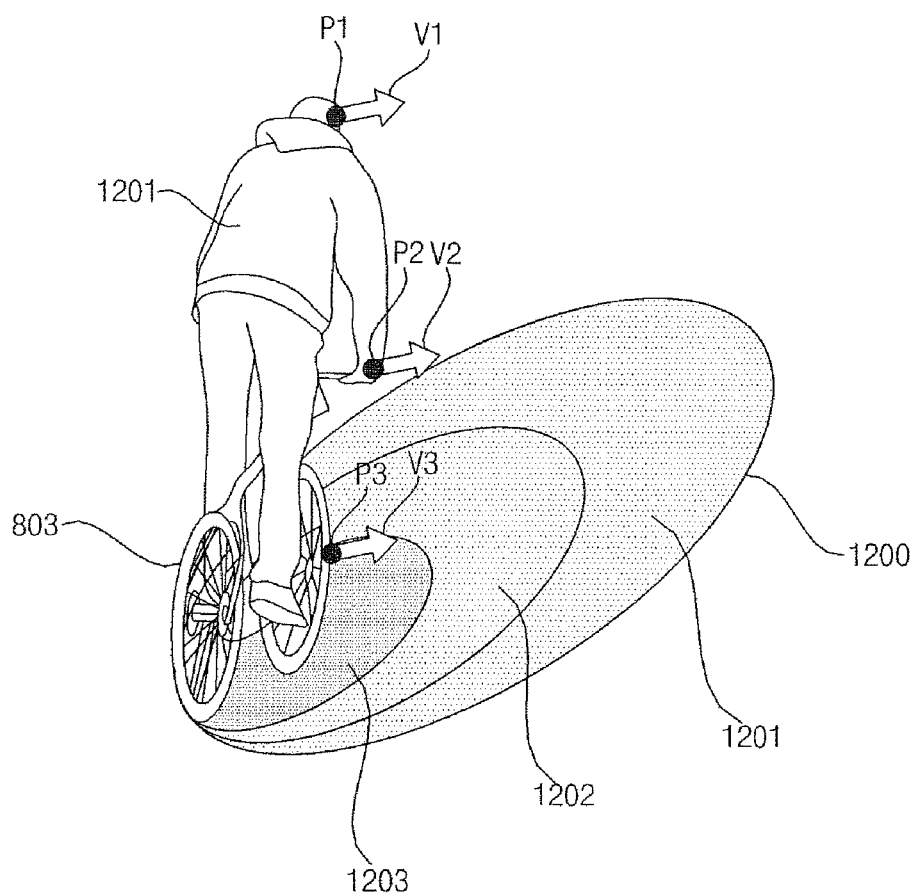
FIGS. 12A and 12B are views illustrating an exemplary method of changing, by the vehicle, a dangerous area based on the predicted movement direction of the moving object according to one embodiment of the present invention.
Figure 12B:
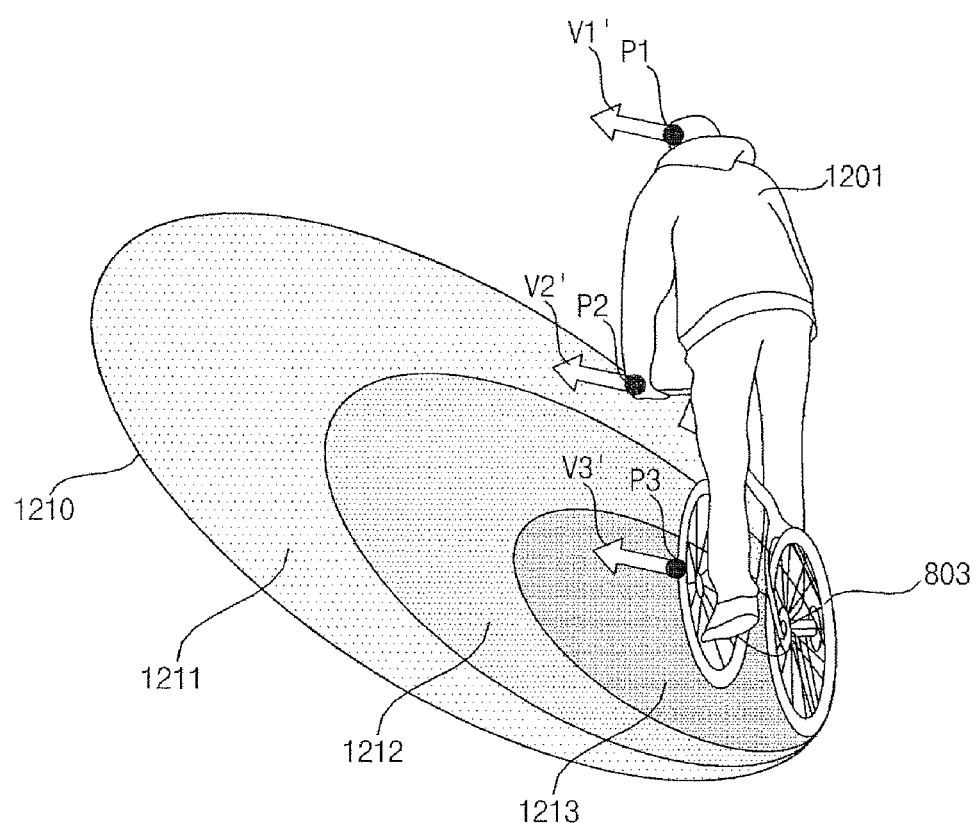

FIGS. 12A and 12B are views illustrating an exemplary method of changing, by the vehicle surround monitoring device 100, a dangerous area based on the predicted movement direction of the moving object according to one embodiment of the present invention.

The vehicle surround monitoring device 100 may predict the future movement direction and movement speed of a specific moving object using a motion estimation process. For example, the vehicle surround monitoring device 100 may predict the future movement direction of a moving object based on at least one of the position, speed, and movement direction of a plurality of points on the moving object, and may change a dangerous area for the moving object based on the predicted movement direction.

FIG. 12A illustrates the case where the moving object is the bicycle 803. The controller 170 may detect and track a plurality of points P1, P2 and P3 on the bicycle 803 and a rider 1201, and may calculate variation over time of at least one of the position, speed and movement direction of each of the points P1, P2 and P3. For example, the point P1 may be one point on the head of the rider 1201 of the bicycle 803, the point P2 may be one point on the handle of the bicycle 803, and the point P3 may be one point on the wheel of the bicycle 803.

As illustrated, the controller 170 may acquire motion vectors V1, V2 and V3 for the respective points P1, P2 and P3 based on the position, speed and movement direction of the points P1, P2 and P3. The motion vector V1 represents the position, movement direction and speed of point P1, the motion vector V2 represents the position, movement direction and speed of point P2, and the motion vector V3 represents the position, movement direction and speed of point P3. The controller 170 may set a dangerous area 1200 including a plurality of sub areas 1201, 1202 and 1203 based on the motion characteristics of the bicycle 803 as well as the acquired motion vectors V1, V2 and V3.

FIG. 12B illustrates a dangerous area 1210 in the case where the motion vectors V1, V2 and V3 of the points P1, P2 and P3 illustrated in FIG. 12A are changed to motion vectors V1', V2' and V3'. The controller 170 may change the size and shape of the dangerous area 1200 into those of the dangerous area 1210 based on the difference between the motion vectors V1, V2 and V3 and the motion vectors V1', V2' and V3'. Specifically, the sub area 1201 may be changed into a sub area 1211, the sub area 1202 may be changed into a sub area 1212, and the sub area 1203 may be changed into a sub area 1213.

Meanwhile, it should be understood that various methods such as, for example, a well known Block Matching Algorithm (BMA) may be utilized in the motion estimation of a specific moving object.

Figure 13:
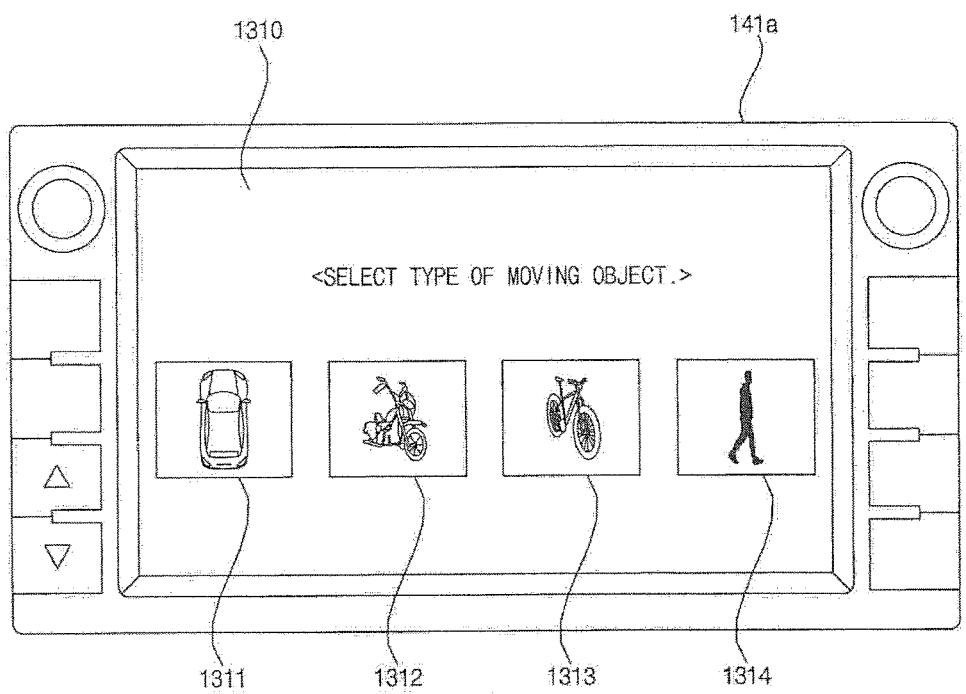
FIG. 13 is a view illustrating one example of a user interface screen provided to a user via a display unit of the vehicle according to one embodiment of the present invention.

FIG. 13 is a view illustrating one example of a user interface screen provided to a user via the display unit 141 of the vehicle surround monitoring device 100 according to one embodiment of the present invention.

Referring to FIG. 13, the controller 170 may display, on the navigation display 141*a*, a user interface 1310 that serves to receive information regarding the types of moving objects for which guidance is to be provided to the user of the vehicle surround monitoring device 100. The navigation display 141*a* may be a display included in the display unit 141 illustrated in FIG. 1.

The user interface 1310 may include type selection menu items 1311, 1312, 1313 and 1314 for moving objects which may be detected by the sensing unit 160. For example, the selection menu item 1311 may indicate another vehicle, the selection menu item 1312 may indicate a motorcycle, the selection menu item 131 may indicate a bicycle, and the selection menu item 1314 may indicate a pedestrian.

When the navigation display 141*a* is a touchscreen, the user of the vehicle surround monitoring device 100 may select the type of moving object for which the user wishes to receive guidance by touching at least one of the selection menu items 1311, 1312, 1313 and 1314. For example, when the user touches the selection menu item 1311, the vehicle surround monitoring device 100 may set dangerous areas for external objects that correspond to other vehicles, excluding motorcycles, bicycles, and pedestrians.

According to FIG. 13, as the vehicle surround monitoring device 100 sets only dangerous areas for moving objects of a desired type as selected by the user of the vehicle surround monitoring device 100, it is possible to prevent the user from being confused, which might otherwise occur when information related to moving objects of types for which the user does not wish to receive guidance is indiscriminately provided.

Figure 14A:
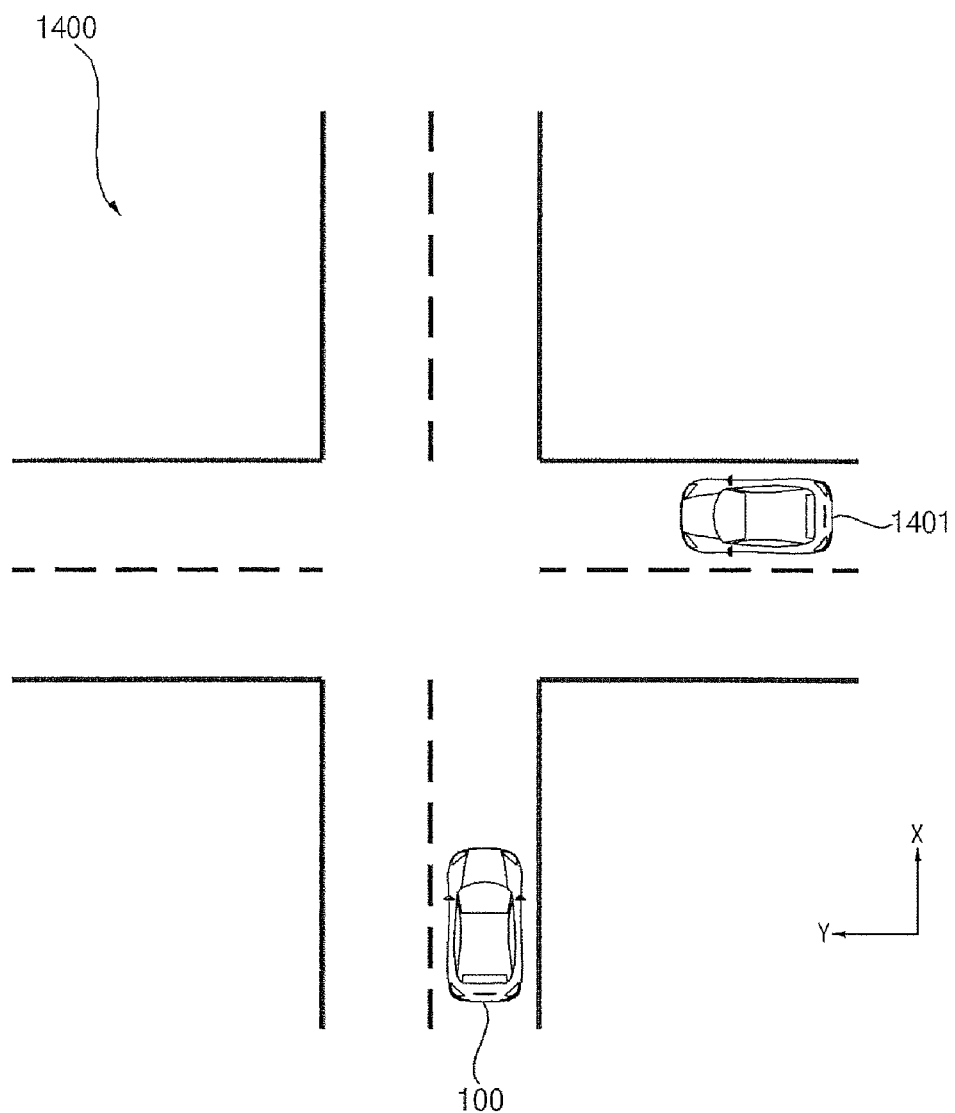
FIGS. 14A to 14C are views illustrating a method of displaying, by the vehicle, an image corresponding to a dangerous area according to one embodiment of the present invention.
Figure 14B:
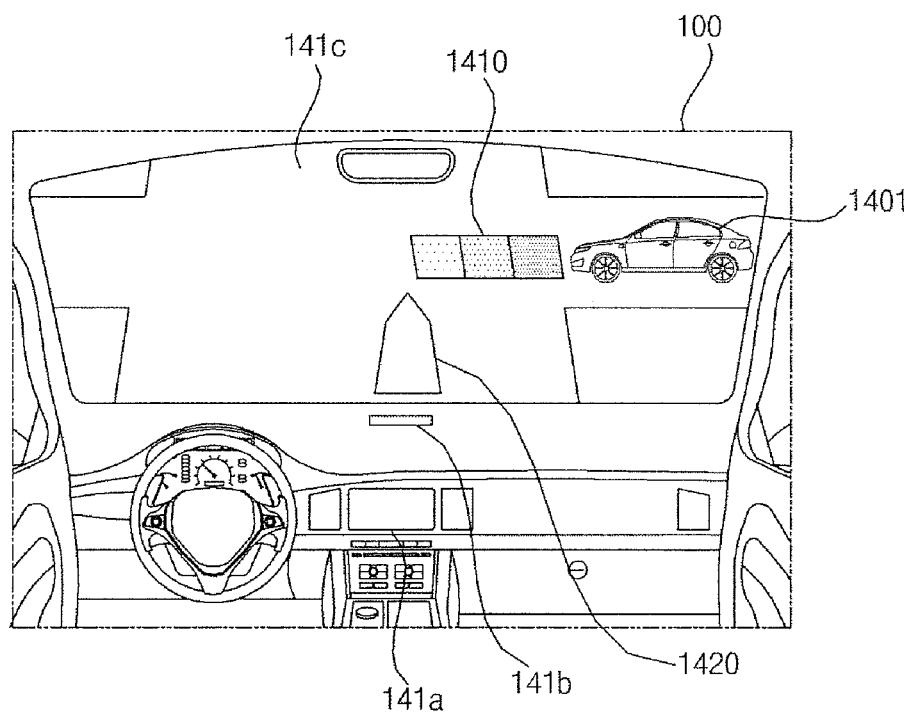
Figure 14C:
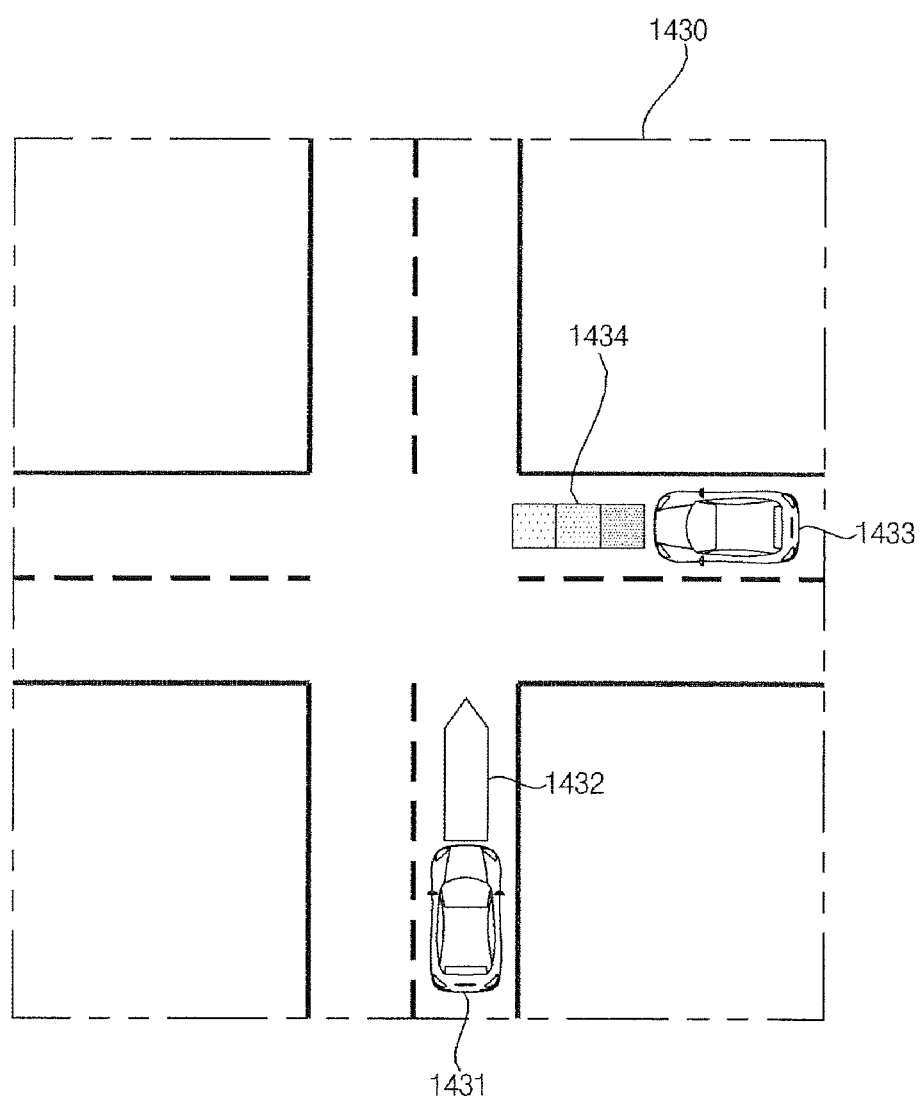

FIGS. 14A to 14C are views illustrating a method of displaying, by the vehicle surround monitoring device 100, an image corresponding to a dangerous area according to one embodiment of the present invention.

First, FIG. 14A illustrates an exemplary top-view of an intersection 1400 that the vehicle surround monitoring device 100 is approaching. For convenience of description, it is assumed that the vertical axis is the X-axis and the horizontal axis is the Y-axis. The vehicle surround monitoring device 100 is moving toward the intersection 1400 along the X-axis, and another vehicle 1401 is moving toward the intersection 1400 along the Y-axis.

The controller 170 may set a dangerous area for the other vehicle 1401 based on the motion characteristics of the other vehicle 1401 including the movement direction and the speed. In addition, the controller 170 may predict the route of the vehicle surround monitoring device 100 based on the motion characteristics of the other vehicle 1401 including the movement direction and the speed.

Meanwhile, the vehicle surround monitoring device 100 may display at least one of an image indicating a dangerous area for the other vehicle 1401 and an image indicating the predicted route of the vehicle surround monitoring device 100 in an augmented-reality mode or a top-view mode.

Hereinafter, this will be described in more detail with reference to FIGS. 14B and 14C.

FIG. 14B illustrates one example in which the vehicle surround monitoring device 100 displays an image 1410 indicating a dangerous area for the other vehicle 1401 and an image 1420 indicating the predicted route of the vehicle surround monitoring device 100 in an augmented-reality mode. As illustrated, the navigation display 141*a*, the head-up display 141*b*, and the transparent display 141*c* may be provided in the space inside the vehicle surround monitoring device 100.

"Augmented reality" means a technology or display method that overlaps a virtual image, made by a computer, over the real world as seen by the user's eyes.

The vehicle surround monitoring device 100 may display the image 1410 indicating a dangerous area for the other vehicle 1401 and the image 1420 indicating the predicted route of the vehicle surround monitoring device 100 on the windshield of the vehicle surround monitoring device 100 via the head-up display 141*b* or the transparent display 141*c*. Specifically, as exemplarily illustrated in FIG. 14B, the driver of the vehicle surround monitoring device 100 may check the other vehicle 1401 with the eyes through the windshield. The other vehicle 1401 is moving from the right side to the left side of the intersection, and the image 1410 indicating the dangerous area may be displayed as extending leftward along the Y-axis from the front side of the other vehicle 1401, which is seen through the windshield.

In addition, the image 1420 indicating the predicted route of the vehicle surround monitoring device 100 may extend from the lower end of the windshield to an area corresponding to the length of the predicted route.

FIG. 14C illustrates one example in which the vehicle surround monitoring device 100 displays an image indicating a dangerous area for another vehicle and an image indicating the predicted route of the vehicle surround monitoring device 100 in a top-view mode.

Specifically, the controller 170 may display an indicator 1431, indicating the location of the vehicle surround monitoring device 100, on a map 1430 stored in the memory 130 in a top-view mode. In addition, the controller 170 may perform mapping of an image 1432 indicating the predicted route of the vehicle surround monitoring device 100 on the map 1430. For example, as the image indicating the predicted route of the vehicle surround monitoring device 100, the indicator 1432 may be included in the map 1430. At this time, since the vehicle surround monitoring device 100 is moving forward along the X-axis, the indicator 1432 may be displayed in front of the indicator 1431.

In addition, the controller 170 may display an indicator 1433, indicating the location of the other vehicle 1401, on the map 1430. In addition, the controller 170 may display an indicator 1434 in the form of an image indicating a dangerous area for the other vehicle 1401, on the map 1430. At this time, since the other vehicle 1401 is moving forward along the Y-axis, the indicator 1434 may be displayed in front of the indicator 1433.

The controller 170 may determine whether to display the image indicating the dangerous area and the image indicating the predicted route of the vehicle surround monitoring device 100 in an augmented-reality mode or in a top-view mode in response to user input.

Figure 15A:
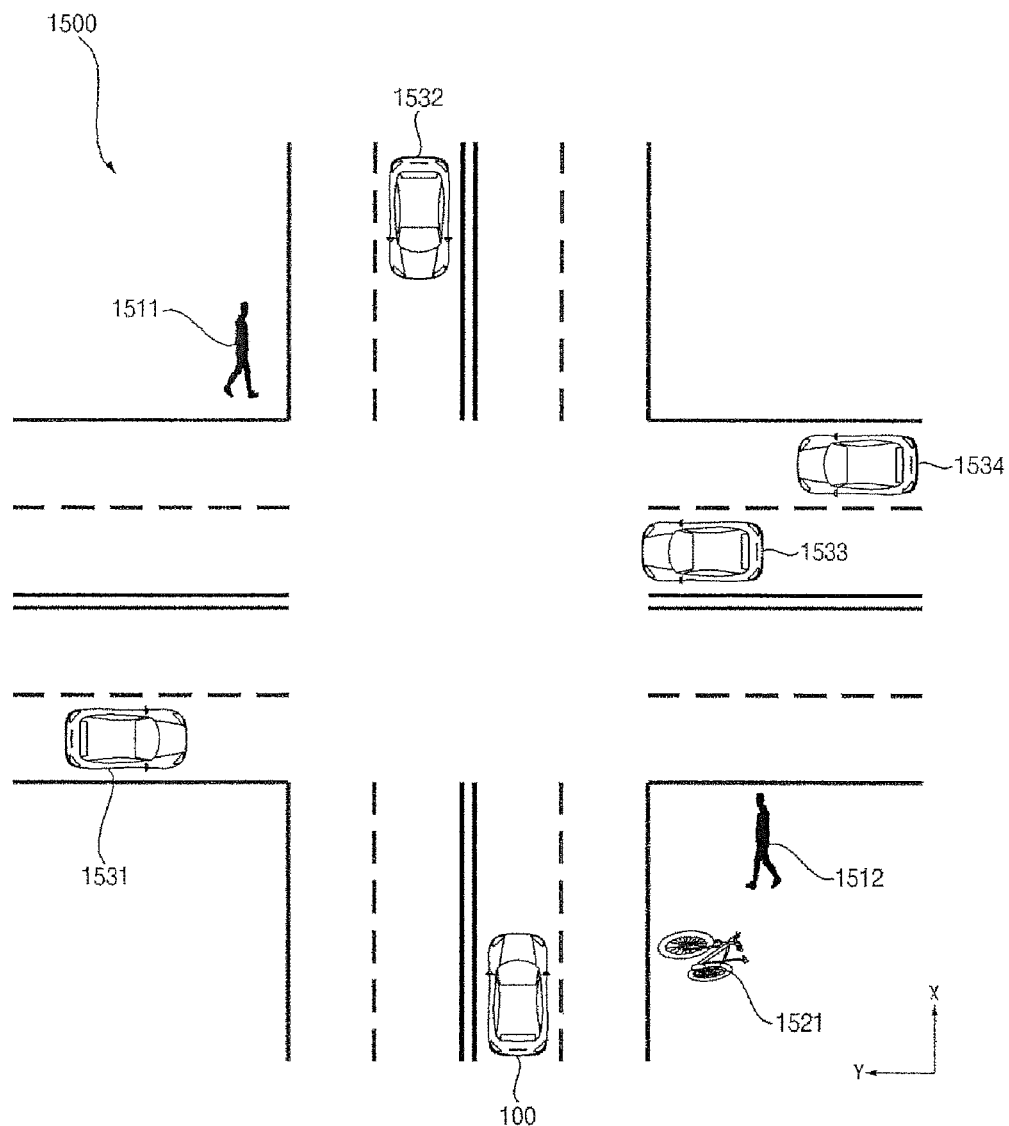
FIGS. 15A and 15B are views respectively illustrating a method of adjusting, by the vehicle, the scale of a map based on the surrounding congestion in a top-view mode according to one embodiment of the present invention.
Figure 15B:
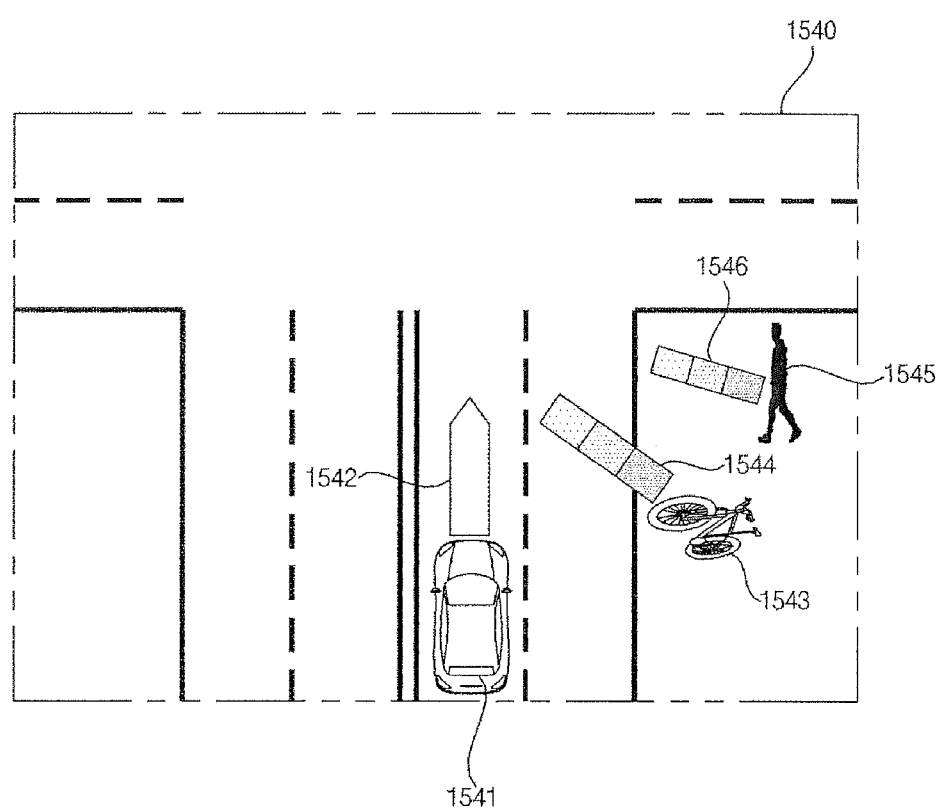

FIGS. 15A and 15B are views respectively illustrating a method of adjusting, by the vehicle surround monitoring device 100, the scale of a map based on the surrounding congestion in a top-view mode according to one embodiment of the present invention.

FIG. 15A illustrates the exemplary top-view of an intersection 1500 that the vehicle surround monitoring device 100 is approaching. For convenience of description, it is assumed that the vertical direction is the X-axis and the horizontal direction is the Y-axis.

The controller 170 may adjust the scale of the map based on congestion around the vehicle surround monitoring device 100 in a top-view mode.

Specifically, the controller 170 may determine the total number of moving objects located in the environment surrounding the vehicle surround monitoring device 100 based on a sensing signal from the sensing unit 160. For example, as illustrated, two pedestrians 1511 and 1512, one bicycle 1521, four other vehicles 1531, 1532, 1533 and 1534, which are located around the intersection 1500, may be detected by the sensing unit 160.

The controller 170 may calculate congestion based on the total number of moving objects detected by the sensing unit 160. For example, the controller 170 may calculate a first congestion value when one moving object is detected at a specific point in time, and may calculate a second congestion value, which is greater than the first value, when two or more moving objects are detected at a specific point in time. In addition, the controller 170 may adjust the scale of the map such that the number of moving objects to be displayed on the map corresponds to the calculated congestion value.

As illustrated, when a total of eight moving objects 1511, 1512, 1521, 1531, 1532, 1533 and 1534 is detected and the number of moving objects corresponds to a second congestion value, the controller 170 may adjust the scale of the map such that only two high-ranking moving objects 1512 and 1521, which are the closest to the vehicle surround monitoring device 100, among the eight moving objects 1511, 1512, 1521, 1531, 1532, 1533 and 1534 are displayed.

That is, the controller 170 may reduce the scale of the map to be displayed in a top-view mode as congestion around the vehicle surround monitoring device 100 increases.

FIG. 15B illustrates a map 1540, the scale of which is adjusted such that two moving objects 1512 and 1521, which are the most closest to the vehicle surround monitoring device 100, among the moving objects 1511, 1512, 1521, 1531, 1532, 1533 and 1534 are displayed.

Referring to FIG. 15B, the map 1540 may include an indicator 1541 indicating the location of the vehicle surround monitoring device 100. In addition, the controller 170 may map an image, indicating the predicted route of the vehicle surround monitoring device 100, to the map 1540. For example, as the image indicating the predicted route of the vehicle surround monitoring device 100, an indicator 1542 may be included in the map 1540. At this time, since the vehicle surround monitoring device 100 is moving forward along the X-axis, the indicator 1542 may be displayed in front of the indicator 1541.

In addition, the controller 170 may display an indicator 1545 indicating the location of the pedestrian 1512 on the map 1540. In addition, the controller 170 may display an indicator 1546, in the form of an image indicating a dangerous area for the pedestrian 1512, on the map 1540.

In addition, the controller 170 may display an indicator 1543 indicating the location of the bicycle 1521 on the map 1540. In addition, the controller 170 may display an indicator 1544 in the form of an image indicating a dangerous area for the bicycle 1521 on the map 1540.

Meanwhile, although not illustrated, the vehicle surround monitoring device 100 may display, on the map, only indicators for moving objects corresponding to types selected via the user interface 1310 illustrated in FIG. 13.

For example, when only the selection menu item 1313 for designating bicycles is selected from the user interface 1310, the controller 170 may not display the indicator 1545 indicating the location of the pedestrian 1512 and the indicator 1546 indicating a dangerous area for the pedestrian 1512 on the map 1540.

Figure 16:
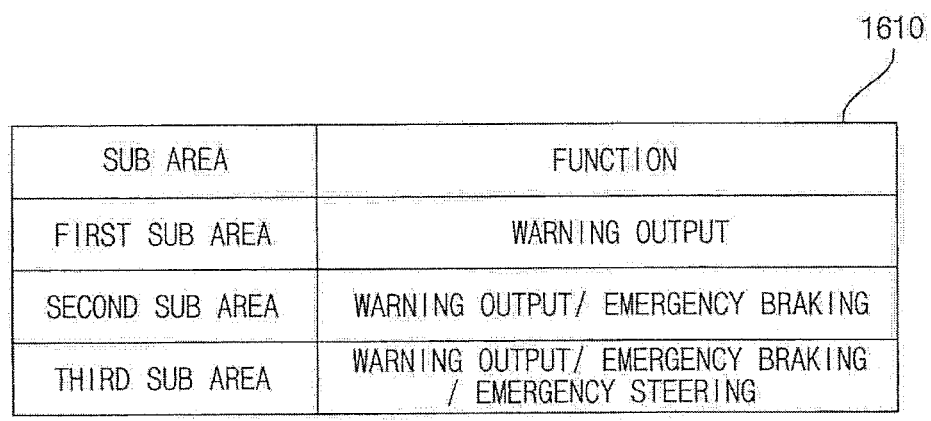
FIG. 16 is a view illustrating a data table which defines the relationship between sub areas included in a dangerous area and functions according to one embodiment of the present invention.

FIG. 16 illustrates a data table 1610 which defines the relationship between sub areas included in a dangerous area and functions according to one embodiment of the present invention.

According to FIG. 16, a dangerous area for a moving object may be divided into three sub areas. The data table 1610 may include information regarding the relationships between the three sub areas included in the dangerous area and at least one function corresponding to each sub area. At this time, one sub area may be associated with two or more different functions based on the data table 1610. The data table 1610 may be stored in the memory 130.

For example, when the predicted route of the vehicle surround monitoring device 100 overlaps a first sub area among the three sub areas, the controller 170 may select a warning output function corresponding to the first sub area. When the warning output function is selected, the controller 170 may output auditory feedback (e.g. warning sound) via the sound output unit 142 or visual feedback (e.g. an image indicating danger) via the display unit 141 to the driver of the vehicle surround monitoring device 100.

In another example, when the predicted route of the vehicle surround monitoring device 100 overlaps a second sub area among three sub areas, the controller 170 may select a warning output function and an emergency braking function corresponding to the second sub area from the data table 1610. When the emergency braking function is selected, the controller 170 may generate prescribed braking force of the vehicle surround monitoring device 100 via the brake drive unit 153.

In a further example, when the predicted route of the vehicle surround monitoring device 100 overlaps a third sub area among three sub areas, the controller 170 may select a warning output function, an emergency braking function, and an emergency steering function corresponding to the third sub area from the data table 1610. When the emergency steering function is selected, the controller 170 may change the direction of travel of the vehicle surround monitoring device 100 so as to reduce the risk of a collision with a moving object via the steering drive unit 152.

Figure 17:
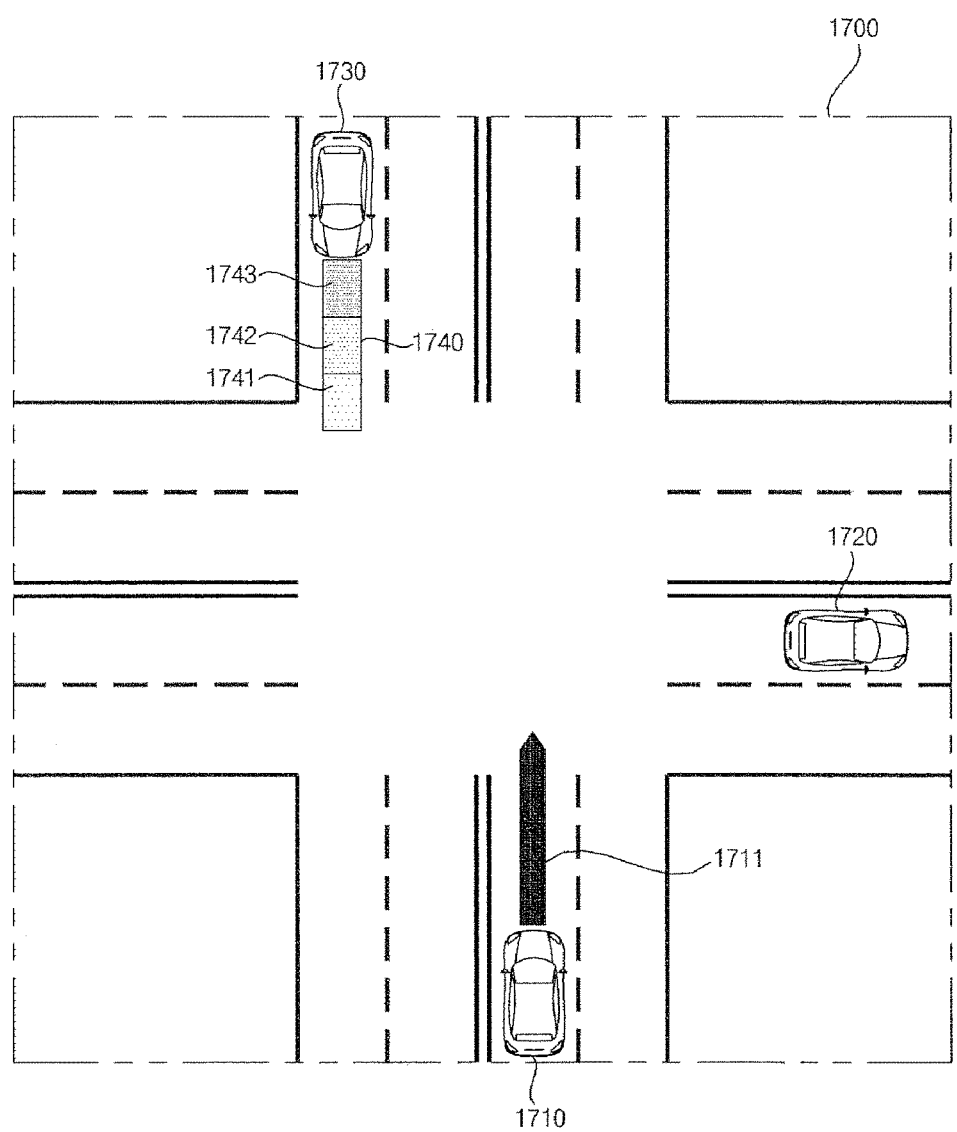
FIG. 17 is a view illustrating one example of a map on which a dangerous area for a moving object is displayed according to one embodiment of the present invention.

FIG. 17 is a view illustrating one example of a map 1700 on which a dangerous area for a moving object is displayed according to one embodiment of the present invention.

Referring to FIG. 17, when the vehicle surround monitoring device 100 approaches an intersection, the vehicle surround monitoring device 100 may detect two other vehicles as moving objects in the vicinity of the intersection. As such, the vehicle surround monitoring device 100 may display an indicator 1710 indicating the vehicle surround monitoring device 100 as well as indicators 1720 and 1730 indicating two other detected vehicles.

At this time, the vehicle surround monitoring device 100 may determine whether to display dangerous areas for the two other vehicles based on the motion characteristics of each of the first other vehicle indicated by the indicator 1720 and the second other vehicle indicated by the indicator 1730.

For example, because the first other vehicle, indicated by the indicator 1720, is moving away from the vehicle surround monitoring device 100, the controller 170 may determine that the risk of a collision between the first other vehicle indicated by the indicator 1720 and the vehicle surround monitoring device 100 is zero or very low, and thus not display any dangerous area for the first other vehicle indicated by the indicator 1720 on a map 1700. On the other hand, because the distance between the second other vehicle indicated by the indicator 1730 and the vehicle surround monitoring device 100 is decreasing, the controller 170 may determine that there is the potential risk of a collision between the second other vehicle indicated by the indicator 1730 and the vehicle surround monitoring device 100, and thus not display any dangerous area 1740 for the second other vehicle indicated by the indicator 1730 on the map 1700.

Specifically, the dangerous area 1740 may include a plurality of sub areas 1741, 1742 and 1743. The size and shape of the respective sub areas 1741, 1742 and 1743 may be determined based on the speed and movement direction of the other vehicle indicated by the indicator 1730. For example, since the second other vehicle indicated by the indicator 1730 is moving forward, all of the sub areas 1741, 1742 and 1743 may be displayed in front of the indicator 1730. In addition, each of the sub areas 1741, 1742 and 1743 may have a length corresponding to the speed of the second other vehicle indicated by the indicator 1730.

Meanwhile, the vehicle surround monitoring device 100 may display the predicted route 1711 of the vehicle surround monitoring device 100 on the map 1700. The vehicle surround monitoring device 100 may determine the length and shape of an icon 1711, indicating the predicted route to be displayed on the map 1700, based on the speed and the movement direction of the vehicle surround monitoring device 100 and the route to a destination. For example, when the vehicle surround monitoring device 100 is moving forward, the icon 1711 indicating the predicted route of the vehicle surround monitoring device 100 may be represented by the arrow corresponding to the forward movement direction, as illustrated in FIG. 17.

Meanwhile, since there is no overlapping portion between the dangerous area 1740 and the predicted route 1711, the vehicle surround monitoring device 100 may not execute any executable functions that serve to avoid a collision with the second other vehicle indicated by the indicator 1730.

According to FIG. 17, the vehicle surround monitoring device 100 may select only moving objects of a specific type (e.g. another vehicle), which has at least a given level of the risk of a collision with the vehicle surround monitoring device 100, among a plurality of moving objects in the vicinity of the vehicle surround monitoring device 100, and may provide the driver with guidance only for dangerous areas corresponding to the selected type of moving object.

Figure 18:
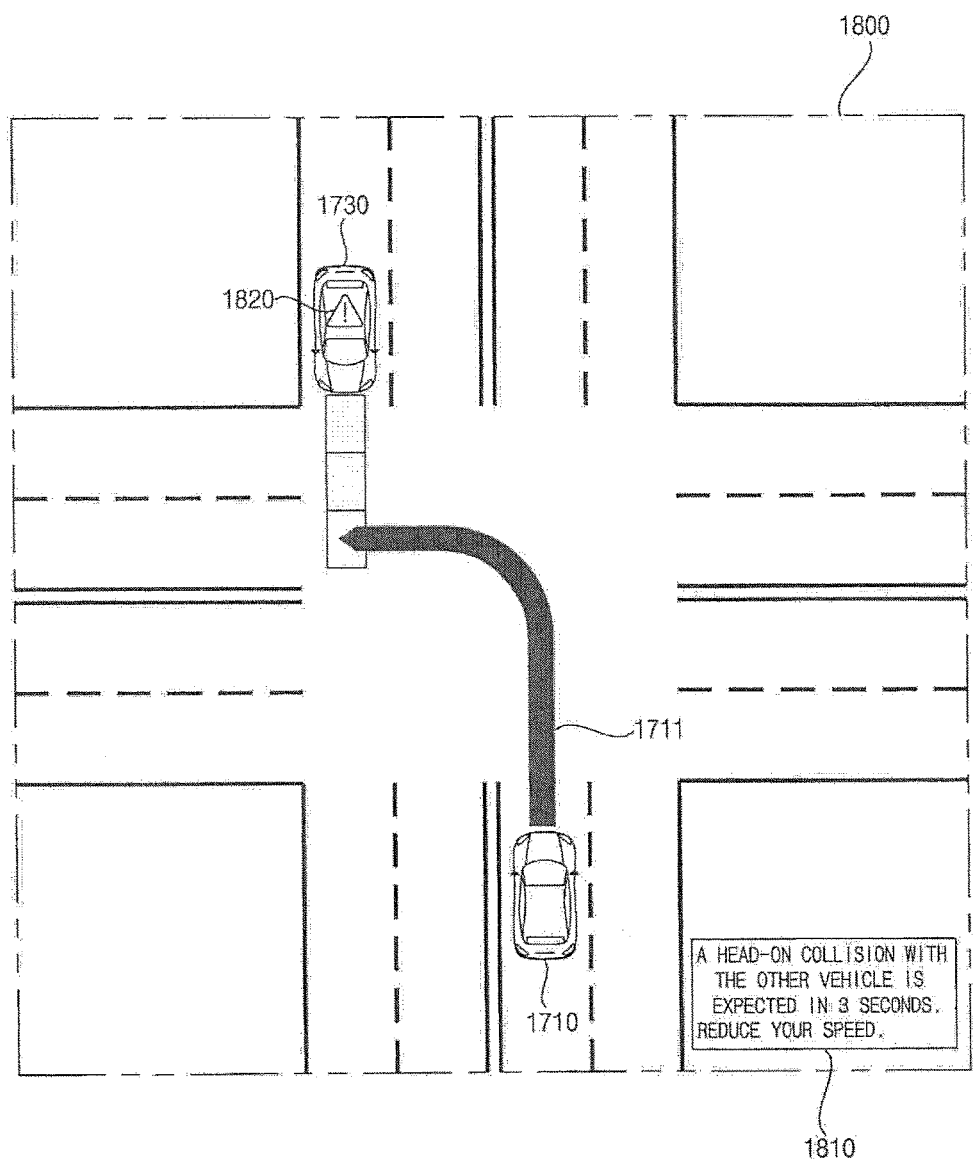
FIG. 18 is a view illustrating one example of a map on which a dangerous area for the moving object associated with FIG. 17 is displayed according to one embodiment of the present invention.

FIG. 18 illustrates one example of a map 1800 in which a dangerous area for the moving object associated with FIG. 17 is displayed according to one embodiment of the present invention.

As the moving object and the vehicle surround monitoring device 100 move along the road, the motion characteristics of the moving object and the motion characteristics of the vehicle surround monitoring device 100 may be changed. The vehicle surround monitoring device 100 may change the map to be displayed on the display unit 141, either in real time or periodically, based on variation in at least one of the motion characteristics of the moving object and the motion characteristics of the vehicle surround monitoring device 100.

As the second other vehicle indicated by the indicator 1730 and the vehicle surround monitoring device 100 indicated by the indicator 1710, which are displayed on the map 1700 illustrated in FIG. 17, come closer to the intersection, the vehicle surround monitoring device 100 may change the map 1700 into a map 1800.

Referring to FIG. 18, as the first other vehicle, indicated by the indicator 1720 illustrated in FIG. 17 moves away from the vehicle surround monitoring device 100, the indicator 1720 indicating the first other vehicle may no longer be displayed on the map 1800.

In addition, as the vehicle surround monitoring device 100 comes closer to the intersection, the icon 1711, indicating the predicted route of the vehicle surround monitoring device 100, may change from the straight shape illustrated in FIG. 17 into the leftward bent shape illustrated in FIG. 18. That is, the icon 1711 illustrated in FIG. 18 may indicate that the vehicle surround monitoring device 100 is going to turn left. At this time, the controller 170 may determine the length of the icon 1711 indicating the predicted route of the vehicle surround monitoring device 100 based on the speed and movement direction of the vehicle surround monitoring device 100 and the route to a destination.

In addition, as illustrated, when the vehicle surround monitoring device 100 is moving forward, the icon 1711, indicating the predicted route of the vehicle surround monitoring device 100, may be displayed in front of the indicator 1710 indicating the vehicle surround monitoring device 100.

Meanwhile, in the map 1800, it can be appreciated that the icon 1711, indicating the predicted route of the vehicle surround monitoring device 100, overlaps the dangerous area 1740 for the second other vehicle indicated by the indicator 1730. That is, the icon 1711 overlaps the first sub area 1741, which is one of the sub areas 1741, 1742 and 1743 included in the dangerous area 1740 for the second other vehicle.

The controller 170 may access the memory 130, and may select a function corresponding to the sub area 1741, which overlaps the predicted route of the vehicle surround monitoring device 100, from the data table 1610 illustrated in FIG. 16. Specifically, as exemplarily illustrated in FIG. 18, when the predicted route of the vehicle surround monitoring device 100 overlaps the first sub area 1741 of the second other vehicle, the controller 170 may select and execute a warning output function with reference to the data table 1610.

As the warning output function is executed, the vehicle surround monitoring device 100 may provide the driver with visual feedback which indicates the risk of a collision between the second other vehicle and the vehicle surround monitoring device 100. At this time, the controller 170 may predict the time remaining until the collision between the vehicle surround monitoring device 100 and the second other vehicle based on, for example, the motion characteristics of the vehicle surround monitoring device 100, the motion characteristics of the second other vehicle, and the actual distance between the first sub area 1741 and the vehicle surround monitoring device 100, and then provide the driver with visual feedback that includes the predicted time. In one example, a message 1810, which suggests the action that is required of the driver and the type of collision that is expected (e.g. "A head-on collision with the other vehicle is expected in 3 seconds. Reduce your speed"), may be displayed in one region of the map 1800. In addition, a warning icon 1820 may be displayed in the vicinity of the indicator 1730 indicating the second other vehicle.

According to FIG. 18, there is the advantage in that the driver of the vehicle surround monitoring device 100 can easily recognize the potential risk of a collision between the vehicle surround monitoring device 100 and moving objects via the map displayed in a top-view mode. Of course, it will be clear to those skilled in the art that the controller 170 may output visual feedback, and may simultaneously output auditory feedback corresponding to the visual feedback.

Figure 19:
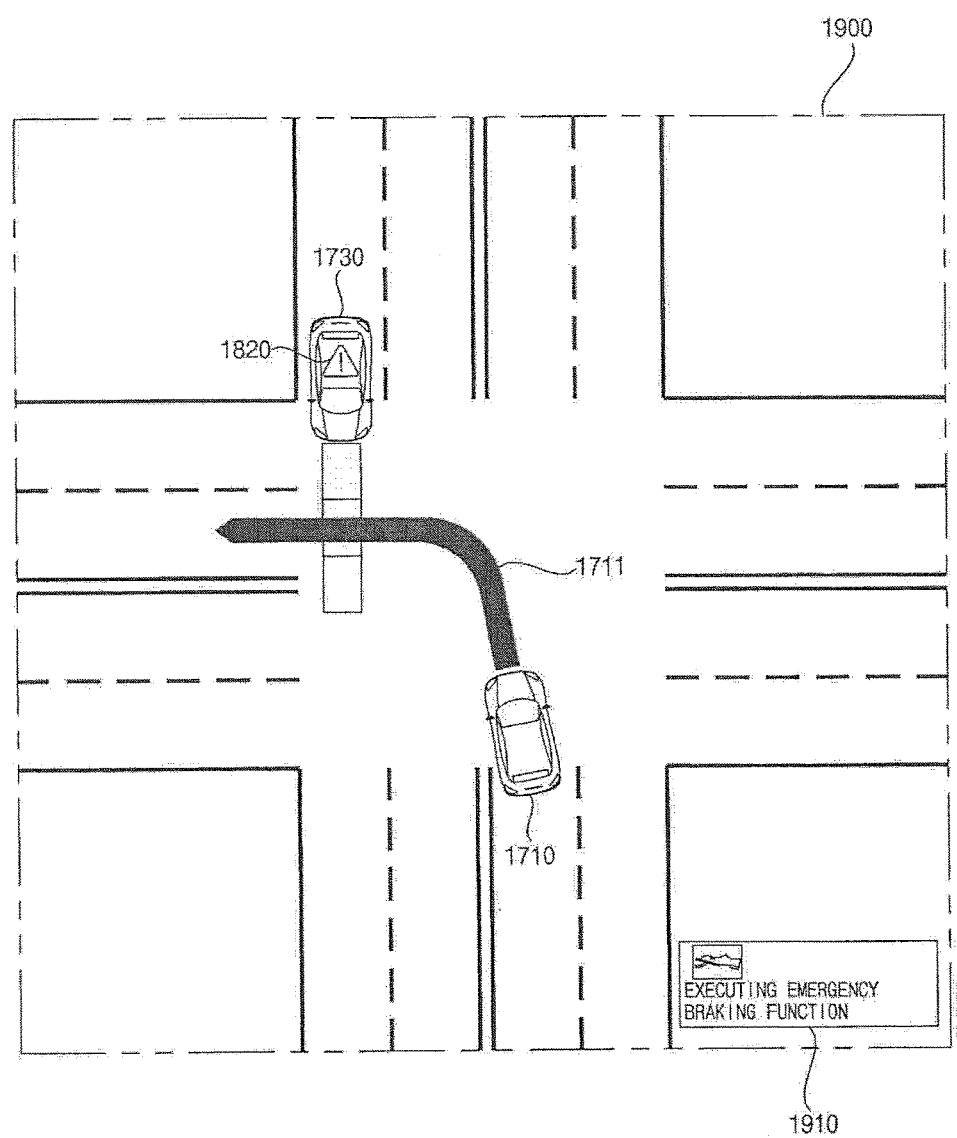
FIG. 19 is a view illustrating one example of a map on which a dangerous area for the moving object associated with FIG. 18 is displayed according to one embodiment of the present invention.

FIG. 19 is a view illustrating one example of a map 1900 on which a dangerous area for the moving object associated with FIG. 18 is displayed according to one embodiment of the present invention.

According to FIG. 19, as the second other vehicle indicated by the indicator 1730 and the vehicle surround monitoring device 100 indicated by the indicator 1710 come closer to each other, the vehicle surround monitoring device 100 may change the map 1800 into a map 1900.

Referring to FIG. 19, the vehicle surround monitoring device 100 may use the map 1900 to determine that the icon 1711 indicating the predicted route of the vehicle surround monitoring device 100 and the dangerous area 1740 for the second other vehicle overlap each other. Meanwhile, unlike FIG. 18, in FIG. 19, the vehicle surround monitoring device 100 may determine that the icon 1711 overlaps the second sub area 1742 of the dangerous area 1740.

The controller 170 may select a function corresponding to the sub area 1742, which overlaps the predicted route of the vehicle surround monitoring device 100, from the data table 1610 illustrated in FIG. 16. Specifically, as illustrated in FIG. 19, when the predicted route 1711 of the vehicle surround monitoring device 100 and the second sub area 1742 of the second other vehicle overlap each other, the controller 170 may select and execute a warning output function and an emergency braking function with reference to the data table 1610. The execution of the warning output function has been described above with reference to FIG. 18, and a detailed description thereof will be omitted.

As the emergency braking function is selected, the vehicle surround monitoring device 100 may reduce the speed of the vehicle surround monitoring device 100 via the brake drive unit 153. A message 1910 indicating that the emergency braking function is being executed (e.g. "Executing emergency braking") may be displayed in one region of the map 1900.

Figure 20:
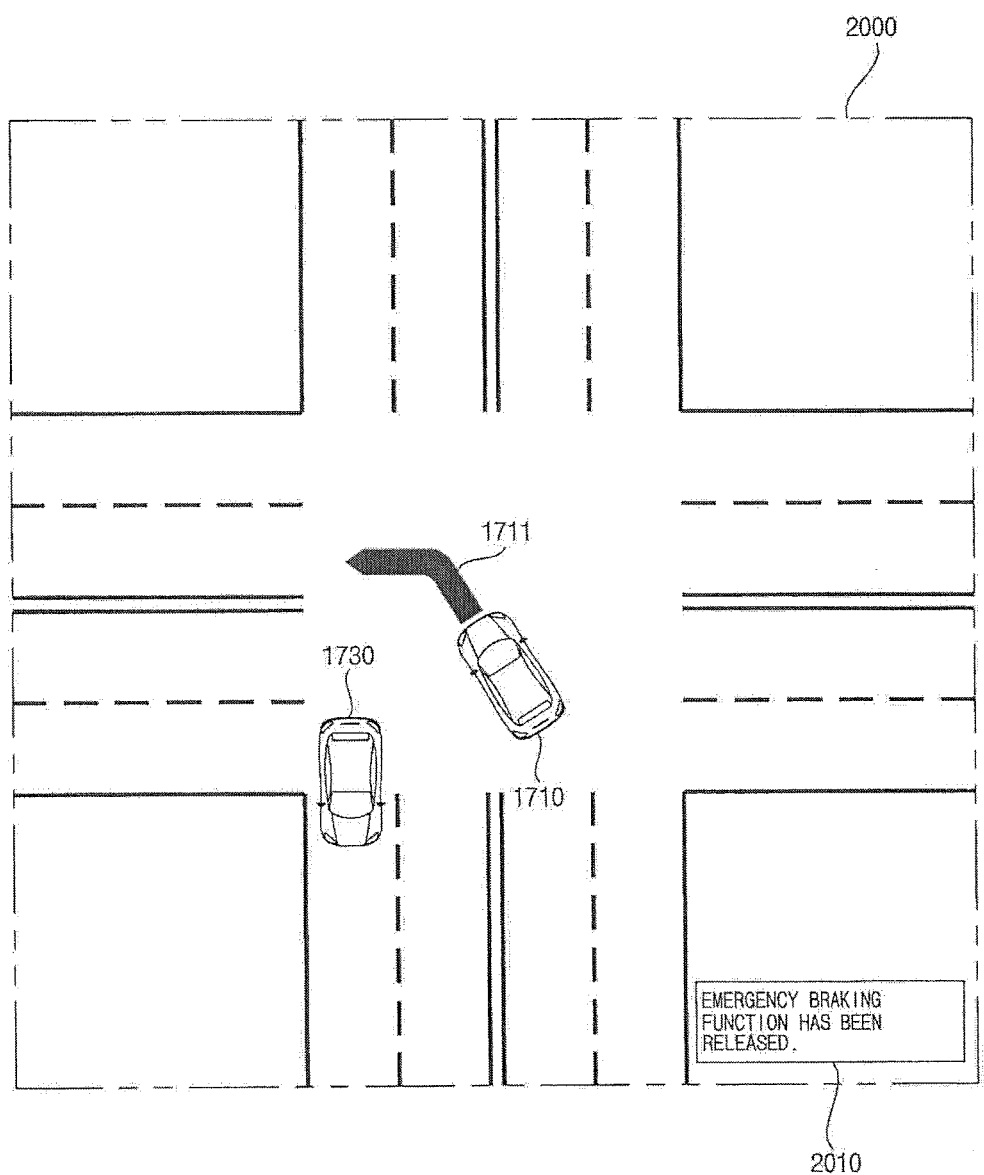
FIG. 20 is a view illustrating one example of a map which is displayed when the vehicle executes an emergency braking function in association with FIG. 19.

FIG. 20 is a view illustrating one example of a map 2000 indicating that the vehicle surround monitoring device 100 is executing an emergency braking function in association with FIG. 19.

Referring to FIG. 20, compared to FIG. 19, as the speed of the vehicle surround monitoring device 100 is reduced via the execution of the emergency braking function, the length of the indicator 1711, indicating the predicted route of the vehicle surround monitoring device 100, may be reduced.

As described above, the vehicle surround monitoring device 100 may adjust the length of the indicator 1711 indicating the predicted route of the vehicle surround monitoring device 100 based on the speed of the vehicle surround monitoring device 100. As the speed of the vehicle surround monitoring device 100 is reduced via the execution of the emergency braking function, the distance that the vehicle surround monitoring device 100 can travel during the same time may be reduced. Therefore, the length of the indicator 1711 may be reduced by an amount proportional to the reduction in the speed of the vehicle surround monitoring device 100.

Meanwhile, because the second other vehicle is expected to pass by the vehicle surround monitoring device 100 rather than colliding with the vehicle surround monitoring device 100 as the speed of the vehicle surround monitoring device 100 is reduced, the vehicle surround monitoring device 100 may no longer display the indicator 1740, which indicates the dangerous area for the second other vehicle, on the map 2000.

In addition, the vehicle surround monitoring device 100 may display a message 2010, indicating deactivation of the emergency braking function (e.g. "Emergency braking function has been released"), in one region of the map 2000.

Figure 21:
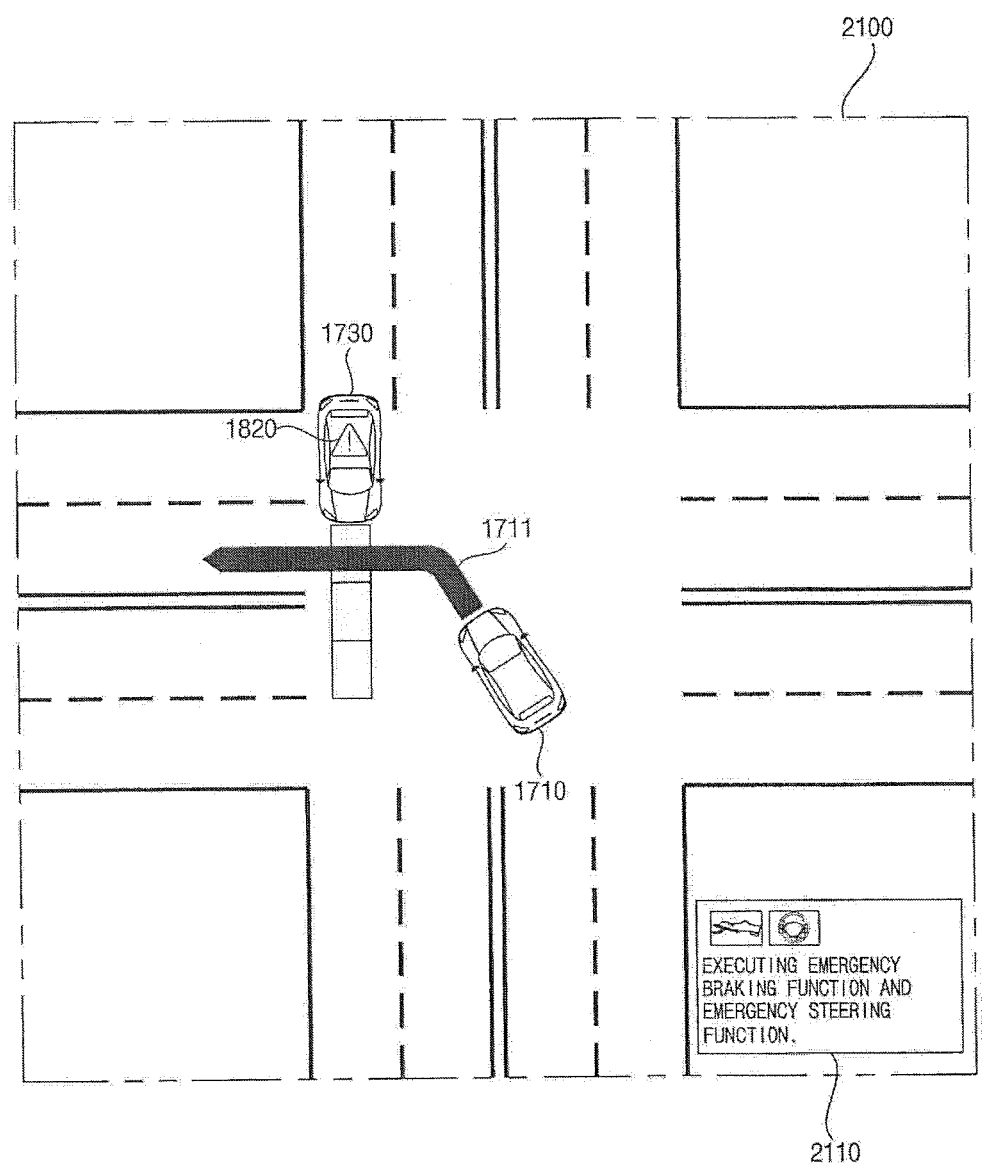
FIG. 21 is a view illustrating one example of a map on which a dangerous area for the moving object associated with FIG. 19 is displayed according to one embodiment of the present invention.

FIG. 21 is a view illustrating one example of a map 2100 on which a dangerous area for the moving object associated with FIG. 19 is displayed according to one embodiment of the present invention.

Referring to FIG. 21, unlike FIG. 19, the vehicle surround monitoring device 100 may use the map 2100 to determine that the icon 1711 indicating the predicted route of the vehicle surround monitoring device 100 overlaps the third sub area 1743 of the dangerous area 1740 for the second other vehicle.

The controller 170 may access the memory 130, and may select a function corresponding to the sub area 1743 which overlaps the predicted route of the vehicle surround monitoring device 100 from the data table 1610 illustrated in FIG. 16. Specifically, as illustrated in FIG. 21, when the predicted route 1711 of the vehicle surround monitoring device 100 overlaps the third sub area 1743 of the second other vehicle, the controller 170 may select and execute a warning output function, an emergency braking function, and an emergency steering function with reference to the data table 1610. The warning output function and the emergency braking function have been described above with reference to FIGS. 18 and 19, and a detailed description thereof will be omitted below.

When the emergency steering function is executed, the controller 170 may display a message 2110, indicating that the emergency steering function is executed (e.g. "Executing emergency braking function and emergency steering function"), in one region of the map 2100. Simultaneously, the controller 170 may calculate the steering angle of the vehicle surround monitoring device 100 that is required in order to avoid a collision between the vehicle surround monitoring device 100 and the second other vehicle based on the motion characteristics of the vehicle surround monitoring device 100, the motion characteristics of the second other vehicle, and the distance between the vehicle surround monitoring device 100 and the third sub area 743. The controller 170 may provide the calculated steering angle information to the steering drive unit 152, so as to change the movement direction of the vehicle surround monitoring device 100.

At this time, when the magnitude of the calculated steering angle is a predetermined critical value or more, the vehicle surround monitoring device 100 may cancel a previously found route, and search for a new route.

Figure 22:
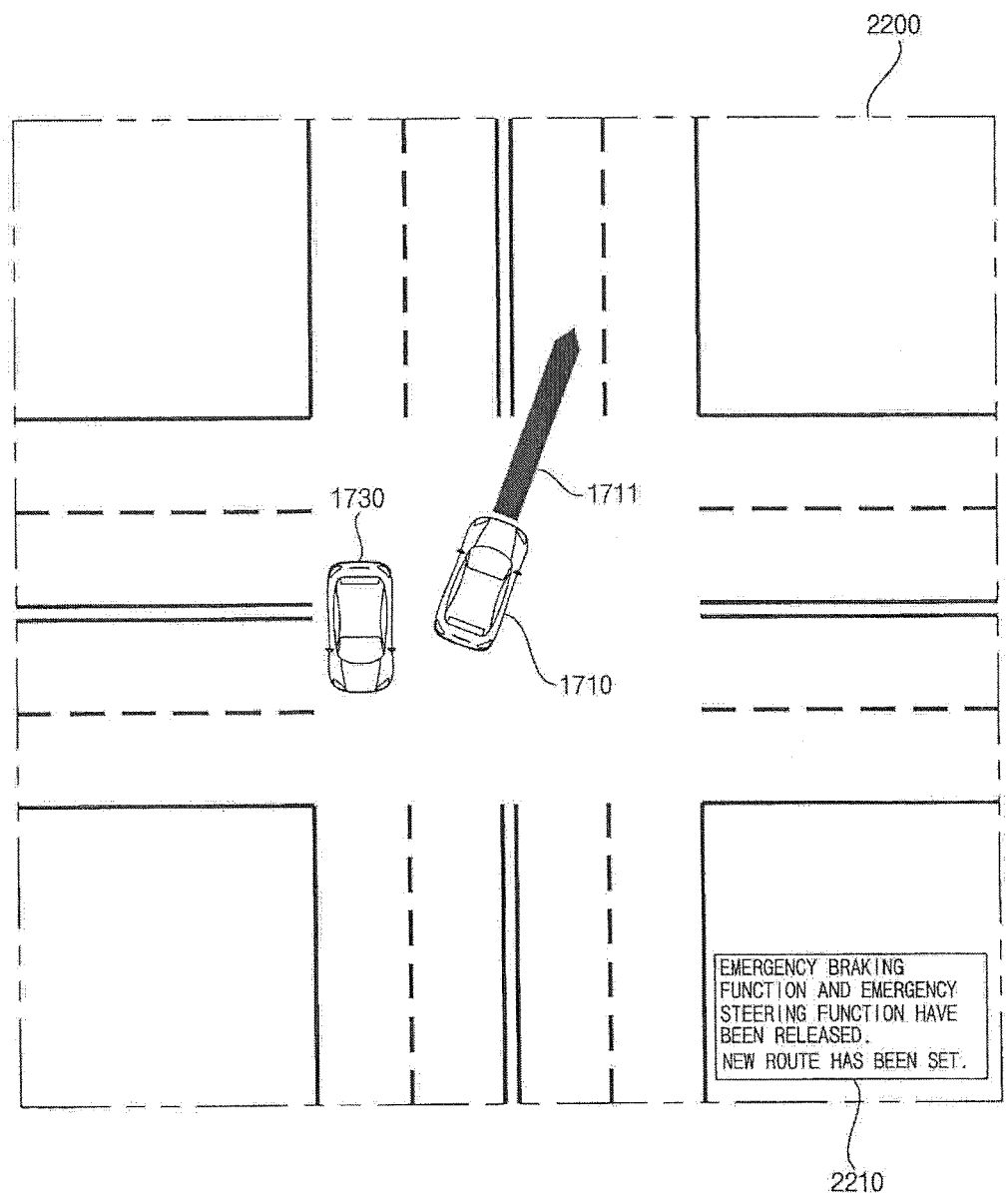
FIG. 22 is a view illustrating one example of a map which is displayed when the vehicle executes an emergent braking function and an emergent steering function in association with FIG. 21.

FIG. 22 is a view illustrating one example of a map 2200 displayed when the vehicle surround monitoring device 100 executes the emergency braking function and the emergency steering function in association with FIG. 21.

Referring to FIG. 22, as the speed of the vehicle surround monitoring device 100 is reduced via the execution of the emergency braking function, the length of the indicator 1711, indicating the predicted route of the vehicle surround monitoring device 100, may be shorter than that illustrated in FIG. 21. In addition, as the movement direction of the vehicle surround monitoring device 100 is changed via the execution of the emergency steering function, the indicator 1711, indicating the predicted route of the vehicle surround monitoring device 100, may provide guidance for the road at the upper side of the intersection, rather than the road at the left side of the intersection.

Meanwhile, when the speed and movement direction of the vehicle surround monitoring device 100 are changed, and thus the second other vehicle is expected to pass by the vehicle surround monitoring device 100 without colliding with the vehicle surround monitoring device 100, the vehicle surround monitoring device 100 may no longer display the indicator 1740, indicating the dangerous area for the second other vehicle, on the map 2200.

In addition, the vehicle surround monitoring device 100 may display, in one region of the map 2200, a message 2210 indicating that the emergency braking function and the emergency steering function have been deactivated and that a new route has been set for the vehicle surround monitoring device 100 (e.g. "Emergency braking function and emergency steering function have been released. A new route has been set"). For example, the indicator 1711 illustrated in FIG. 21 provides guidance indicating that the vehicle surround monitoring device 100 is going to turn left, whereas the indicator 1711 illustrated in FIG. 22 provides guidance indicating that the vehicle is going to go straight. That is, when the movement direction of the vehicle surround monitoring device 100 is rapidly changed via the execution of the emergency steering function, or when rapid variation in the movement direction of the vehicle surround monitoring device 100 is expected, the vehicle surround monitoring device 100 may automatically cancel a previously found route and provide guidance for a new route to the driver based on the calculated steering angle.

Figure 23:
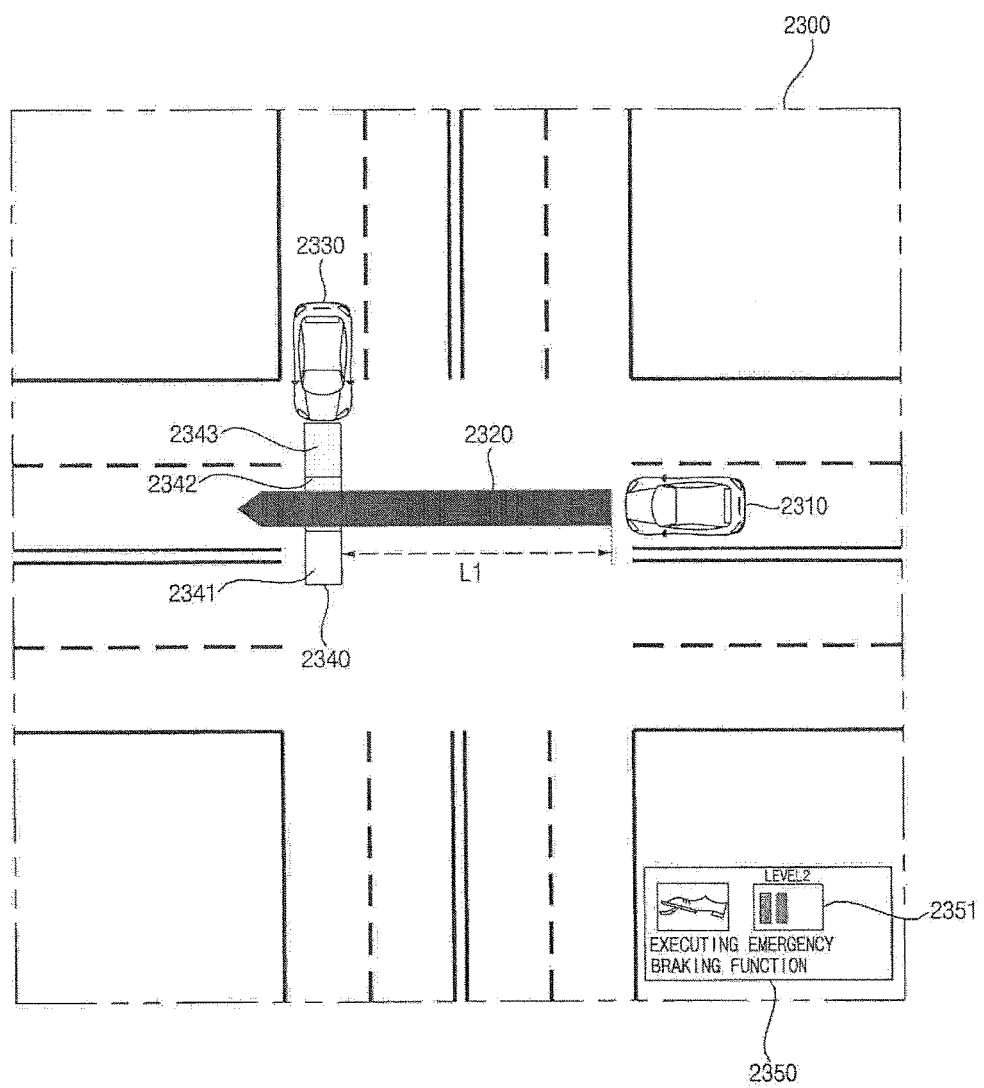
FIG. 23 is a view illustrating one example in which the vehicle determines a control parameter for a specific function based on a dangerous area for a moving object according to one embodiment of the present invention.

FIG. 23 is a view illustrating one example in which the vehicle surround monitoring device 100 determines a control parameter for a specific function based on a dangerous area for a moving object according to one embodiment of the present invention.

Referring to FIG. 23, an indicator 2310 indicating the location of the vehicle surround monitoring device 100 and an indicator 2330 indicating the location of another vehicle may be displayed on a map 2300. When the vehicle surround monitoring device 100 and the other vehicle are moving into an intersection from different directions, as illustrated, the vehicle surround monitoring device 100 may display an indicator 2320 indicating the predicted route of the vehicle surround monitoring device 100 in front of the indicator 2310, and may display an indicator 2340 indicating a dangerous area for the other vehicle in front of the indicator 2330.

Meanwhile, the indicator 2320, indicating the predicted route of the vehicle surround monitoring device 100, overlaps the indicator 2340 indicating the dangerous area for the other vehicle, the controller 170 may execute a function that corresponds to the portion of the dangerous area for the other vehicle which overlaps the predicted route of the vehicle surround monitoring device 100. As illustrated, when the indicator 2320 indicating the predicted route of the vehicle surround monitoring device 100 overlaps a second sub area 2342 for the other vehicle, the controller 170 may select and execute the emergency braking function with reference to the data table 1610. In addition, the controller 170 may display a message 2350 indicating the execution of the emergency braking function in one region of the map 2300.

Meanwhile, when the emergency braking function is executed, the vehicle surround monitoring device 100 may determine the braking force to be applied to the vehicle surround monitoring device 100 based on the distance between the vehicle surround monitoring device 100 and the second sub area 2342. For example, as illustrated, when the distance between the vehicle surround monitoring device 100 and the second sub area 2342 is a first distance L1, the controller 170 may control the brake drive unit 153 so as to generate braking force corresponding to the first distance L1. In addition, the controller 170 may display a message 2351, indicating that the braking force (e.g. "LEVEL 2") corresponding to the first distance L1 is applied to the vehicle surround monitoring device 100, in one region of the map 2300.

Figure 24:
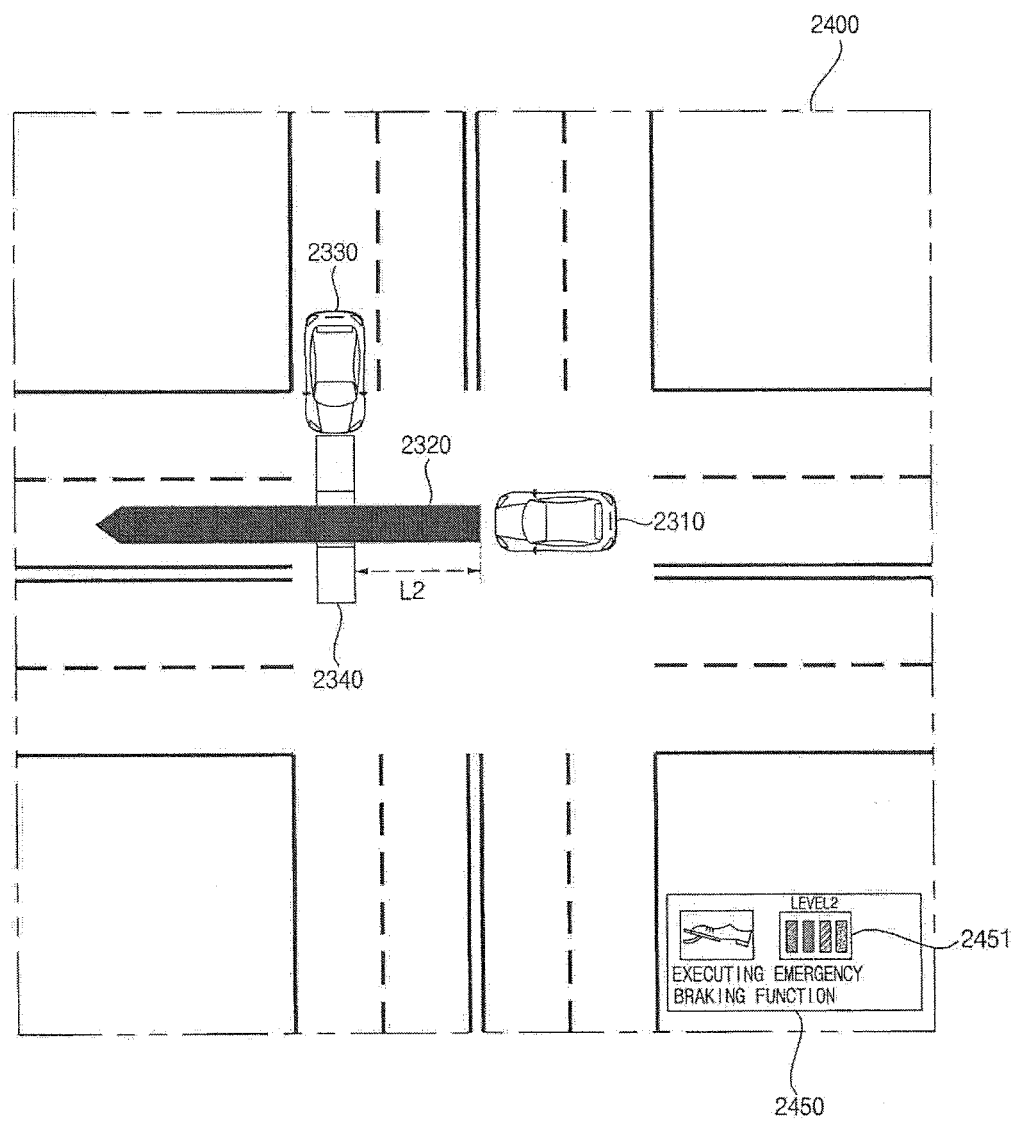
FIG. 24 is a view illustrating another example in which the vehicle determines a control parameter for a specific function based on a dangerous area for the moving object associated with FIG. 23 according to one embodiment of the present invention.

FIG. 24 is a view illustrating another example in which the vehicle surround monitoring device 100 determines a control parameter for a specific function based on a dangerous area for the moving object associated with FIG. 23 according to one embodiment of the present invention.

Referring to FIG. 24, similar to the map 2300 illustrated in FIG. 23, the indicator 2310 indicating the vehicle surround monitoring device 100, the indicator 2320 indicating the predicted route of the vehicle surround monitoring device 100, the indicator 2330 indicating the other vehicle, and the indicator 2340 indicating the dangerous area for the other vehicle may be displayed on a map 2400.

In addition, similar to FIG. 23, because the indicator 2320 indicating the predicted route of the vehicle surround monitoring device 100 overlaps the second sub area 2342, the controller 170 may display a message 2450 indicating the execution of the emergency braking function in one region of the map 2400.

Meanwhile, the distance L2 between the vehicle surround monitoring device 100 and a second sub area 2442 may become shorter than the distance L1 illustrated in FIG. 23 as the vehicle surround monitoring device 100 moves forward. For example, as illustrated, when the distance between the vehicle surround monitoring device 100 and the second sub area 2442 is reduced from the first distance L1 to the second distance L2, the controller 170 may control the brake drive unit 153 so as to generate braking force corresponding to the second distance L2. In this case, since the second distance L2 is shorter than the first distance L1, and thus the risk of a collision between the vehicle surround monitoring device 100 and the other vehicle is relatively high, the braking force corresponding to the second distance L2 may be greater than the braking force corresponding to the first distance L1. That is, the braking force to be applied to the vehicle surround monitoring device 100 may increase as the distance between the vehicle surround monitoring device 100 and the second sub area 2442 is reduced.

In addition, the controller 170 may display, in one region of the map 2400, an image 2451 indicating that the braking force (e.g. "LEVEL 4") corresponding to the second distance L2 is applied to the vehicle surround monitoring device 100.

According to FIGS. 23 and 24, the vehicle surround monitoring device 100 may adjust a control parameter related to at least one function among predetermined functions based on, for example, the distance between the vehicle surround monitoring device 100 and the dangerous area even if the predicted route of the vehicle surround monitoring device 100 overlaps the same portion of the dangerous area for the moving object. Thereby, it is possible to more positively reduce the risk of a collision between the vehicle surround monitoring device 100 and the moving object in the vicinity of the vehicle surround monitoring device 100.

Meanwhile, although the description of FIGS. 23 and 24 is based on the emergency braking function, this is given merely by way of example and a similar method may be applied to other functions. For example, when the predicted route 2320 of the vehicle surround monitoring device 100 overlaps the first sub area 2341, the controller 170 may increase the magnitude of the auditory feedback (e.g. sound volume) as the distance between the vehicle surround monitoring device 100 and the first sub area 2341 is reduced. In another example, when the predicted route 2320 of the vehicle surround monitoring device 100 overlaps the third sub area 2343, the controller 170 may increase the steering angle in order to avoid a collision with the other vehicle as the distance between the vehicle surround monitoring device 100 and the third sub area 2343 is reduced.

Figure 25A:
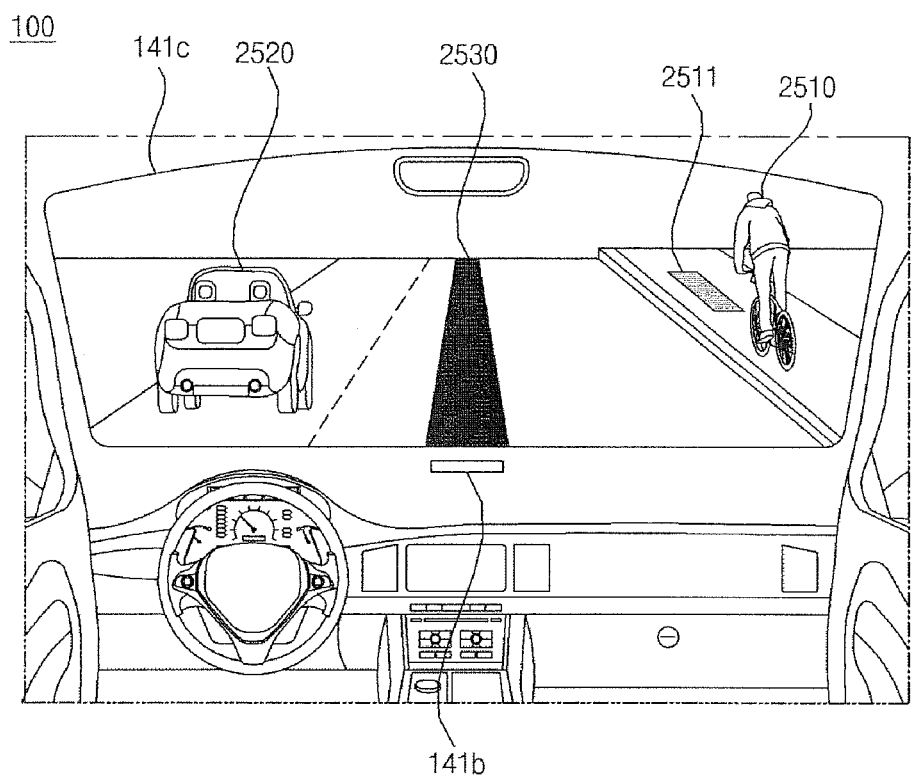
FIGS. 25A and 25B are views illustrating one example in which the vehicle indicates the risk of a collision with a moving object in an augmented-reality mode according to one embodiment of the present invention.
Figure 25B:
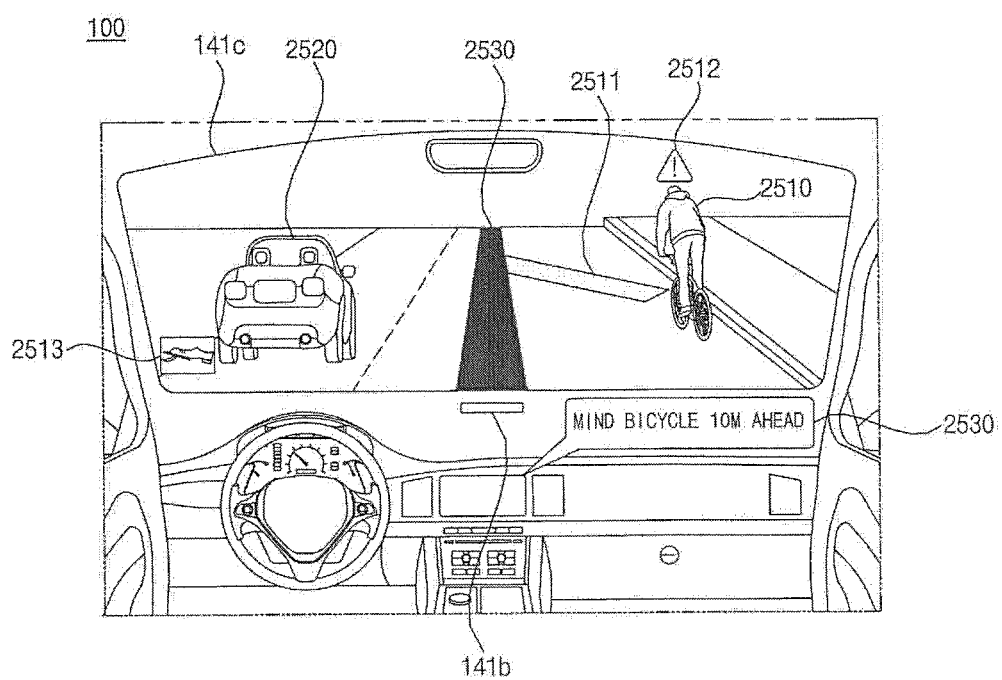

FIGS. 25A and 25B are views illustrating one example in which the vehicle surround monitoring device 100 indicates the risk of a collision with a moving object in an augmented-reality mode according to one embodiment of the present invention. For convenience of description, it is assumed that the selection menu item 1313, indicating a bicycle, is selected via the user interface 1310 illustrated in FIG. 13.

First, referring to FIG. 25A, the head-up display 141b and the transparent display 141c may be mounted in the space inside the vehicle surround monitoring device 100. The driver of the vehicle surround monitoring device 100 may visually check a bicycle 2510 and another vehicle 2520 through the windshield. For example, the bicycle 2510 may be moving forward on the sidewalk at the right side of a lane in which the vehicle surround monitoring device 100 is located, and the other vehicle 2520 may be moving forward in the lane at the left side of the vehicle surround monitoring device 100.

The vehicle surround monitoring device 100 may detect the bicycle 2510 and the other vehicle 2520 using the sensing unit 160. In addition, the vehicle surround monitoring device 100 may set a dangerous area for only the bicycle 2510, which is a moving object corresponding to the selection menu item 1313, among the detected bicycle 2510 and the detected other vehicle 2520, and display an indicator 2511 indicating the set dangerous area on the windshield. For example, the controller 170 may display the indicator 2511 on any one of the head-up display 141b and the transparent display 141c, i.e. on the windshield.

In addition, as illustrated, the controller 170 may display an indicator 2530, indicating the predicted route of the vehicle surround monitoring device 100, along with the indicator 2511. Since the indicator 2530, indicating the predicted route of the vehicle surround monitoring device 100, and the indicator 2511, indicating the dangerous area for the bicycle 2510, are simultaneously displayed in an augmented-reality mode on the windshield, the driver of the vehicle surround monitoring device 100 may intuitively recognize the motion characteristics (e.g. location, speed, and movement direction) of the vehicle surround monitoring device 100 and the bicycle 2510 and the distance between the vehicle surround monitoring device 100 and the bicycle 2510. Meanwhile, since there is no overlapping portion between the indicator 2511 and the indicator 2530, the vehicle surround monitoring device 100 may not execute any one of predetermined functions in order to avoid a collision between the vehicle surround monitoring device 100 and the bicycle 2510.

Subsequently, referring to FIG. 25B, the vehicle surround monitoring device 100 may determine whether the indicator 2511 and the indicator 2530 overlap each other, either in real time or periodically, by monitoring the motion characteristics of the bicycle 2510, and may execute a function corresponding to the overlapping portion when the indicator 2511 and the indicator 2530 overlap each other.

In one embodiment, the controller 170 may track a plurality of points on the bicycle 2510, and adjust the size and shape of the indicator 2511 based on variation in the position, speed and direction of the tracked points. For example, as exemplarily illustrated in FIG. 25A, when the bicycle 2510, which is moving forward on the sideway, increases its speed in order to enter the lane in which the vehicle surround monitoring device 100 is located as illustrated in FIG. 25B, the controller 170 may adjust the direction of the indicator 2511 so as to point toward the lane, and may simultaneously increase the length of the indicator 2511.

In addition, as illustrated, as a portion of the varied indicator 2511 overlaps the indicator 2530, the controller 170 may display a collision warning icon 2512, which is visual feedback, at a position in the vicinity of the actual area of the bicycle 2510, and may output a guidance voice message 2530 which instructs the driver to be aware of the bicycle 2510 (e.g. "Mind the bicycle 10 m ahead"), which is auditory feedback.

When the indicator 2530 overlaps a portion of the indicator 2511 corresponding to the emergency braking function, the controller 170 may additionally display an icon 2513 indicating the execution of the emergency braking function in one region of the windshield.

Figure 26:
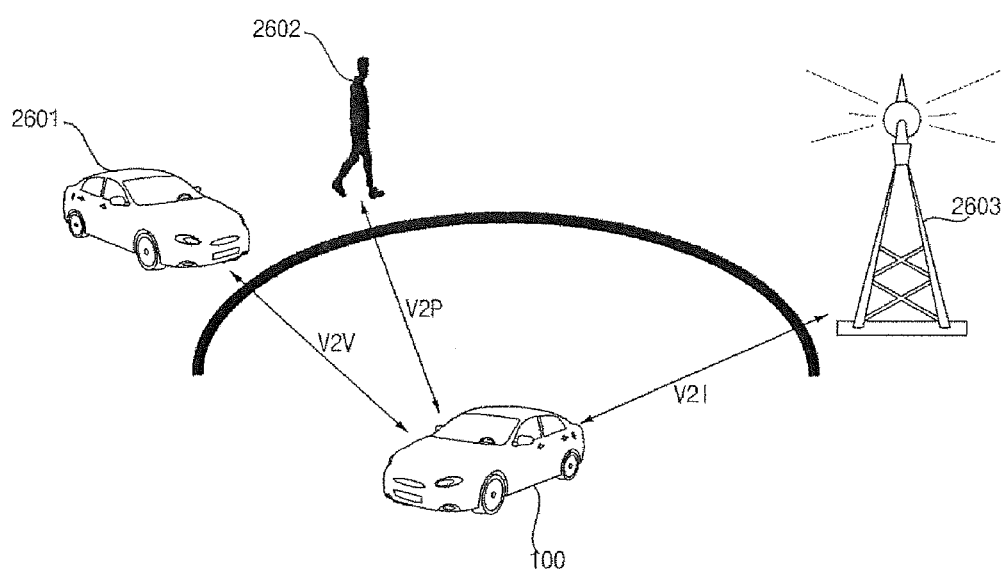
FIG. 26 is a view illustrating the concept of V2X communication that may be performed by the vehicle according to one embodiment of the present invention.

FIG. 26 is a view illustrating the concept of V2X communication, which may be performed by the vehicle surround monitoring device 100 according to one embodiment of the present invention.

Referring to FIG. 26, the communication unit 110 of the vehicle surround monitoring device 100 may exchange or share information with, for example, another vehicle 2601, a mobile terminal 2602, or some infrastructure 2603, which is present on the road on which the vehicle surround monitoring device 100 is driving, via vehicle to everything (V2X) communication.

In one example, the communication unit 110 may receive information (e.g. speed, movement direction, location, route, wiper, and the driver's state) regarding the traveling of the other vehicle 2601 or a motorcycle in the vicinity of the vehicle surround monitoring device 100 by performing Vehicle-to-Vehicle (V2V) communication. In addition, the other vehicle 2601 may receive information regarding the traveling of the vehicle surround monitoring device 100 via V2V communication.

In another example, the communication unit 110 may acquire the speed and the movement direction of a pedestrian 2602 by performing Vehicle-to-Pedestrian (V2P) communication between the vehicle surround monitoring device 100 and a mobile terminal of the pedestrian 2602 in the vicinity of the vehicle surround monitoring device 100.

In a further example, the communication unit 110 may receive information regarding moving objects collected by a Roadside Unit (RSU) 2603 by performing Vehicle-to-Infrastructure (V2I) communication with the RSU 2603. Here, the RSU is, for example, a base station installed at a specific location alongside the road. In addition, the RSU 2603 may receive, from the vehicle surround monitoring device 100, information regarding moving objects detected by the vehicle surround monitoring device 100, and may provide the received information to the other objects 2601 and 2602 in the vicinity of the vehicle surround monitoring device 100.

The vehicle surround monitoring device 100 may set or change a dangerous area for a moving object based on the received information regarding the moving object via Vehicle-to-Everything (V2X) communication. For example, the controller 170 may set the dangerous area for the moving object based on the type and motion characteristics of the moving object determined based on a sensing signal from the sensing unit 160, together with the information regarding the moving object received via V2X communication. In another example, when the moving object is hidden by, for example, a building, and thus it is impossible to detect the moving object using the sensing unit 160, the controller 170 may set a dangerous area for the corresponding moving object based only on the information regarding the moving object received via V2X communication.

Figure 27A:
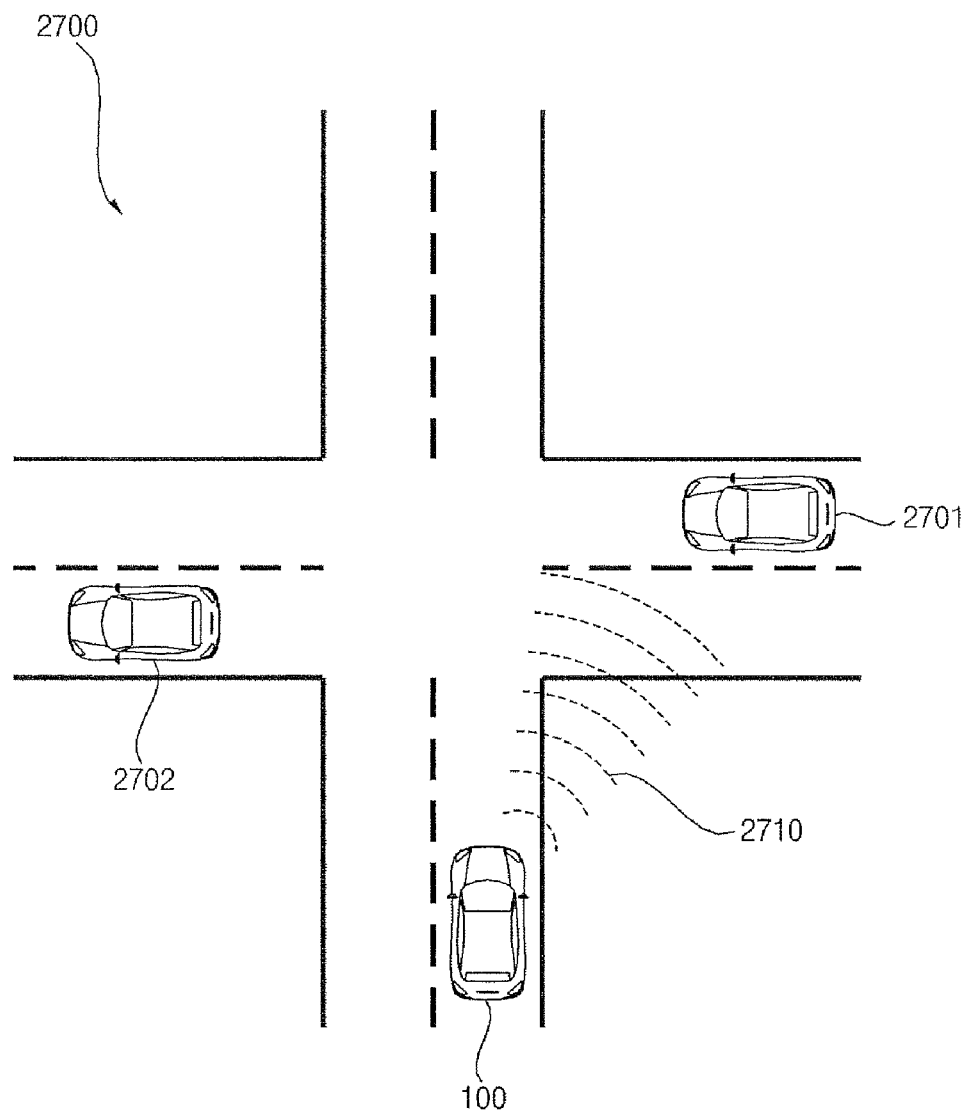
FIGS. 27A and 27B are views illustrating one example in which the vehicle uses outside illuminance to send a warning signal to a moving object that is at risk of colliding with the vehicle according to one embodiment of the present invention.
Figure 27B:
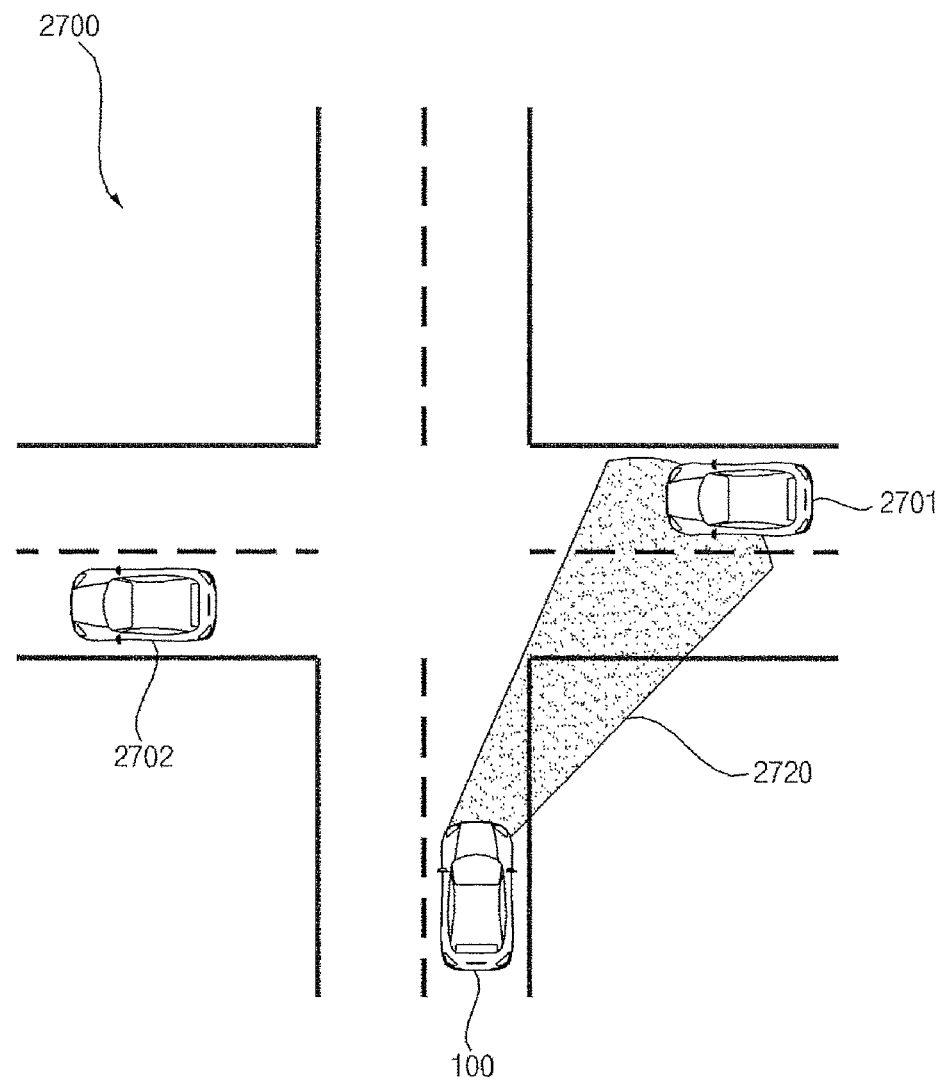

FIGS. 27A and 27B are views illustrating one example in which the vehicle surround monitoring device 100 uses outside illuminance to send a warning signal to a moving object that is at risk of colliding with the vehicle surround monitoring device 100 according to one embodiment of the present invention.

FIGS. 27A and 27B are top views of an intersection 2700 that the vehicle surround monitoring device 100, a first other vehicle 2701, and a second other vehicle 2702 are approaching.

All of the vehicle surround monitoring device 100, the first other vehicle 2701, and the second other vehicle 2702 are moving forward, and the vehicle surround monitoring device 100 may determine the speed and movement direction of the first other vehicle 2701 and the second other vehicle 2702 in the vicinity of the intersection 2700. For example, the vehicle surround monitoring device 100 may determine that the first other vehicle 2701 is approaching the intersection 2700 at a first speed and that the second other vehicle 2702 has almost passed through the intersection 2700 at a second speed. The vehicle surround monitoring device 100 may determine that there is no risk of a collision between the vehicle surround monitoring device 100 and the second other vehicle 2702, which has almost passed through the intersection 2700, among the first other vehicle 2701 and the second other vehicle 2702, thereby judging that there is only the risk of a collision between the vehicle surround monitoring device 100 and the first other vehicle 2701.

The vehicle surround monitoring device 100 may determine whether the outside illuminance at the point in time at which the first other vehicle 2701 is detected is a predetermined threshold illuminance or more. For example, the illuminance outside the vehicle surround monitoring device 100 may be sensed by an illuminance sensor included in the sensing unit 160. Here, information regarding the threshold illuminance may be prestored in the memory 130. For example, the threshold illuminance may be set based on, for example, the average illuminance difference between day and night or the average illuminance difference between the inside and the outside of a tunnel. The threshold illuminance may be changed through user input.

Upon judging that the illuminance outside the vehicle surround monitoring device 100 is a predetermined threshold illuminance or more, the vehicle surround monitoring device 100 may output a horn sound 2710 as illustrated in FIG. 27A.

On the other hand, upon judging that the illuminance outside the vehicle surround monitoring device 100 is below the predetermined threshold illuminance, the vehicle surround monitoring device 100 may emit light 2720 in the direction of the first other vehicle 2701, rather than outputting the horn sound 2710, or together with the output of the horn sound 2710. For example, the controller 170 may determine the target rotation angle of a motor (e.g. a step motor) provided at the headlights of the vehicle surround monitoring device 100 based on the location of the vehicle surround monitoring device 100, the location of the first other vehicle 2701, and the distance between the vehicle surround monitoring device 100 and the first other vehicle 2701, and then may adjust the positions of the headlights so as to correspond to the determined target rotation angle, and thereafter may control the lamp drive unit 154 so as to emit beams of light toward the first other vehicle 2701. At this time, the controller 170 may control the lamp drive unit 154 so that the emitted light beams have a greater intensity as the distance between the vehicle surround monitoring device 100 and the first other vehicle 2701 is reduced.

According to FIGS. 27A and 27B, in a dark environment, in which the output of the horn sound 2710 is of limited usefulness in alerting a moving object such as, for example, the other vehicle 2701, of the risk of a collision with the vehicle surround monitoring device 100, the emission of light toward the moving object enables the moving object to recognize the risk of a collision with the vehicle surround monitoring device 100.

The effects of a vehicle and a control method for the same according to the present invention are as follows.

With at least one of the embodiments of the present invention, by providing a driver with guidance for a dangerous area corresponding to the motion characteristics of moving objects in the vicinity of a vehicle, it is possible to assist the driver of the vehicle in easily recognizing the risk of a collision with the moving object and in pre-emptively responding to the risk of a collision.

In addition, with at least one of the embodiments of the present invention, by changing the dangerous area based on the motion characteristics and the type of the moving object, it is possible to assist the driver of the vehicle in easily recognizing the type of the moving object and in rapidly operating the vehicle based on the recognized type.

In addition, with at least one of the embodiments of the present invention, when a moving object is hidden by, for example, an obstacle, and thus the vehicle cannot directly detect the moving object, the vehicle may receive information related to the motion of the corresponding moving object via vehicle-to-everything (V2X) communication and set a dangerous area for the corresponding moving object based on the received information. In this way, even if the moving object is invisible to the driver of the vehicle or cannot be directly detected by the vehicle, the vehicle is capable of previously checking the risk of a collision with the corresponding moving object.

In addition, with at least one of the embodiments of the present invention, when a collision with a moving object is expected, the vehicle may cancel a previously found route to a destination and automatically search for a new route. In this way, the new route to the destination may be rapidly provided to the driver of the vehicle.

Effects of the present invention should not be limited to the aforementioned effects and other not-mentioned effects will be clearly understood by those skilled in the art from the claims.

The embodiments of the present invention as described above are not limited to be implemented only via the apparatus and the method and may be implemented via a program that realizes a function corresponding to the configuration of each embodiment of the present invention or a recording medium in which the program is recorded. This implementation will be easily realized by experts in the art of the present invention from the above description of the embodiments.

In addition, it should be readily understood that the invention is not limited to the embodiments described above and the accompanying drawings. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description of the embodiments and the accompanying drawings, and some or all of the embodiments may be selectively combined with one another to achieve various alterations.

What is claimed is:

1. A vehicle surround monitoring device comprising:
a controller configured to:
receive, from a sensing unit, information about (i) a moving object disposed within a first distance from a vehicle and (ii) movement of the moving object;
obtain motion characteristics of the moving object based on the movement of the moving object detected by the sensing unit, the motion characteristics of the moving object including speed of the moving object and a moving direction of the moving object;
determine a first visual image associated with the moving object based on the motion characteristics of the moving object, wherein a size and a shape of the first visual image are associated with the motion characteristics of the moving object; and
provide the first visual image to a display unit for displaying,
wherein the controller is further configured to:
determine a predicted movement area of the moving object based on the motion characteristics of the moving object, and
control the display unit to display, along with an image indicating the predicted movement area of the moving object, an image indicating a predicted route of the vehicle.

2. The vehicle surround monitoring device of claim 1, wherein the sensing unit includes a camera, a radar, a Light Detection and Ranging (LiDAR) sensor, or an ultrasonic sensor.

3. The vehicle surround monitoring device of claim 1, wherein the controller is configured to provide the first visual image in an augmented-reality mode or a top-view mode to the display unit.

4. The vehicle surround monitoring device of claim 3, wherein the controller is configured to:
merge the first visual image into a map, and
provide the map that is merged with the first visual image to the display unit, the map presenting a geographical area that the vehicle locates.

5. The vehicle surround monitoring device of claim 4, wherein the controller is configured to determine a scale of the map based on traffic information for the geographical area.

6. The vehicle surround monitoring device of claim 1, wherein the controller is configured to:
determine one or more tracking points of the moving object;
obtain tracking data for the one or more tracking points, the tracking data including a position, speed, or a moving direction of each tracking point;
determine a predicted moving direction of the moving object based on the tracking data; and
adjust the first visual image based on the predicted moving direction.

7. The vehicle surround monitoring device of claim 1, wherein the controller is configured to identify a type of the moving object.

8. The vehicle surround monitoring device of claim 7, wherein the controller is configured to:
store a plurality of types of moving objects in a memory;
associate the identified type of the moving object with one of the plurality of types of moving objects stored in the memory; and
determine the first visual image based on the association between the identified type and the one of the plurality of types of moving objects stored in the memory.

9. The vehicle surround monitoring device of claim 1, wherein the first visual image includes one or more sub-areas.

10. The vehicle surround monitoring device of claim 9, wherein each of the one or more sub-areas indicates a route that the moving object will pass at a certain time period.

11. The vehicle surround monitoring device of claim 9, wherein the controller is configured to provide the one or more sub-areas to the display unit for displaying, the one or more sub-areas being distinguishable from each other based on visual characteristics.

12. The vehicle surround monitoring device of claim 9, wherein the controller is configured to determine the predicted route of the vehicle that the vehicle is predicted to pass at a first time period based on the motion characteristics of the vehicle.

13. The vehicle surround monitoring device of claim 12, wherein the controller is configured to:
determine a second visual image corresponding to the predicted route of the vehicle, and
provide, to the display unit, the second visual image with the first visual image associated with the moving object.

14. The vehicle surround monitoring device of claim 12, wherein the controller is configured to determine whether one of the one or more sub-areas overlaps the predicted route of the vehicle.

15. The vehicle surround monitoring device of claim 14, wherein the controller is configured to, based on (i) the determination that one of the one or more sub-areas overlaps the predicted route of the vehicle and (ii) illumination outside the vehicle, provide an audio alert or a visual alert to the moving object.

16. The vehicle surround monitoring device of claim 14, wherein the controller is configured to, based on the determination that one of the one or more sub-areas overlaps the predicted route of the vehicle, perform one or more operations including (i) providing a warning to a driver of the vehicle, (ii) generating speed control information for the vehicle, (iii) generating steering control information for the vehicle, and (iv) generating light control information for the vehicle.

17. The vehicle surround monitoring device of claim 16, wherein the controller is configured to perform a first operation, among the one or more operations, for the sub-area that overlaps the predicted route of the vehicle.

18. The vehicle surround monitoring device of claim 17, wherein the controller is configured to adjust control parameters for the warning, the speed control information, the steering control information, and the light control information based on a distance between the vehicle and the sub-area that overlaps the predicted route of the vehicle.

19. The vehicle surround monitoring device of claim 16, wherein the controller is configured to:
determine which sub-area of the one or more sub-areas overlaps the predicted route of the vehicle; and
determine an operation, from the operations, for the sub-area that overlaps the predicted route of the vehicle based on the determination as to which sub-area of the one or more sub-areas overlaps the predicted route of the vehicle.

20. The vehicle surround monitoring device of claim 1, further comprising a communication unit that is configured to receive travel information from the moving object,
wherein the controller is configured to determine the first visual image associated with the moving object based on the travel information received from the moving object.

21. The vehicle surround monitoring device of claim 1, wherein the controller is further configured to:
determine a second visual image corresponding to the predicted route of the vehicle, and
provide, to the display unit, the second visual image with the first visual image associated with the moving object.

22. The vehicle surround monitoring device of claim 21, wherein the first visual image includes one or more sub-areas, and
wherein the controller is configured to determine whether one of the one or more sub-areas overlaps the predicted route of the vehicle.

\* \* \* \* \*